(12) United States Patent
Lee et al.

(10) Patent No.: US 10,139,990 B2
(45) Date of Patent: Nov. 27, 2018

(54) DISPLAY APPARATUS FOR CONTENT FROM MULTIPLE USERS

(71) Applicant: LG ELECTRONICS INC., Seoul (KR)

(72) Inventors: Hongjin Lee, Seoul (KR); Chungha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 448 days.

(21) Appl. No.: 14/594,765

(22) Filed: Jan. 12, 2015

(65) Prior Publication Data

US 2015/0199089 A1 Jul. 16, 2015

(30) Foreign Application Priority Data

Jan. 13, 2014 (KR) .................. 10-2014-0004173
Jan. 13, 2014 (KR) .................. 10-2014-0004174

(51) Int. Cl.

| | |
|---|---|
| *G06F 3/0482* | (2013.01) |
| *G06F 3/0488* | (2013.01) |
| *G06F 3/0487* | (2013.01) |
| *G06F 3/0484* | (2013.01) |
| *G09G 5/14* | (2006.01) |

(52) U.S. Cl.
CPC .......... *G06F 3/0482* (2013.01); *G06F 3/0487* (2013.01); *G06F 3/04845* (2013.01); *G06F 3/04883* (2013.01); *G06F 3/04886* (2013.01); *G09G 5/14* (2013.01); *G06F 2203/04803* (2013.01)

(58) Field of Classification Search
CPC .............. G06F 3/0488; G06F 3/04883; G06F 3/04886; G06F 3/0482; G06F 3/04845; G06F 3/0487; G06F 2203/04803; H04L 29/06401; H04L 12/1813; G06Q 10/101; G09G 5/14

See application file for complete search history.

(56) References Cited

U.S. PATENT DOCUMENTS

| | | | | |
|---|---|---|---|---|
| 5,515,491 | A * | 5/1996 | Bates .................. | G06F 3/0481 715/754 |
| 6,262,724 | B1 * | 7/2001 | Crow .................... | G06F 3/048 715/723 |
| 6,664,786 | B2 * | 12/2003 | Kretschmann ....... | G01R 33/028 324/207.14 |
| 7,821,510 | B2 * | 10/2010 | Aksemit ................ | G06F 1/16 345/156 |

(Continued)

FOREIGN PATENT DOCUMENTS

| | | |
|---|---|---|
| CN | 102263577 A | 11/2011 |
| CN | 102413229 A | 4/2012 |
| CN | 103365592 A | 10/2013 |

*Primary Examiner* — Kieu D Vu
*Assistant Examiner* — Blaine T. Basom
(74) *Attorney, Agent, or Firm* — Birch, Stewart, Kolasch & Birch, LLP

(57) ABSTRACT

A display apparatus including a display configured to display a content list including a plurality of content items; and a processor configured to receive an enlarge touch input to enlarge the content list, expand and display at least a part of the plurality of content items in the content list, and begin playback of a first content item in the part of the plurality of content items when the first content item is enlarged to a predetermined reproducible size different than the other content items included in the plurality of content items.

8 Claims, 60 Drawing Sheets

(56) References Cited

U.S. PATENT DOCUMENTS

| | | | | |
|---|---|---|---|---|
| 8,732,617 B1* | 5/2014 | Armstrong | G06F 3/04817 | 715/711 |
| 2008/0192059 A1* | 8/2008 | Kennedy | G06F 3/0488 | 345/537 |
| 2009/0094515 A1* | 4/2009 | Do | G06Q 10/10 | 715/273 |
| 2009/0106667 A1* | 4/2009 | Lyle | G06F 3/0488 | 715/750 |
| 2009/0237372 A1* | 9/2009 | Kim | G06F 3/044 | 345/173 |
| 2010/0007796 A1* | 1/2010 | Yamaji | H04N 5/23219 | 348/588 |
| 2010/0328423 A1* | 12/2010 | Etter | H04N 7/15 | 348/14.16 |
| 2011/0246918 A1* | 10/2011 | Henderson | G06F 3/04817 | 715/769 |
| 2011/0252346 A1 | 10/2011 | Chaudhri | | |
| 2011/0279388 A1* | 11/2011 | Jung | G06F 3/04883 | 345/173 |
| 2011/0294433 A1* | 12/2011 | Matsubara | H04M 1/7253 | 455/41.3 |
| 2012/0071208 A1* | 3/2012 | Lee | H04M 1/72544 | 455/566 |
| 2012/0206391 A1* | 8/2012 | Kim | H04M 1/7253 | 345/173 |
| 2013/0135234 A1 | 5/2013 | Hisano et al. | | |
| 2013/0194238 A1 | 8/2013 | Sakai | | |
| 2013/0219303 A1* | 8/2013 | Eriksson | H04M 1/7253 | 715/759 |
| 2013/0227476 A1* | 8/2013 | Frey | G06F 3/0488 | 715/810 |
| 2013/0268875 A1* | 10/2013 | Han | G06F 3/0481 | 715/769 |
| 2013/0342566 A1 | 12/2013 | Shin | | |

\* cited by examiner

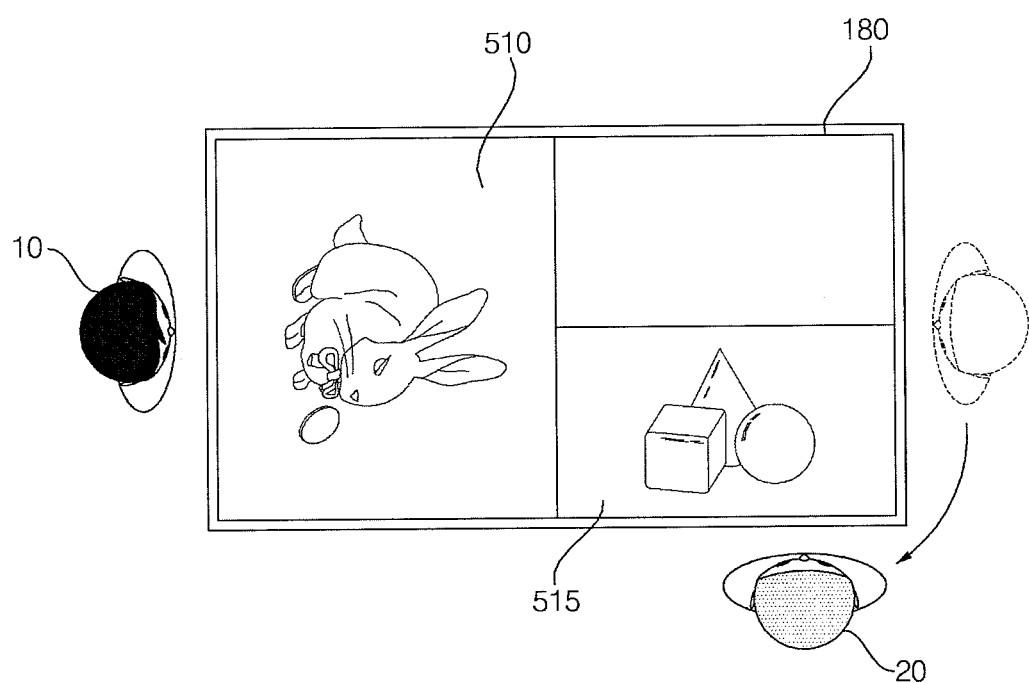

(a)

(b)

DISPLAY APPARATUS FOR CONTENT FROM MULTIPLE USERS

CROSS-REFERENCE TO A RELATED APPLICATION

This application claims the benefit of Korean Patent Application Nos. 10-2014-0004173 and 10-2014-0004174, filed on Jan. 13, 2014 in the Korean Intellectual Property Office, both of which are incorporated herein by reference.

BACKGROUND OF THE INVENTION

1. Field of the Invention

The present invention relates to a display apparatus and a method for operating the same, and more particularly, to a display apparatus and a method for operating the same, which increases user convenience.

2. Description of the Related Art

Various types of display apparatuses are used to display an image. For example, the display apparatuses include a Liquid Crystal Display (LCD) panel, a plasma display panel, an Organic Light Emitting Diode (OLED) display panel, etc. Various characteristics are required for the display apparatus in different fields. Particularly, research has been actively made on large display apparatuses.

SUMMARY OF THE INVENTION

Accordingly, one object of the present invention is to address problems with related art display devices.

Another object of the present invention is to provide a display apparatus and a method for operating the same, which increases the user's convenience.

To achieve these and other advantages and in accordance with the purpose of the present invention, as embodied and broadly described herein, the present invention provides in one aspect a display apparatus including a display configured to display a content list including a plurality of content items; and a processor configured to receive an enlarge touch input to enlarge the content list, expand and display at least a part of the plurality of content items in the content list, and begin playback of a first content item in the part of the plurality of content items when the first content item is enlarged to a predetermined reproducible size different than the other content items included in the plurality of content items. The present invention also provides a corresponding method of controlling a display apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

In the specification, a display apparatus refers to an apparatus equipped with a display that can display an image. With the display apparatus horizontally leveled or vertically upright, the display apparatus may display an image. The following description is given with the appreciation that the display apparatus is a large display apparatus that can be used by a plurality of users, while it is placed horizontally like a table top. Further, the display apparatus can allow a user's touch input, gesture input, audio input, etc.

Figure 1:
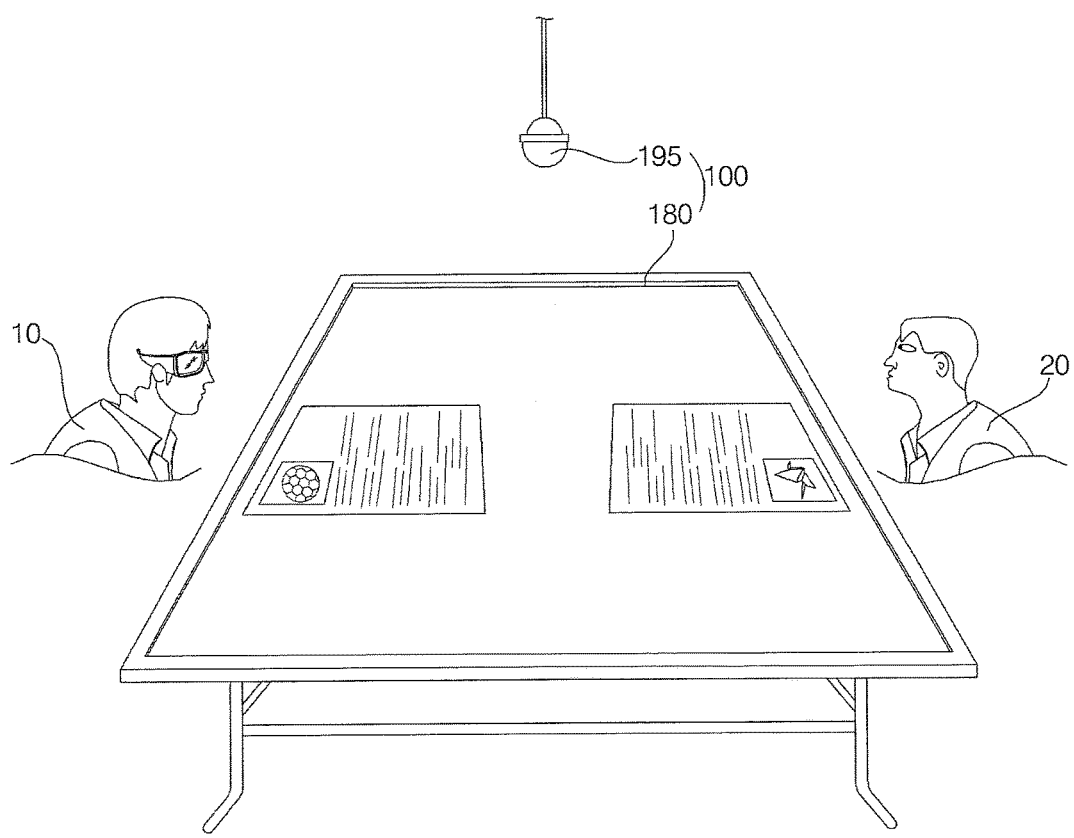
FIG. 1 is an overview illustrating a display apparatus according to an embodiment of the present invention.

FIG. 1 illustrates a display apparatus according to an embodiment of the present invention. Referring to FIG. 1, a display apparatus 100 includes a display 180 for displaying an image and a camera 195 for capturing an image of a user. While the camera 195 is disposed as a separately configured unit above the display 180 placed on a horizontal plane, the camera 195 may be configured in various manners.

For example, a plurality of cameras may be attached in the vicinity of at least one of the corners of the square display 180 or a plurality of standing cameras may stand in the vicinity of at least one of the corners of the square display 180. In accordance with an embodiment of the present invention, the display apparatus 100 displays content in correspondence with the position of a user recognized through the camera 195.

Particularly in the presence of a plurality of users, content corresponding to the users may be displayed in separate areas. Various examples of displaying content in separate areas will be described later with reference to FIGS. 3 to 30B.

Figure 2:
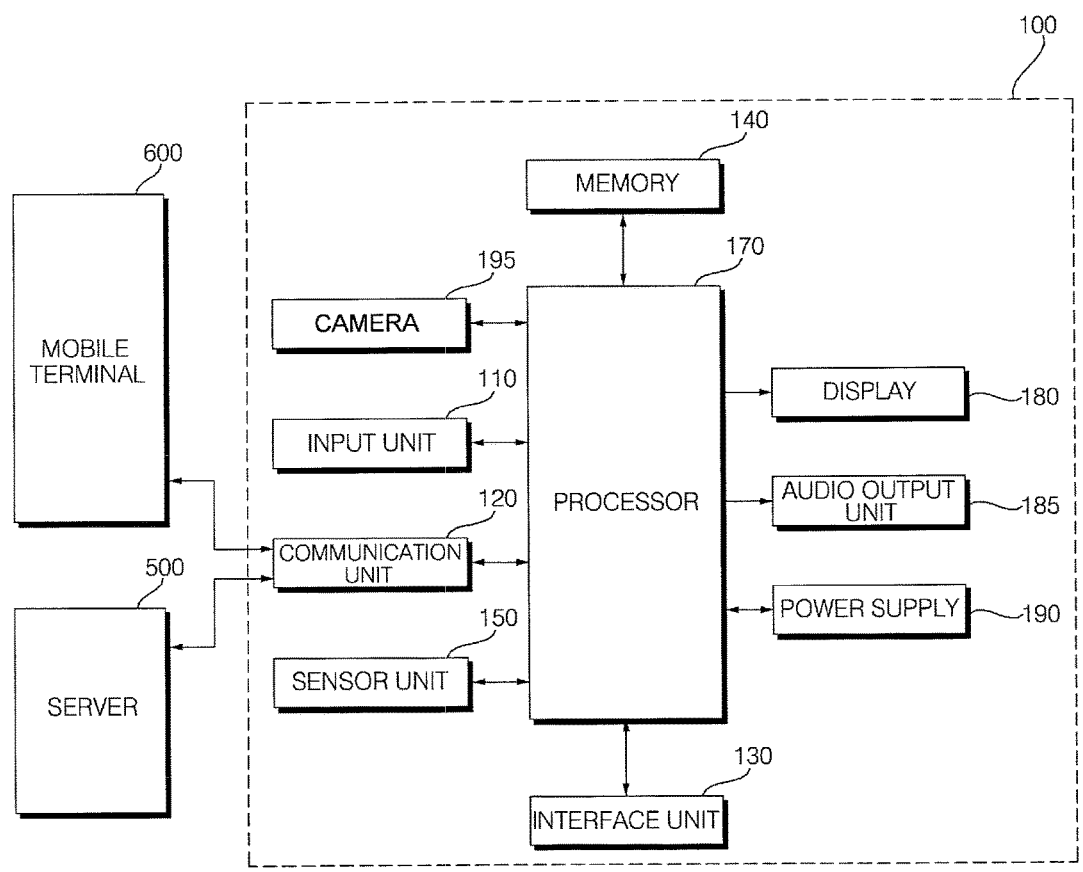
FIG. 2 is a block diagram of the display apparatus illustrated in FIG. 1.

FIG. 2 is a block diagram of the display apparatus illustrated in FIG. 1. Referring to FIG. 2, the display apparatus 100 includes an input unit 110, a communication unit 120, an interface unit 130, a memory 140, a sensor unit 150, a processor 170, a display 180, an audio output unit 185, a power supply 190, and the camera 195. The display apparatus 100 may further include an audio input unit.

The input unit 110 may include a plurality of buttons or a touch screen installed to the display apparatus 100. The display apparatus 100 may be powered on and operated through the plurality of buttons or the touch screen. Many other input operations may be performed using the plurality of buttons or the touch screen.

The communication unit 120 can exchange data with a mobile terminal 600 or a server 500 wirelessly. Particularly, the communication unit 120 can exchange data wirelessly with a mobile terminal of a user of the display apparatus 100.

Various data communication schemes such as Bluetooth, Wireless Fidelity (Wi-Fi), Wi-Fi Direct, Digital Living Network Alliance (DLNA), APiX, etc. are available for wireless data communication.

The communication unit 120 can receive preferred content for each user from the mobile terminal 600 or the server 500 and transmit the received preferred content to the processor 170 or the memory 140. The communication unit 120 can also receive edited content from the processor 170 and transmit the edited content to the mobile terminal 600 or the server 500.

The interface unit 130 can receive data from the outside in a communication scheme other than used in the communication unit 120 or can transmit a signal processed or generated in the processor 170 to the outside. For example, the interface unit 130 can exchange data with the outside by cable and include a High Definition Multimedia Interface (HDMI) port, a Red, Green, Blue (RGB) port, a Universal Serial Bus (USB) port, etc.

The memory 140 can store various data required for overall operations of the display apparatus 100, such as programs for processing or controlling in the processor 170. Further, the memory 140 may temporarily store externally received content.

The sensor unit 150 can sense a user's touch input or a touch between the mobile terminal 600 and the display apparatus 100, and include a touch sensor, a position sensor, a motion sensor, a gyro sensor, etc. The sensed user's touch input or the mobile terminal's touch input can be provided to the processor 170.

The audio output unit 185 converts an electrical signal received from the processor 170 to an audio signal and outputs the audio signal and include a speaker, etc. The audio output unit 185 can output a sound corresponding to a manipulation of the input unit 110, that is, a manipulation of a button.

The audio input unit can receive a user's voice and include a microphone. The audio input unit can convert the received voice to an electrical signal and transmit the electrical signal to the processor 170.

The processor 170 provides overall control to each unit of the display apparatus 100. Particularly, the processor 170 can play back content for each user, stored in the memory 140 or received through the communication unit 120 and display of the content on the display 180.

The processor 170 can calculate the positions of first and second users based on an image captured by the camera 195. Further, the processor 170 can change at least one of the size or position of a display area of first content so that a display area of second content is not overlapped with the display area of the first content.

When the second user moves, the processor 170 can change a display position of the second content in correspondence with the movement of the second user and can change at least one of the size or position of the display area of the first content so that the display area of the second content is not overlapped with the display area of the first content.

Upon receipt of an input to move the first content, the processor 170 can move the first content or a part of the first content in correspondence with the position of the second user and display the moved first content or the moved part of the first content on the display 180.

Upon receipt of an input to display a mini map for the first content, the processor 170 can display the mini map on the display 180. Upon receipt of an input to move a part of the mini map, the processor 170 can move a part of the first content corresponding to the part of the mini map and display the moved part of the first content on the display 180. Upon receipt of an input to zoom the mini map, the processor 170 can zoom in or zoom out the mini map and display the zoomed-in or zoomed-out mini map on the display 180.

Upon receipt of an input to combine at least two of a plurality of first content items displayed in correspondence with the position of the first user, the processor 170 can combine the at least two first content items and display the combined content items on the display 180.

The processor 170 can display a copy of the first content in correspondence with the position of the second user and upon receipt of an edit input from the second user, may edit the copy of the first content. The processor 170 can display the edited copy of the first content or a copy of the edited copy of the first content in correspondence with the position of the first user. During editing, the copy of the first content or the copy of the copied first content is not editable to the first user.

When the mobile terminal 600 of a user is placed on the display 180, the processor 170 can sense it through the sensor unit 150 and perform pairing between the display apparatus 100 and the mobile terminal 600 through the communication unit 120. The processor 170 can identify the user by device information or user information received from the mobile terminal 600.

After identifying the mobile terminal 600 of the user, the processor 170 can define a user area corresponding to the position of the mobile terminal 600. Further, after identifying the mobile terminal 600 of the user, the processor 170 can display an object related to data sharing between the mobile terminal 600 and the display apparatus 100.

If data is shared between the mobile terminal 600 and the display apparatus 100, the processor 170 can display content related to the user in the user area. For example, the processor 170 can display a whole screen displayed on the mobile terminal 600 in the user area defined on the display 180.

In another example, the processor 170 can display a content item selected from a screen displayed on the mobile terminal 600 in the user area of the display 180. Further, the processor 170 can control changing of the size of the displayed user area according to a user input.

The processor 170 can define user areas for a plurality of users on the display 180. The user areas are preferably not overlapped with one another. Particularly, if specific content is displayed in a common area overlapped between the user areas, the processor 170 can control sharing of content between users corresponding to the user areas. That is, the processor 170 can transmit the content to a mobile terminal of another user.

The processor 170 can calculate the positions of the first and second users based on an image captured by the camera 195 and can display content for each user in correspondence with the position of the user.

Upon receipt of an input to enlarge a content list, the processor 170 can control enlargement of the content list on the display 180. The processor 170 can display at least a part of a plurality content items listed in the content list. If any of the displayed content items is of a reproducible size, the processor 170 can control playback and display of the content item.

Before displaying the content list, the processor 170 can display a plurality of content items. Upon receipt of an input to combine the plurality of content items, the processor 170 can combine the plurality of content items and control display of a content list including the combined content items.

During playback and display of content, if a content item is of a reproducible size, the processor 170 can play back content corresponding to the content item and control display of the playback content. During playback and display of content, the processor 170 can increase a display size of content being played back to a largest of display sizes of displayed content items.

During enlarged display of content, if an enlargement input is for a first-direction enlargement, the processor 170 can display a content list enlarged in a first direction. Upon receipt of an input to enlarge content being played back, the processor 170 can control enlargement of the playback content and display of the enlarged content and can control volume-up of the playback content.

Upon receipt of a flicking input in a first direction, the processor 170 can control output and display of images related to the content in the first direction. In addition, upon receipt of an input to insert an additional image, the processor 170 can insert the additional image between the content-related images. Upon receipt of a flicking input for the content-related images in a second direction opposite to the first direction, the processor 170 can display content including the additional image.

Upon receipt of an input to combine a part of a plurality of displayed content items, the processor 170 can generate a content file including the content items corresponding to the part of the displayed content items.

The display 180 can display images related to operations of the display apparatus 100. To display images, the display 180 may be configured with a Plasma Display Panel (PDP) display, an LCD, an OLED display, etc. Further, the display 180 may be a flexible display or a Three-Dimensional (3D) display.

The power supply 190 can supply operation power to each component under the control of the processor 170. Particularly, the power supply 190 can supply power to the processor 170 that may be implemented on a System On Chip (SOC), the display 180 that displays an image, and the audio output unit 185 for audio output.

For this purpose, the power supply 190 may be provided with a converter for converting Alternating Current (AC) to Direct Current (DC). For example, if the display 180 is configured with a liquid crystal panel having a plurality of backlight lamps, the power supply 190 may further include an inverter capable of Pulse Wave Modulation (PWM) to change an illuminance or drive dimming.

Further, one or more camera 195 may be provided. An image captured by a camera 195 may be transmitted to the processor 170. The processor 170 can identify each user, determine the position of the user, and recognize a gesture by processing the captured image.

The display apparatus 100 may be any of a TeleVision (TV), a monitor, a projector, etc., and the mobile terminal 600 may be any of a smart phone, a music player, a tablet, an e-book reader, a tab-book, etc.

While the memory 140 is shown in FIG. 2 as separately configured from the processor 170, the present invention is not limited thereto. Rather, the memory 140 may be incorporated into the processor 170.

The block diagram of the display apparatus 100 illustrated in FIG. 2 is purely exemplary. Depending upon the specifications of the display apparatus 100 in actual implementation, the components of the display apparatus 100 may be combined or omitted or new components may be added. That is, two or more components are incorporated into one component or one component may be configured as separate components, as needed.

Figure 3:
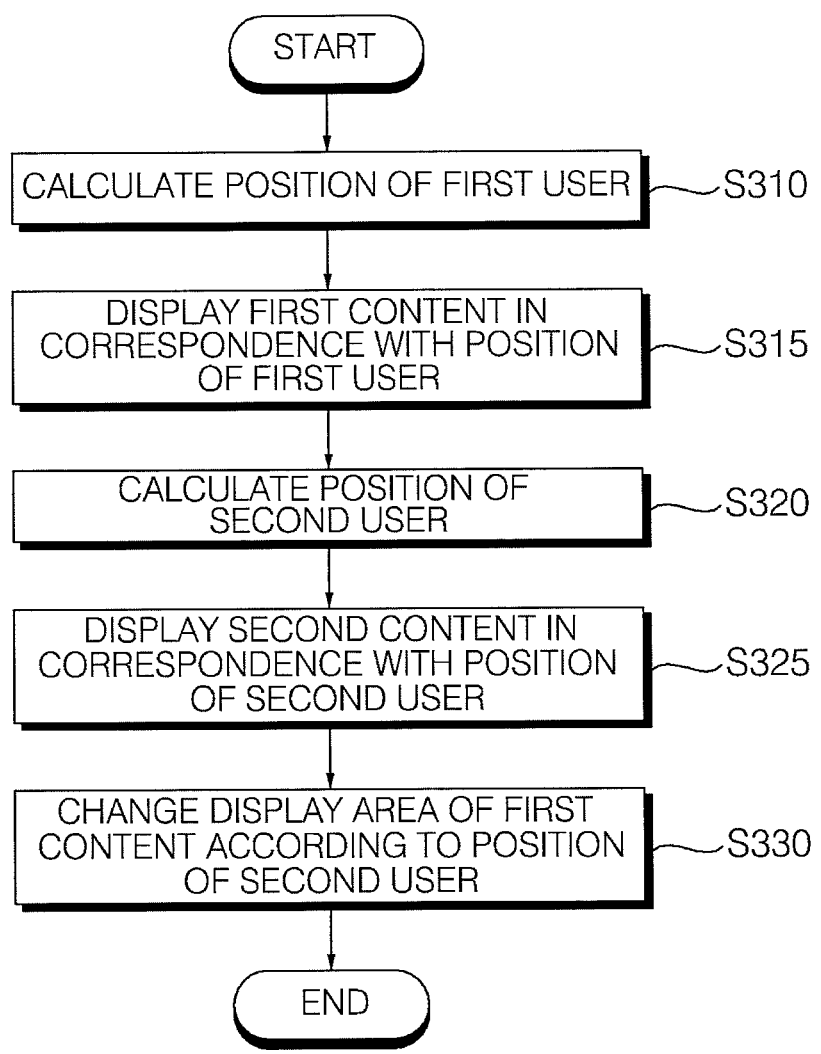
FIG. 3 is a flowchart illustrating a method for operating the display apparatus according to an embodiment of the present invention.

Next, FIG. 3 is a flowchart illustrating a method for operating the display apparatus according to an embodiment of the present invention, and FIGS. 4A to 20C are overviews illustrating the method for operating the display apparatus illustrated in FIG. 3.

Referring to FIG. 3, the processor 170 of the display apparatus 100 calculates the position of a first user (S310). As illustrated in FIG. 1, the processor 170 can receive an image captured by the camera 195 disposed above the display 180 that sits horizontally like a table top and may calculate the position of a user based on the captured image.

Figure 4A:
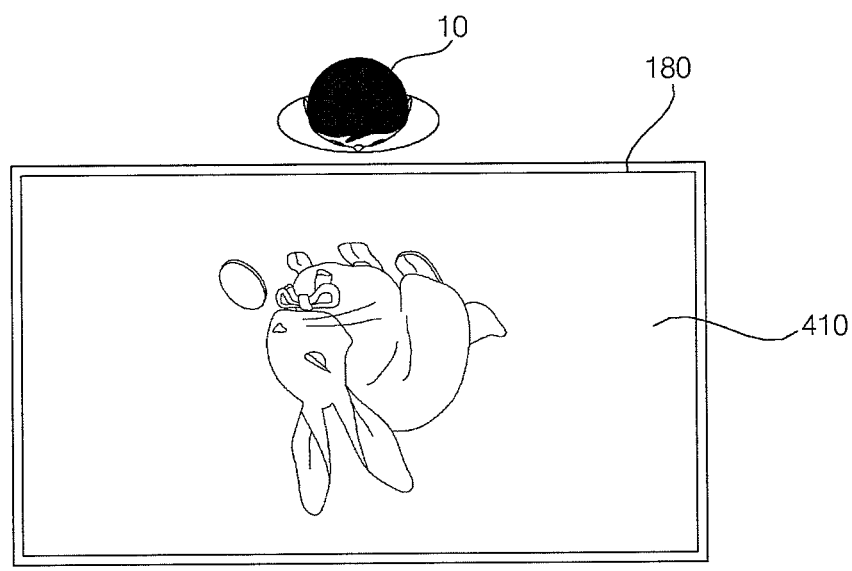
FIGS. 4A to 20C are overviews illustrating the method for operating the display apparatus illustrated in FIG. 3.

Referring to FIG. 4A, if a first user 10 is located on one side (hereinafter, referred to as an upper side) of the horizontally placed display 180, the processor 170 can calculate the position of the first user 10 based on an image captured by the camera 195.

In addition to the position of the first user 10, the processor 170 can recognize the first user 10. For example, the processor 170 can recognize the first user 10 by matching the first user 10 to user images stored in a database using a facial recognition algorithm, an iris recognition algorithm, etc.

Subsequently, the processor 170 can displays first content on the display 180 in correspondence with the position of the first user (S315). After recognizing the first user 10 and determining the position of the first user 10, the processor 170 can display the first content in correspondence with the position of the first user 10. The first content may be displayed automatically after the first user 10 is recognized and located, or may be displayed in response to a content display input.

FIG. 4A illustrates an example of displaying image-based first content 410 in correspondence with the position of the first user 10. Particularly, the imaged-based first content 410 is rotated by 180 degrees according to the position of the first user 10 so that the first user 10 can view the content 410 conveniently.

The first user 10 can perform various tasks such as movement, zoom-in/zoom-out, combining, etc. on the first content 410 by applying a touch input or the like to the display 180. The processor 170 then calculates the position of a second user (S320).

If a second user 20 appears while the first user 10 is using the display apparatus 100 from behind the display apparatus 100, the processor 170 can calculate the position of the second user 20 based on an image captured by the camera 915. The processor 170 can recognize the second user 20 as well as locate the second user 20.

Figure 4B:
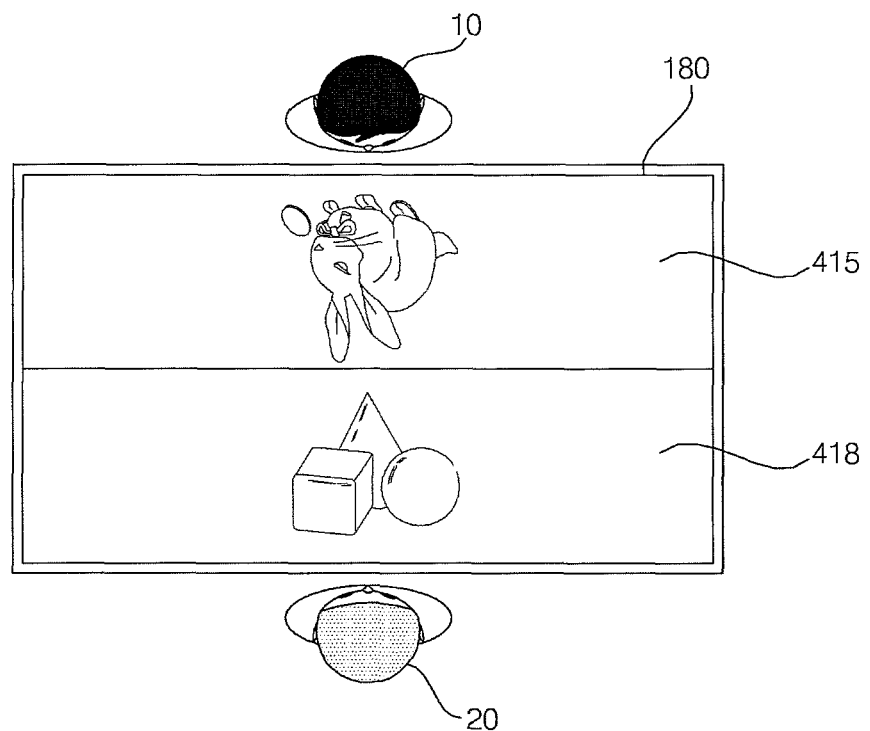

Referring to FIG. 4B, the second user 20 is on the opposite side (hereinafter, referred to as a lower side) of the horizontally placed display 180 to the first user 10. The processor 170 can display second content on the display 180 in correspondence with the position of the second user (S325). The processor 170 also changes a display area of the first content, taking into account the position of the second user (S330).

After recognizing and locating the second user 20, the processor 170 can display the second content on the display 180 in correspondence with the position of the second user 20. The second content may be displayed automatically after the second user 20 is recognized and located, or may be displayed in response to a content display input.

Further, the processor 170 can change the display area of the first content according to the position of the second user.

For example, the processor 170 can change at least one of the size or position of the display area of the first content so that the display area of the second content is not overlapped with the display area of the first content.

Referring to FIG. 4B, image-based second content 418 is additionally displayed in correspondence with the position of the second user 20. Particularly, the image-based second content 418 is displayed as being scaled-down in correspondence with the position of the second user 20 located across the first user 10. Therefore, the second user 20 can view the second content 418 conveniently.

Simultaneously with the display of the second content 418, the first content 410 illustrated in FIG. 4A is preferably scaled down. In FIG. 4B, the first content 410 is vertically scaled down to first content 415 and the vertically scaled-down first content 415 is displayed in correspondence with the position of the first user 10. Accordingly, the first user 10 can view the first content 415 without overlap with the second content 418.

Figure 5A:

Compared to FIG. 4A, FIG. 5A illustrates the first user 10 on a left side of the horizontally placed display 180. Therefore, the image-based first content 410 can be displayed rotated counterclockwise by 90 degrees.

Figure 5B:
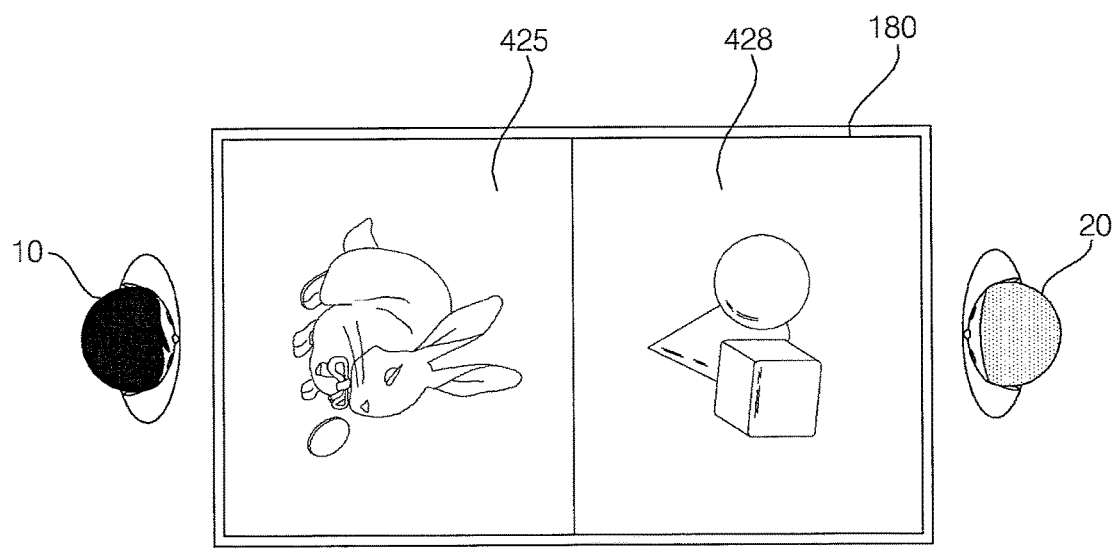

In FIG. 5B, the second user 20 is additionally located on a right side of the horizontally placed display 180. Thus, the image-based second content is horizontally scaled down and rotated clockwise by 90 degrees. The resulting second content 428 is displayed in front of the second user 20. Additionally, the first content 410 illustrated in FIG. 5A may be horizontally scaled down to first content 425 and the first content 425 may be displayed in front of the first user 10.

If the second user moves, the processor 170 can change the display position of the second content along with the movement of the second user. Further, the processor 170 can change at least one of the size or position of the display area of the first content so that the changed display area of the second content is not overlapped with the display area of the first content.

In FIG. 5C, with the first user 10 on the left side of the horizontally placed display 180, the second user 20 moves from the right side of the display 180 to the lower side of the display 180. The processor 170 can trace the movement of the second user 20 based on an image captured by the camera 195 and may change the position of the display area of the second content in correspondence with the position of the second user.

Referring to FIG. 5C, the second content 428 displayed in a right part of the display 180 in FIG. 5B is rotated counterclockwise by 90 degrees and displayed in a lower right part of the display 180. Therefore, the second user 20 can readily view second content 515 in spite of the second user's movement. In addition, the first content 510 is displayed in correspondence with the position of the first user 10 on the left side of the horizontally placed display 180 in FIG. 5C.

Figure 5D:
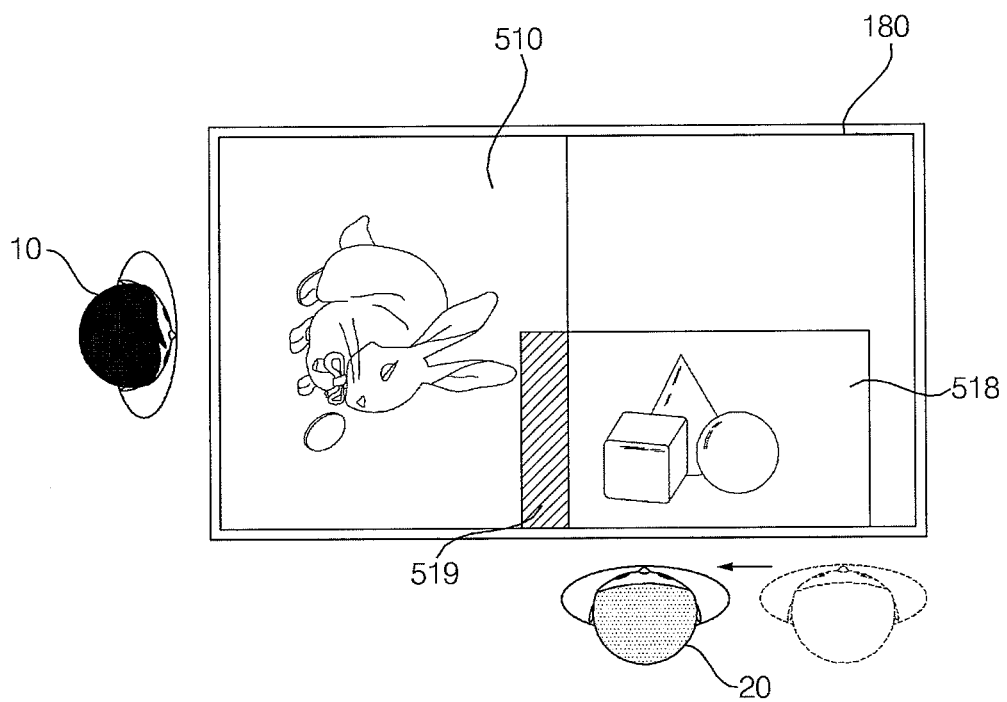

Referring to FIG. 5D, the second user 20 moves further to the left from where the second user 20 stays in FIG. 5C. Accordingly, the processor 170 can display second content 518 moved further to the left.

As a result, the first content 510 and the second content 518 may overlap with each other over an overlap area 519. To eliminate the overlap area 519, the processor 170 can change the display size or position of at least one of the first content 510 or the second content 518.

For example, the processor 170 can assign a weight to the moved second content 518 to thereby change the display size or position of the first content 510. Or the processor 170 can assign a weight to the displayed first content 510 to thereby change the display size or position of the second content 518.

Figure 5E:
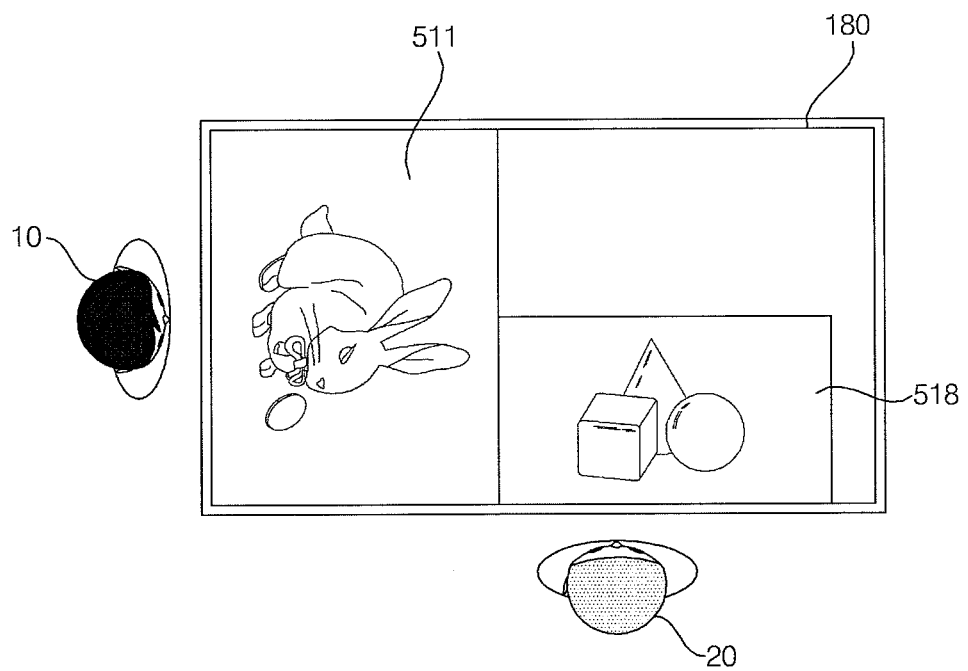

Referring to FIG. 5E, the size of the first content 510 is changed. Specifically, the processor 170 can change the display size of the first content 510 in correspondence with a movement direction of the second user 20. Therefore, the resulting first content 511 does not overlap with the second content 518.

Figure 6A:
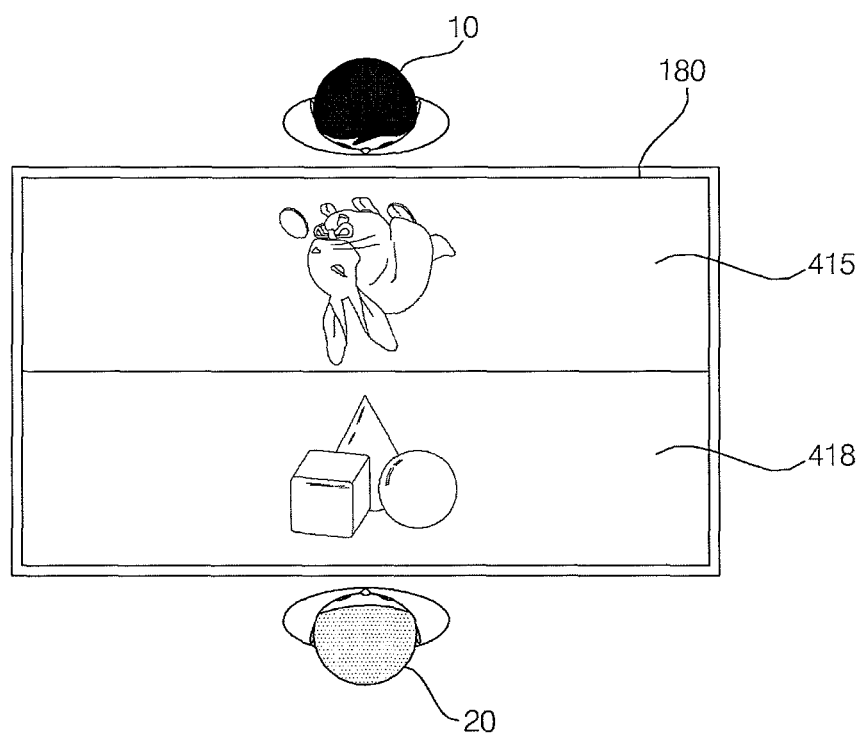

Referring to FIG. 6A, the first user 10 and the second user 20 are located on the upper and lower sides of the display 180, respectively and thus the first content 415 and the second content 418 are displayed separately in upper and lower parts of the display 180.

Figure 6B:
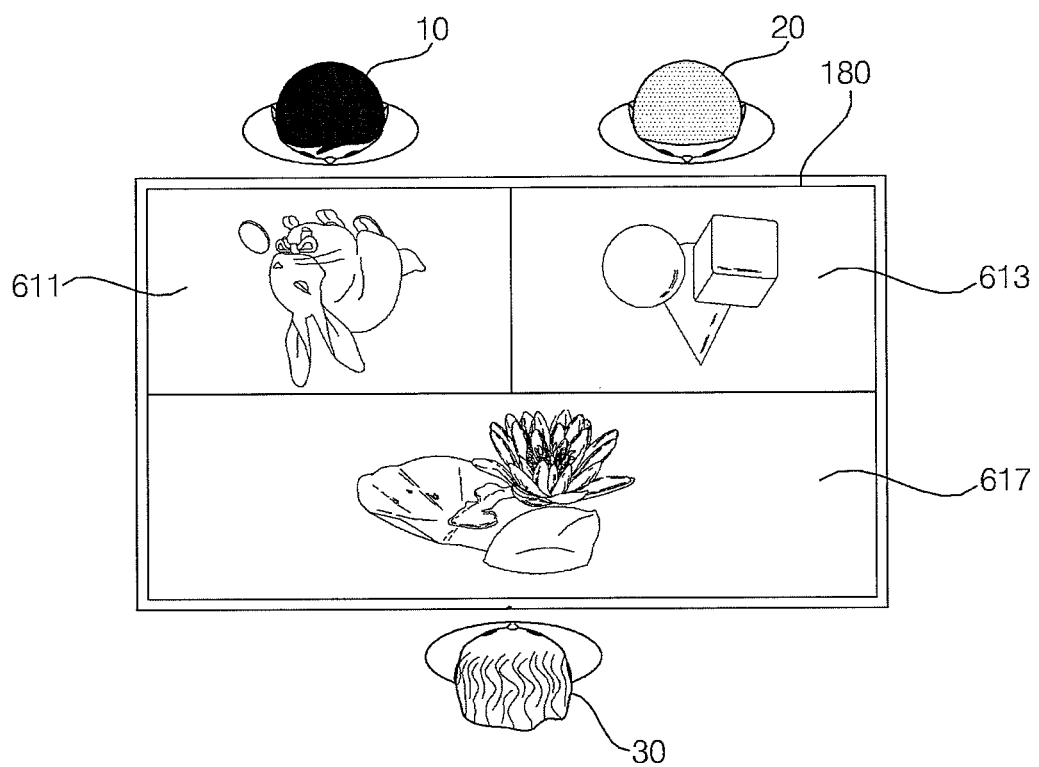

Referring to FIG. 6B, the first user 10 and the second user 20 are located on the upper side of the display 180, the second user 20 to the left of the first user 10 and a third user 30 is located on the lower side of the display 180. Thus first content 611 and second content 613 are displayed separately in upper left and top right parts of the display 180, whereas third content 617 is displayed in the lower part of the display 180.

Figure 7A:
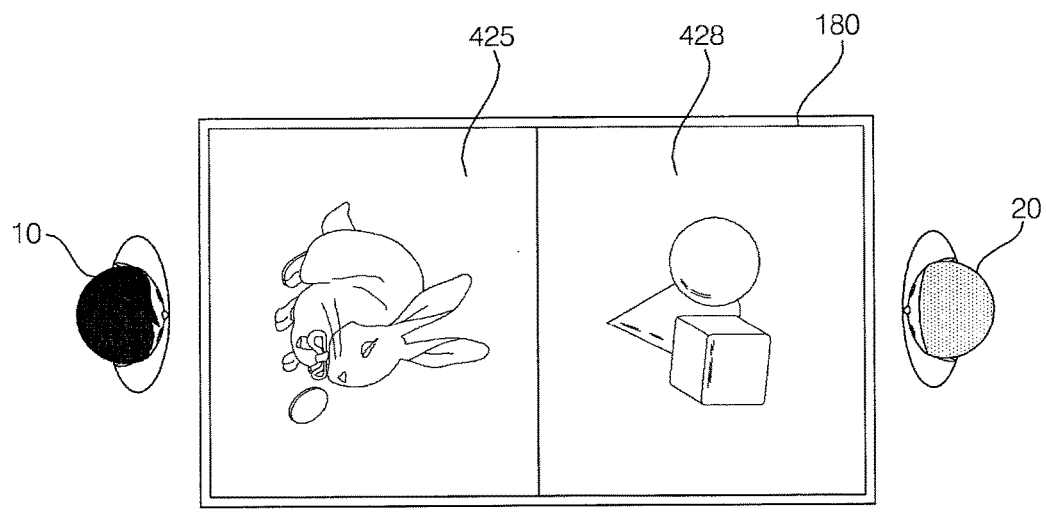

Referring to FIG. 7A, the first user 10 and the second user 20 are located on the left and right sides of the display 180, respectively, and the first content 425 and the second content 428 are displayed separately in the left and right parts of the display 180.

Figure 7B:
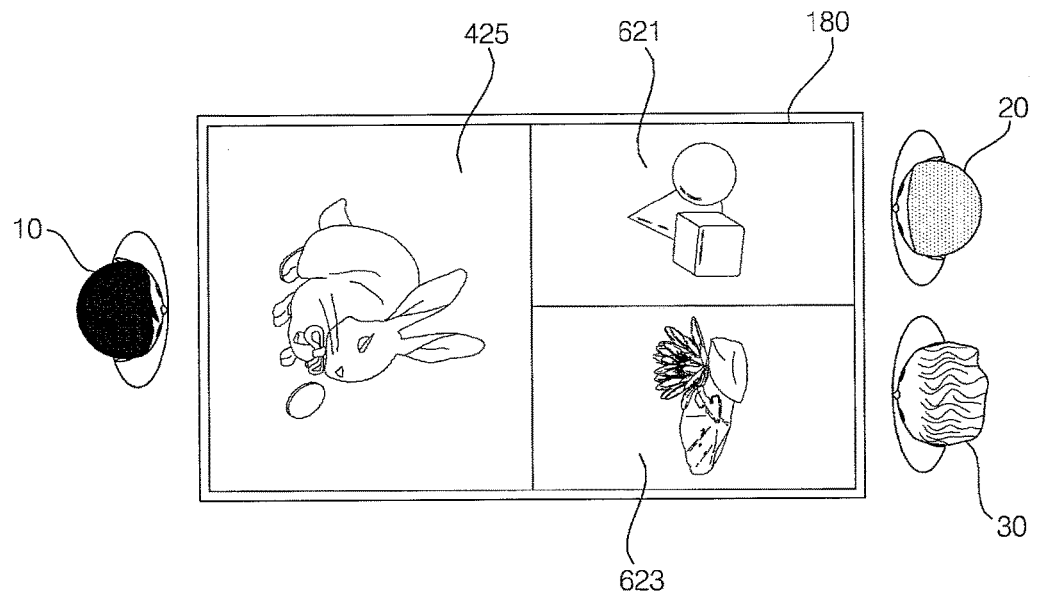

Referring to FIG. 7B, the first user 10 is located on the left side of the display 180, whereas the second user 20 and the third user 30 are located respectively on a right upper side and a right lower side of the display 180. Accordingly, the first content 425 is displayed in the left part of the display 180, whereas second content 621 and third content 623 are displayed respectively in a right upper part and a right lower part of the display 180.

Figure 7C:
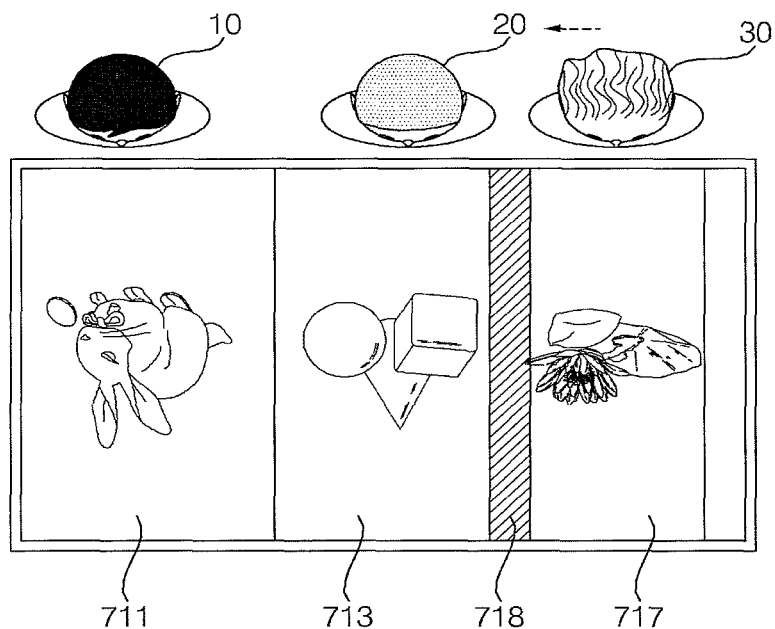

Referring to FIG. 7C, the first, second, and third users 10, 20, and 30 are located from left to right in this order on the upper side of the display 180. When the third user 30 moves toward the second user 20, that is, to the left as viewed from across the third user 30, an overlap area 718 is created between second content 713 and third content 717 among first content 711, the second content 713, and the third content 7171 that are displayed side by side on the display 180.

The processor 170 can change the display size or position of the second content 713 or the display size of the third content 717 in order to eliminate the overlap area 718. For example, the processor 170 can control movement of the display position of the second content 713 illustrated in FIG. 7C further to the left or reduction of the display size of the second content 713. In another example, the processor 170 can control reduction of the display size of the third content 717.

Meanwhile, upon receipt of an input to move the first content, the processor 170 can control movement of the first content or a part of the first content in correspondence with the position of the second user and display the moved first content or the moved part of the first content on the display 180.

Figure 8A:
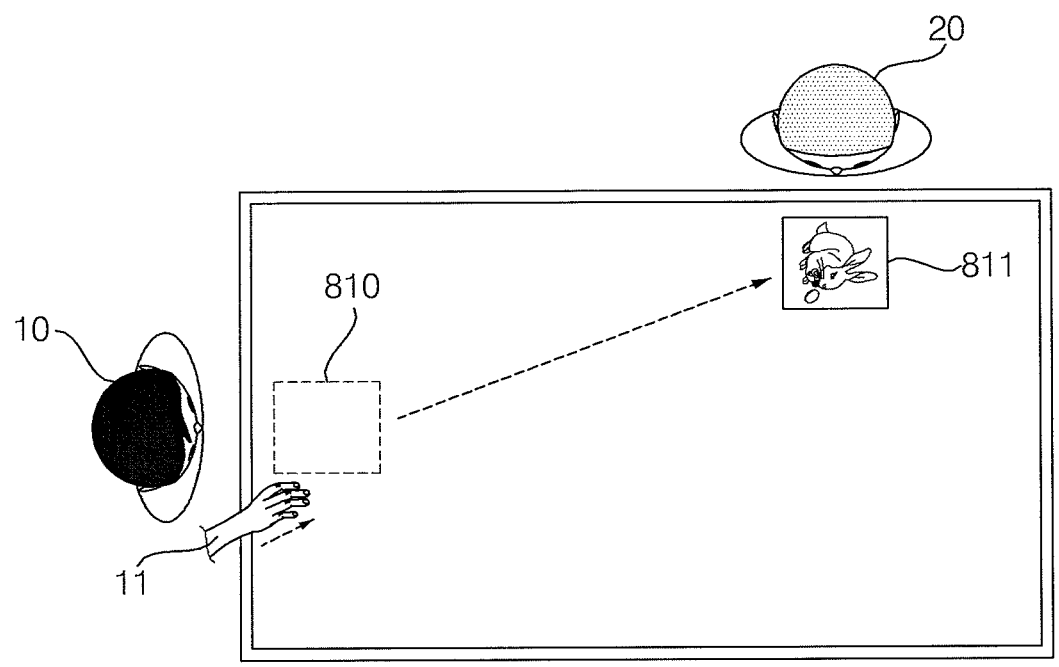

Referring to FIG. 8A, with the first user 10 located on the left side of the display 180 and the second user 20 located on an upper right side of the display 180, if the first user 10 makes an input to move displayed first content 810 to the right with the right hand 11, the first content 810 is moved. Thus, the moved first content 811 can be displayed in an upper right part of the display 180. The right move input may be a touch-based right drag input on the display 180, a touch-based right flick input on the display 180, or a gesture-based right move input.

Figure 8B:
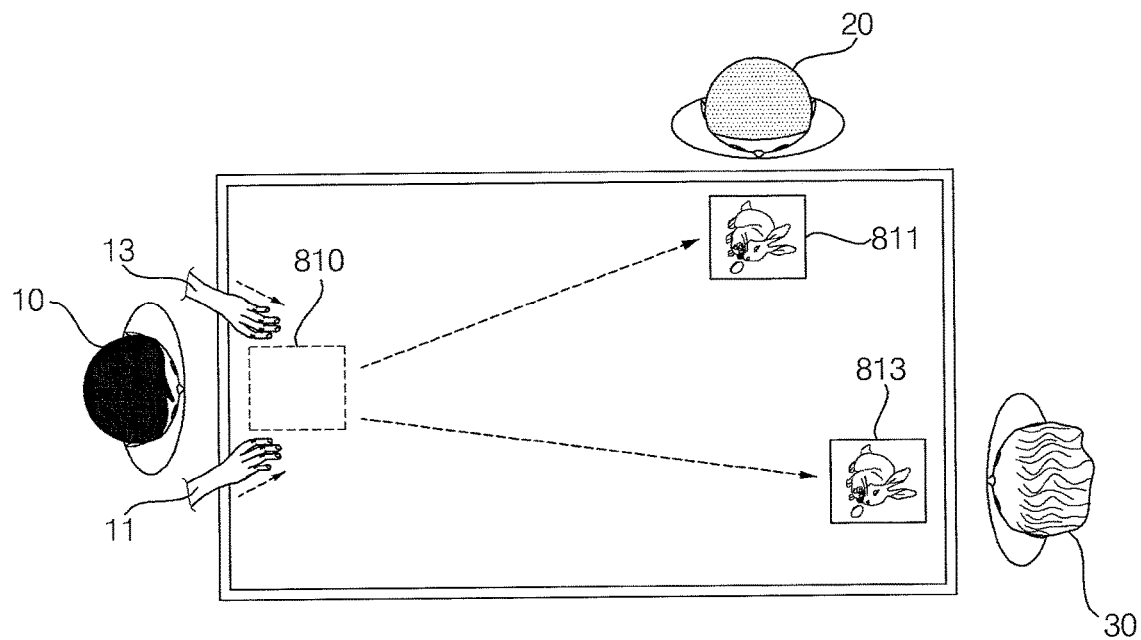

FIG. 8B is an overview illustrating the user using right and left hands 11 and 13 to move the content 810 to users 20 and 30 so as to display moved content 811 and 813. A copy command may also be performed to send copies to the users 20 and 30.

Further, upon receipt of an input to display a mini map for the first content, the processor 170 can display the mini map on the display 180. Upon receipt of an input to move a part of a mini map, the processor 170 can control movement of a part of the first content corresponding to the part of the mini map and display the moved part of the first content.

Upon receipt of an input to zoom a mini map, the processor 170 can control zoom-in or zoom-out of the mini map and display the zoomed-in or zoomed-out mini map on the display 180.

Figure 9A:
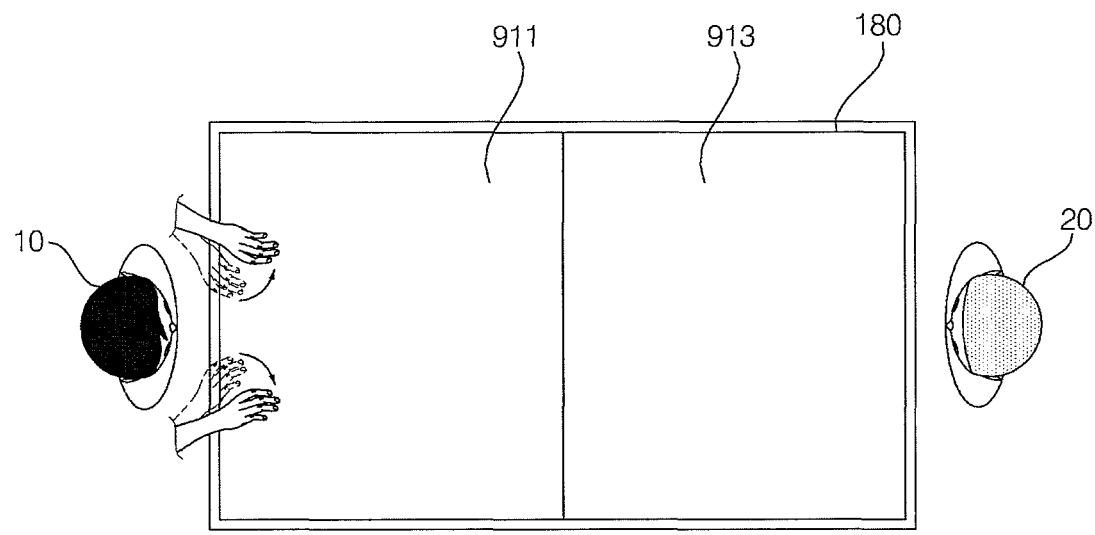
Figure 9A:
Figure 9A:
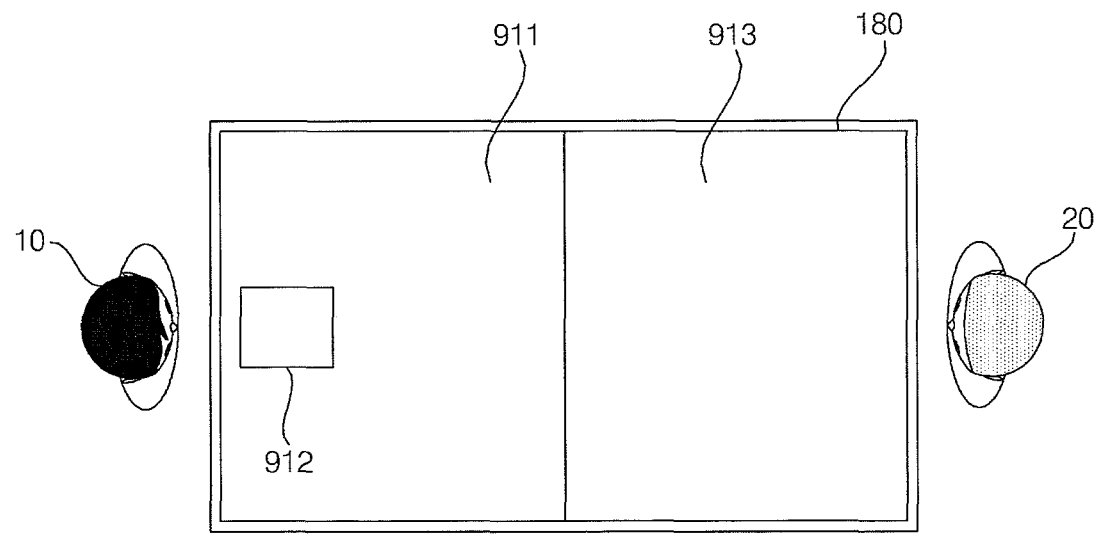

Referring to FIGS. 9A(a) and (b), as the first user 10 and the second user 20 are located respectively on the left and right sides of the display 180, first content and second content are displayed separately in correspondence with the positions of the first and second users 10 and 20.

Upon receipt of an input to display a mini map for the first content, the processor 170 can display a mini map 912 for the first content on the display 180. If the first user 10 touches the display 180 with both hands, the mini map 912 may be displayed over the first content. Or the mini map 912 may be displayed apart from the first content.

The mini map 912 is smaller than the first content in display size. To facilitate a user's manipulation, the mini map 912 may be displayed in correspondence with the position of the user's hand.

Figure 9B:
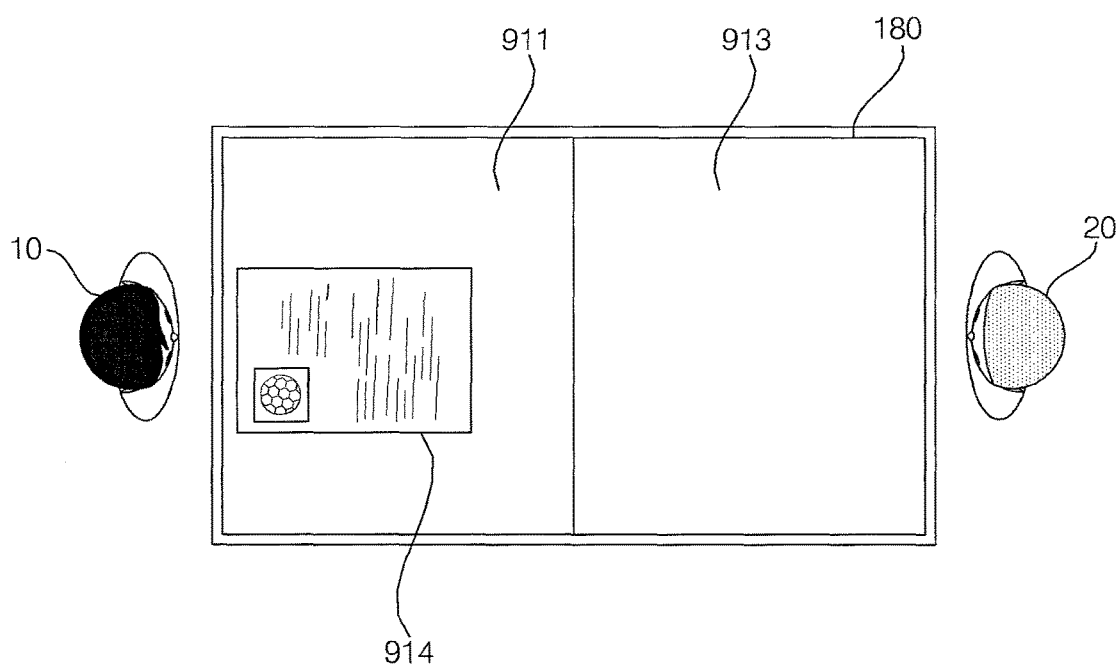

Referring to FIG. 9B, an enlarged mini map 914 is displayed in response to an input to zoom in a mini map. The enlarged mini map 914 includes a text area and an image area, by way of example.

Figure 9C:
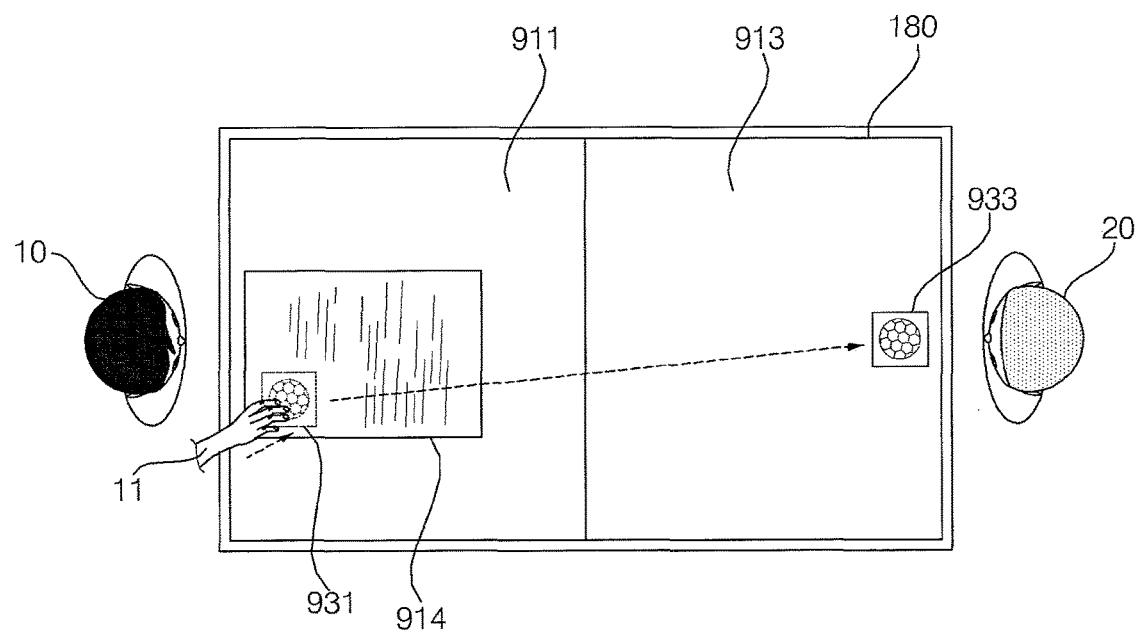

Referring to FIG. 9C, if the first user 10 selects a specific area of the enlarged mini map 914 and makes an input to move the specific area, the specific area is moved. Specifically, if the first user 10 selects an image area 931 of the enlarged mini map 914 and makes a right move input for the image area 931, the processor 170 can control movement of the image area 931 and thus display of a moved image area 933 in correspondence with the position of the second user 20. Therefore, an image area, that is, a content part that the first user wants to share can be transferred to the second user, thereby increasing user convenience.

Content may move at different speeds in different areas. In the case of a right move input for the image area 931, the processor 170 can set the image area 931 to move faster in a first area 911 for the first content corresponding to the position of the first user 10 than in a second area 913 for the second content corresponding to the position of the second user 20. According to this setting, if the second user 20 makes a gesture of grabbing the moving content, a user-friendly user interface is created.

Upon receipt of an input to combine at least two of a plurality of first content items displayed in correspondence with the position of the first user, the processor 170 can control combining of the first content items and display of the combined first content items.

Figure 10A:
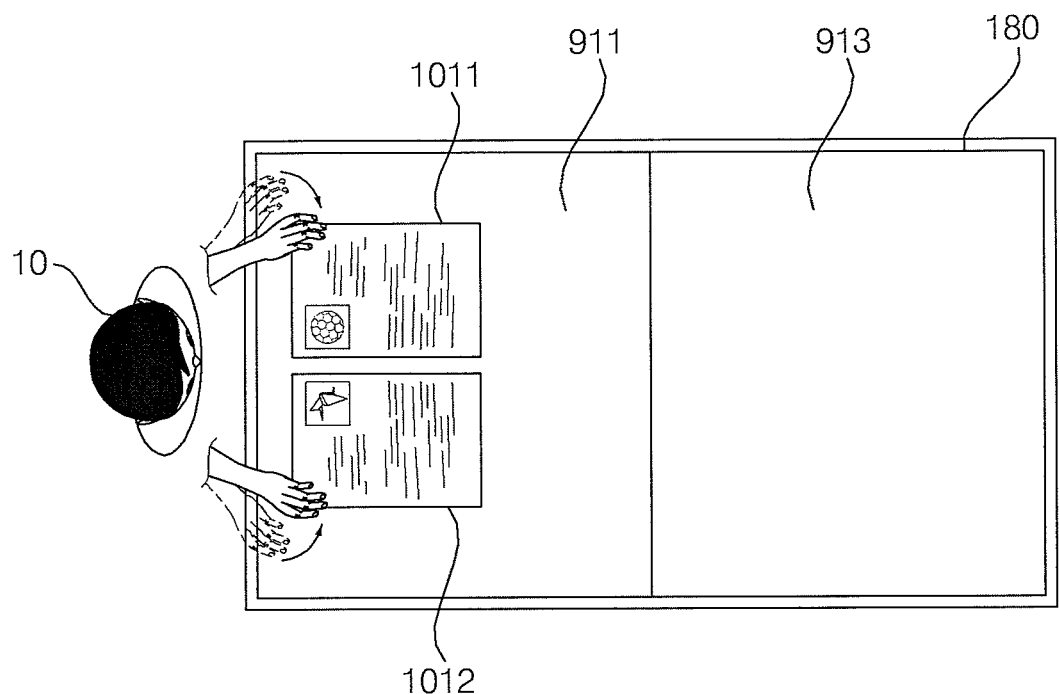

Referring to FIG. 10A, the first user 10 makes an input to combine a plurality of content items 1011 and 1012 displayed in correspondence with the position of the first user 10. In this instance, the processor 170 can combine the plurality of content items 1011 and 1012. That is, the content items 1011 and 1012 displayed apart from each other may be combined into one content item.

Figure 10B:
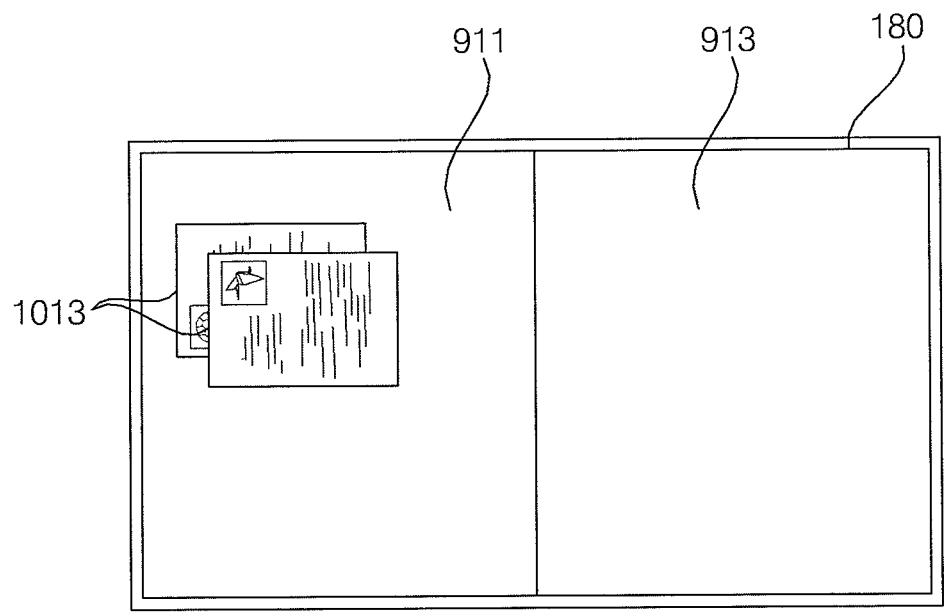

Referring to FIG. 10B, combined content items 1013 are displayed overlapped. A predetermined time later, the overlapped content items are combined into one file.

Figure 10C:
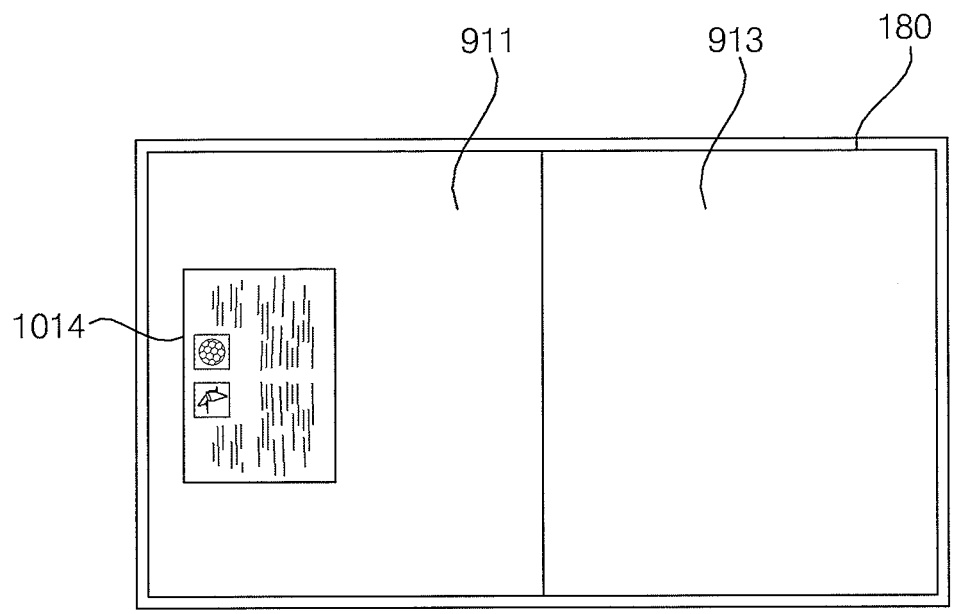

Referring to FIG. 10C, content 1014 combined into one file or one page is displayed. Thus, a user may manage content items efficiently by combining the content items. If content items are different, the content items may be combined into one file or one page as illustrated in FIGS. 10A, 10B, and 10C. Further, if content items are identical, the content items may not be combined.

Figure 11A:
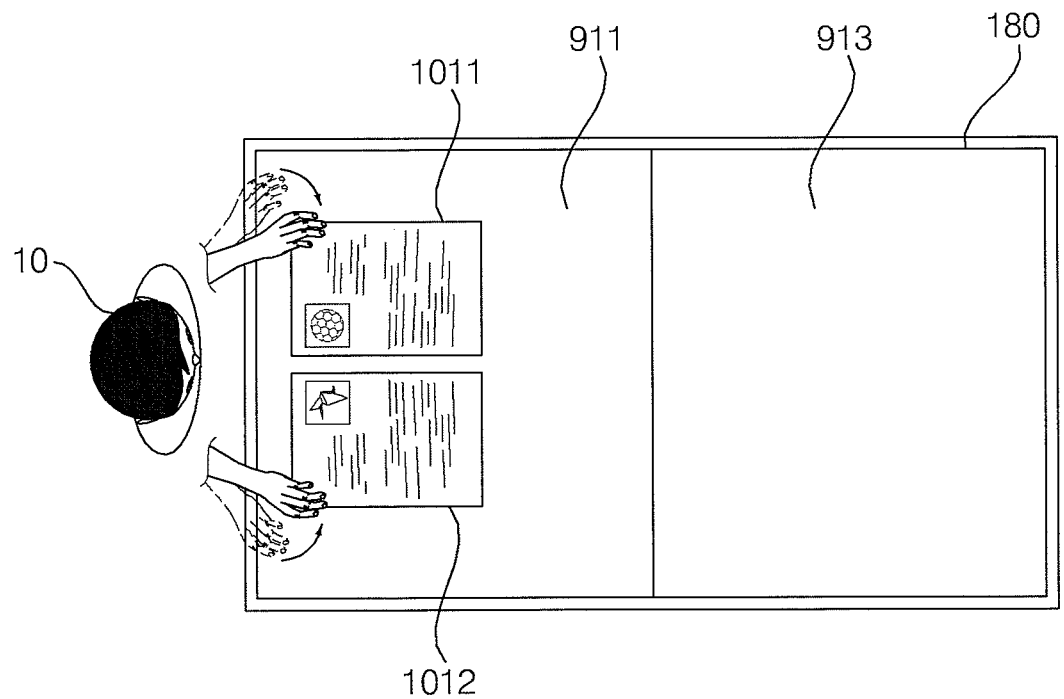

Referring to FIG. 11A, the first user 10 makes an input to combine the plurality of content items 1011 and 1012 displayed in correspondence with the position of the first user 10, as illustrated in FIG. 10A. In this instance, the processor 170 can combine the plurality of content items 1011 and 1012. That is, the plurality of content items 1011 and 1012 displayed apart from each other may be combined into one content item.

Figure 11B:
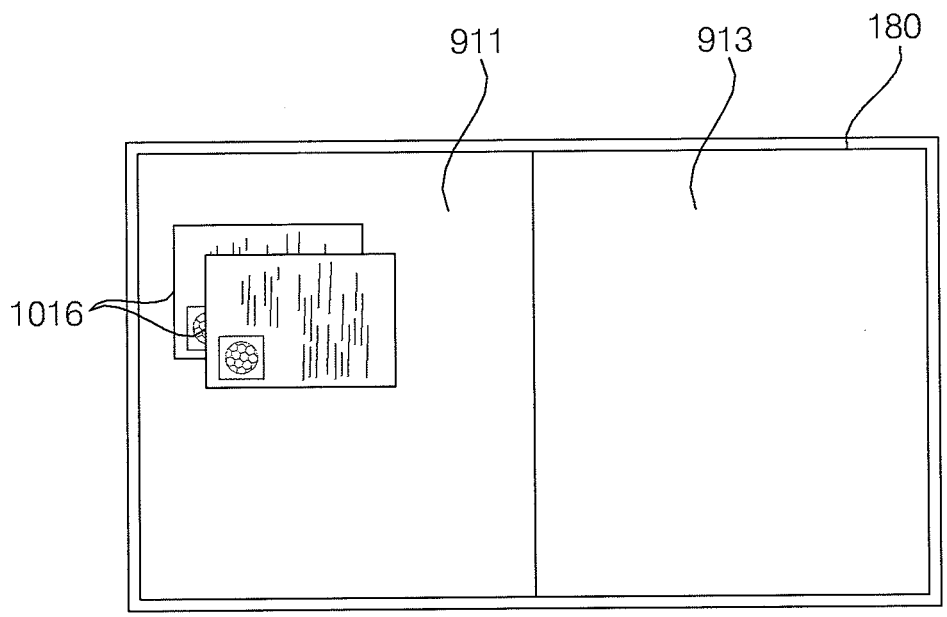
Figure 11C:
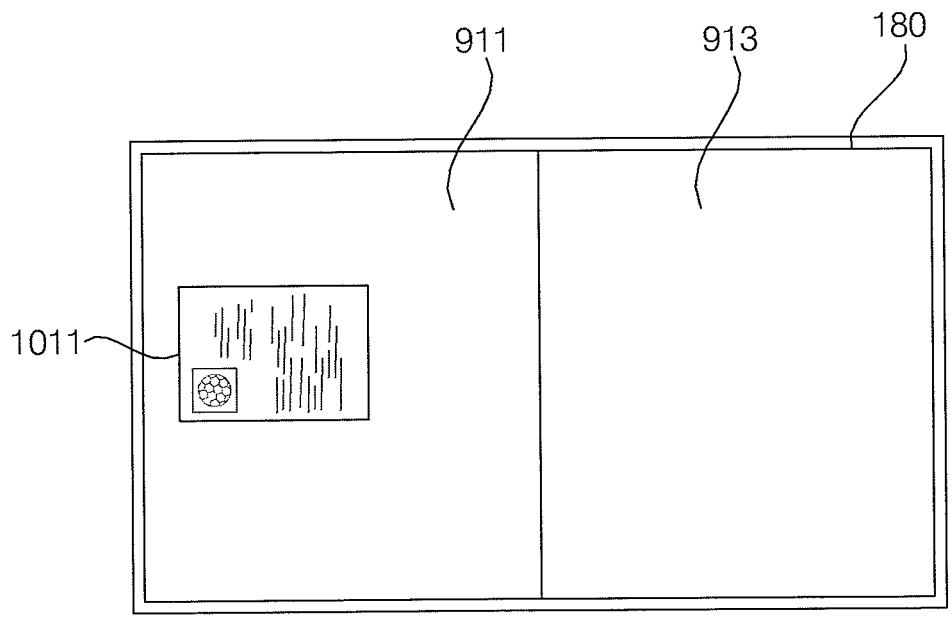

Referring to FIG. 11B, combined content items 1016 are displayed overlapped. Referring to FIG. 11C, for the same content, one content item 1011 remains, while the other content item 1012 disappears, rather than the content items 1011 and 1012 are combined into one file or one page.

The processor 170 can display a copy of the first content in correspondence with the position of the second user and upon receipt of an edit input from the second user, may edit the copy of the first content.

Further, the processor 170 can display an edited copy of the first content or a copy of the edited copy of the first content in correspondence with the position of the first user. During editing, the copy of the first content or the copy of the copy of the first content may not be editable to the first user.

Figure 12A:
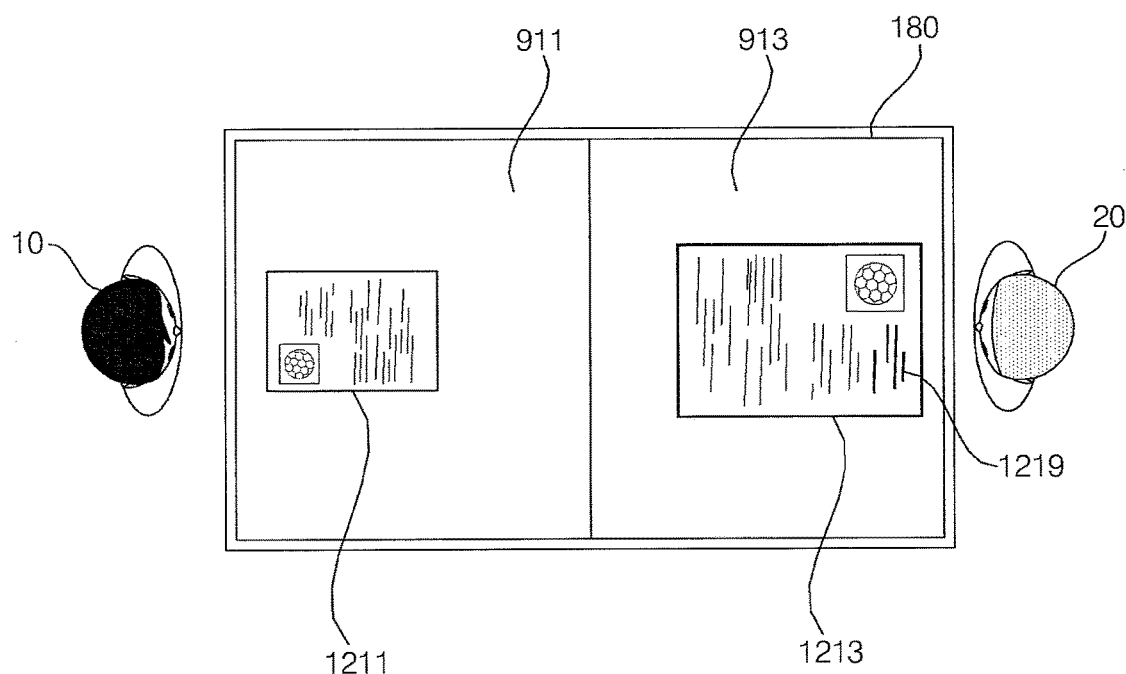

Referring to FIG. 12A, first content 1211 and a copy 1213 of the first content are displayed respectively in correspondence with the positions of the first user 10 and the second user 20 respectively on the left and right sides of the display 180.

Particularly, the copy 1213 of the first content displayed in front of the second user 20 can be moved and displayed, in response to a content movement input in a similar manner to in FIGS. 9A, 9B, and 9C, or in response to a content edit input from the second user 20.

To edit the first content, the second user 20 can zoom in the copy of the first content. Thus, in FIG. 12A, the copy 1213 of the first content is displayed larger than the first content 1211. Additional content may be added to the copy 1213 of the first content by an edit input of the second user 20. While text 1219 is added to the copy 1213 of the first content in FIG. 12A, various types of data including an image, an audio, a Web address, and the like may be added.

The processor 170 can display the copy of the first content or a copy of the copy of the first content, which is being edited or has been completely edited, in correspondence with the position of the first user, so that the first user may view the content edited by the second user.

Figure 12B:
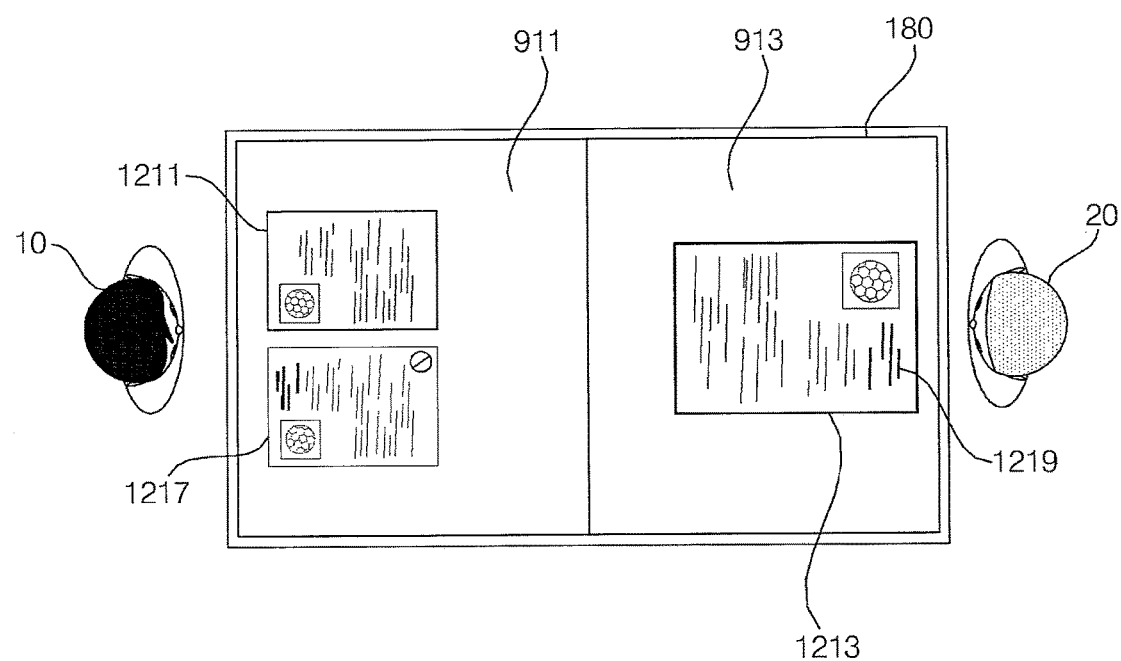

Referring to FIG. 12B, a copy 1217 of the copy of the first content under editing and the first content 1211 are displayed side by side. The copy 1217 of the copy of the first content may not be editable to the first user 10 and thus a lock object indicating uneditable may be displayed. After the second user 20 finishes editing the content, the copy 1217 of the copy of the first content may be editable to the first user 10.

Therefore, the first user can readily view content which is being edited or has been edited completely. After the editing, the first content 1211 and the copy 1217 of the copy of the first content may be combined. That is, as illustrated in FIGS. 10A, 10B, and 10C, upon receipt of a combine input, the copy 1217 of the copy of the first content that contains a changed part may remain, while the first content 1211 may be removed. Accordingly, the updated first content may be stored or displayed.

The positions of the first and second users may be determined through mobile terminals of the first and second users, instead of the camera 195. For example, if the display apparatus 100 includes the sensor unit 150 that senses a touch with a mobile terminal, particularly, if the sensor unit 150 includes a pressure touch sensor, the processor 170 can sense a pressure applied by the mobile terminal and thus may locate a user of the mobile terminal.

In another example, if the sensor unit 150 includes a capacitive touch sensor, the processor 170 can locate the user by sensing a variation in capacitance caused by the mobile terminal. After locating a user, the processor 170 can perform pairing between the display apparatus 100 and a mobile terminal of the user, receive device information or user information about the mobile terminal through the communication unit 120, and recognize the user based on the received information.

Or if the mobile terminal approaches within a predetermined distance, the processor 170 can receive device information, user information, etc. from the mobile terminal through the communication unit 120 and may recognize and locate the user of the mobile terminal. When the mobile terminal is within the predetermined distance, the processor 170 can control data exchange with the mobile terminal by Near Field Communication (NFC).

Now, embodiments of the present invention for sensing a touch made by a mobile terminal through the sensor unit 150, receiving device information or user information about the mobile terminal through the communication unit 120, and recognizing a user of the mobile terminal based on the received information will be described below.

Figure 13A:
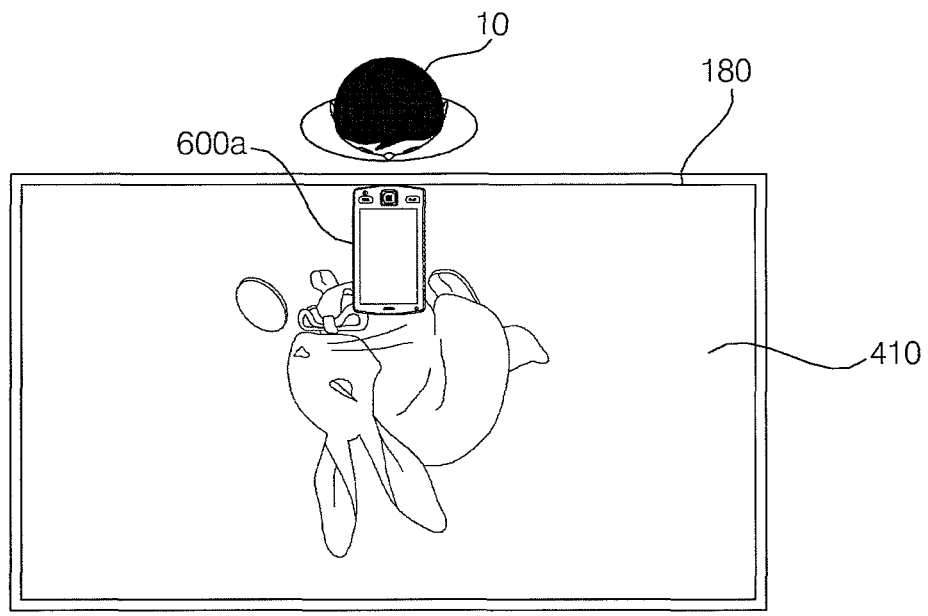

FIGS. 13A to 18B illustrate an operation for locating and recognizing a user through the sensor unit 150 and the communication unit 120. Referring to FIG. 13A, the first user 10 places a first mobile terminal 600*a* on the upper part of the horizontally placed display 180.

The processor 170 can calculate the position of the first mobile terminal 600*a* through the sensor unit 150 and estimate (or calculate) the position of the first user 10 based on the position of the first mobile terminal 600*a*.

Meanwhile, the processor 170 can perform pairing between the display apparatus 100 and the first mobile terminal 600*a* through the communication unit 120 and may identify the first mobile terminal 600*a* as used by the first user 10 based on device information or user information received from the first mobile terminal 600*a*.

Accordingly, the processor 170 can display the image-based first content 410 in correspondence with the position of the first user 10. The first content 410 may be content stored in the first mobile terminal 600*a*. For example, the first content 410 may be latest reproduced content, favorite content, or user-set content.

Figure 13B:
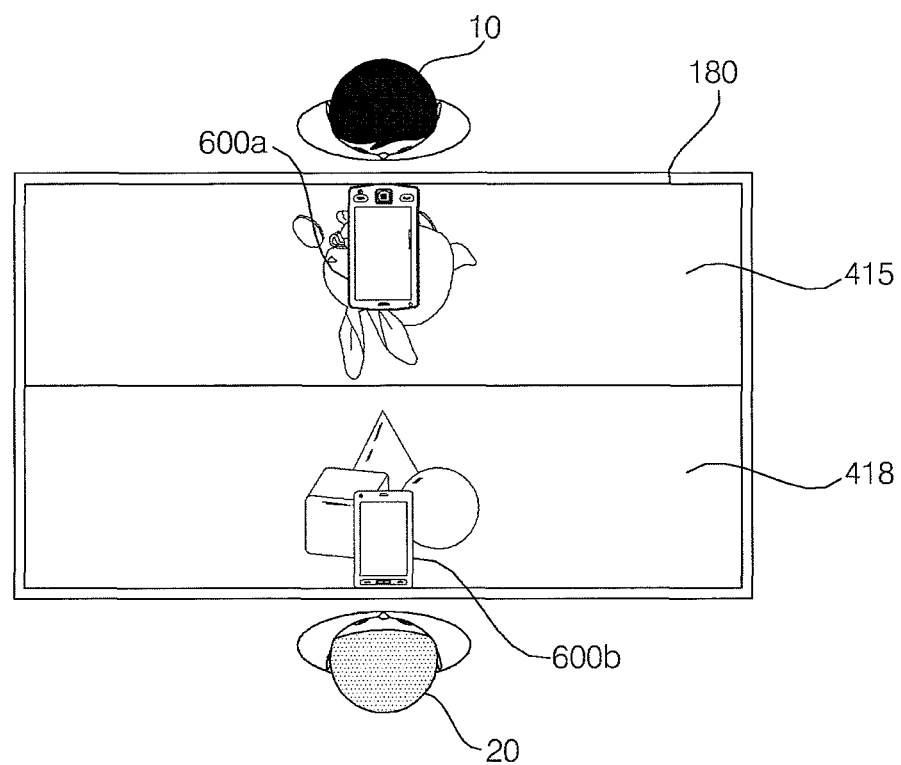
Figure 14A:
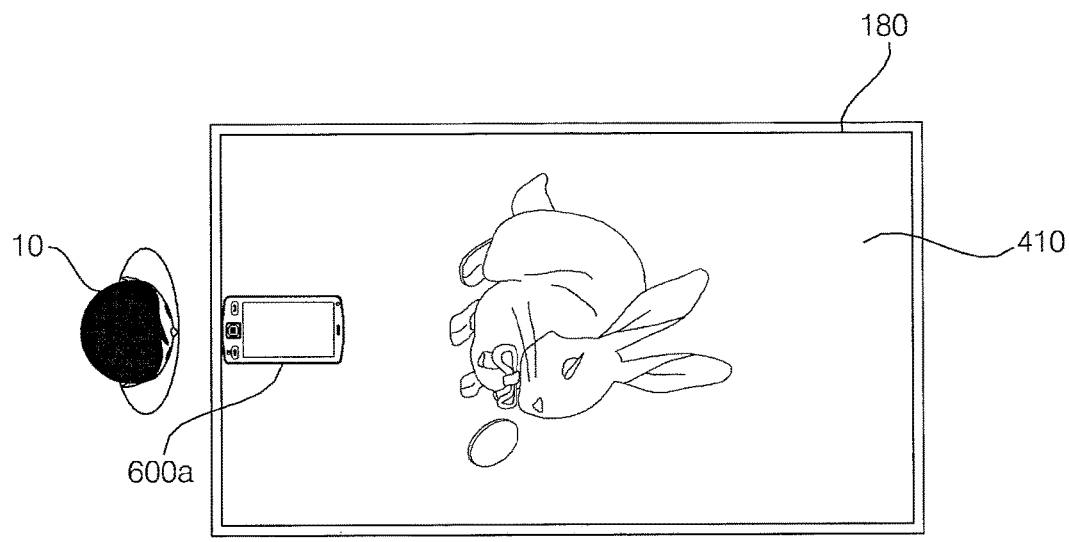
Figure 14B:
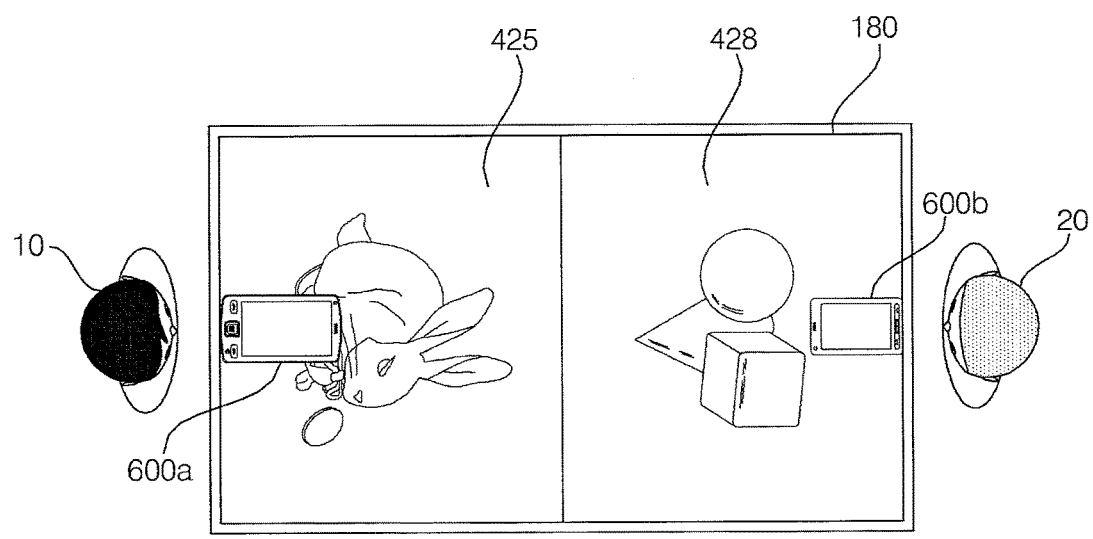
Figure 14C:
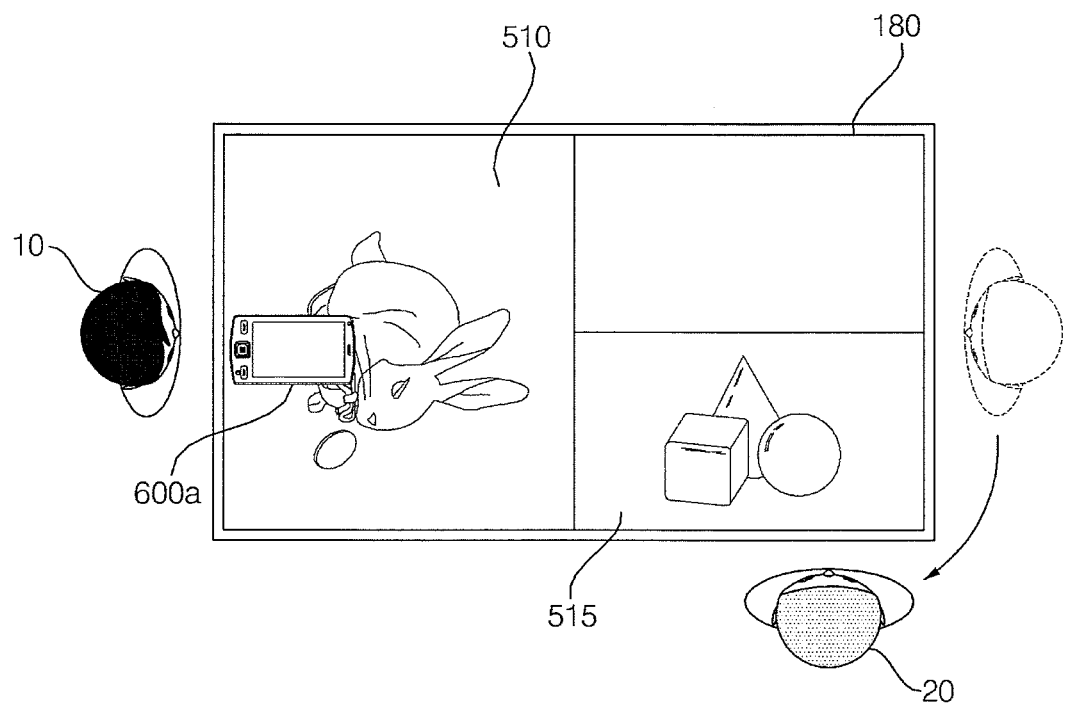
Figure 14D:
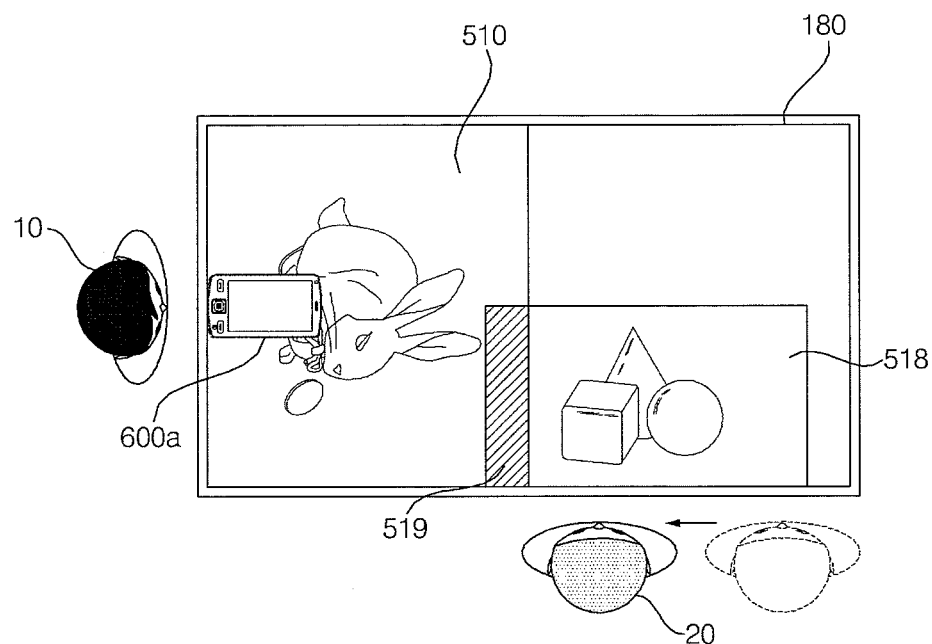
Figure 14E:
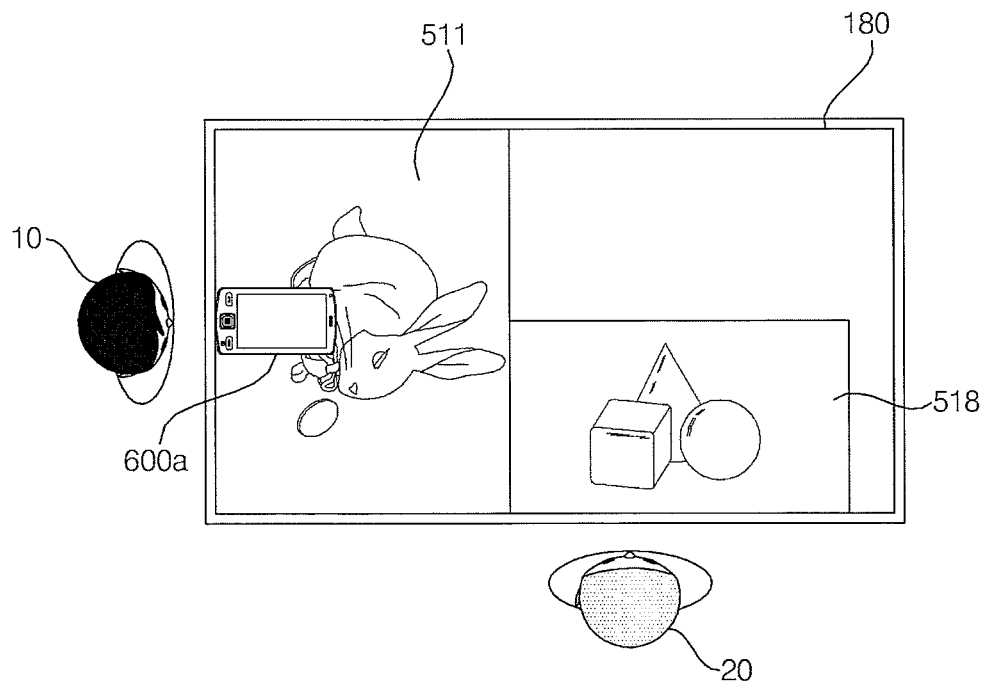

Referring to FIG. 13B, with the mobile terminal 600*a* placed on the upper part of the display 180, a second mobile terminal 600*b* of the second user 20 is placed on the lower part of the display 180.

The processor 170 can calculate the position of the second mobile terminal 600*b* through the sensor unit 150 and estimate (or calculate) the position of the second user 20 based on the position of the second mobile terminal 600*b*.

Meanwhile, the processor 170 can perform pairing between the display apparatus 100 and the second mobile terminal 600*b* through the communication unit 120 and may identify the second mobile terminal 600*b* as used by the second user 20 based on device information or user information received from the second mobile terminal 600*b*.

Accordingly, the processor 170 can display the image-based second content 418 in correspondence with the position of the second user 20. The second content 418 may be content stored in the second mobile terminal 600*b*. For example, the second content 418 may be latest reproduced content, favorite content, or user-set content.

Along with displaying the second content 418, the first content 410 displayed in FIG. 13A is preferably scaled down. In FIG. 13B, the vertically scaled-down first content 415 is displayed in correspondence with the position of the first user 10. Thus, the first user 10 can view the first content 415 without overlap with the second content 418.

Operations illustrated in FIGS. 14A to 14E are similar to the operations illustrated in FIGS. 5A to 5E except that a user is recognized and located. Thus, a further description of the operations illustrated in FIGS. 14A to 14E is not provided.

Figure 15A:
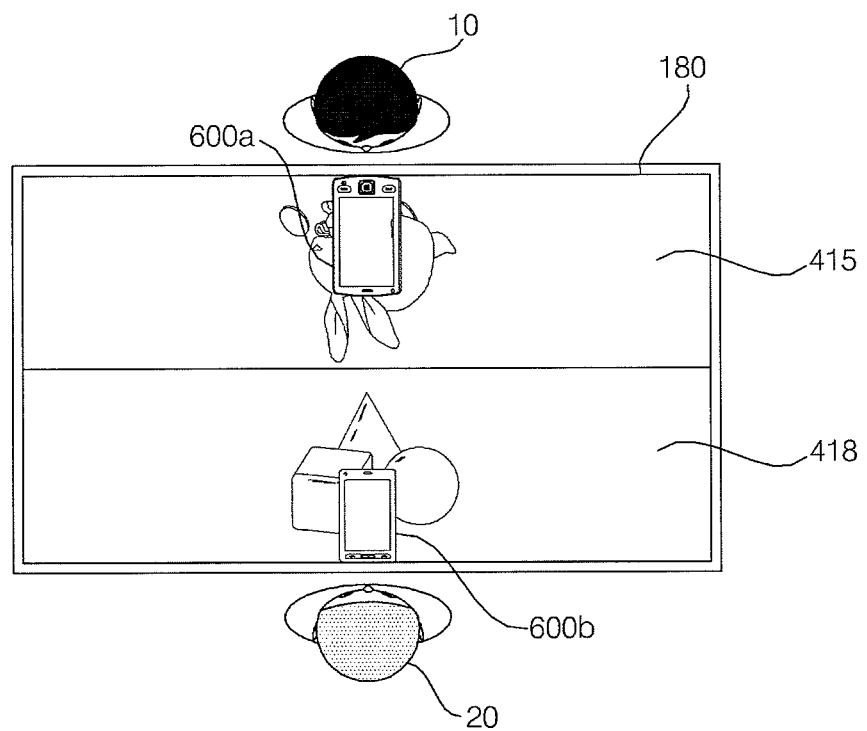
Figure 15B:
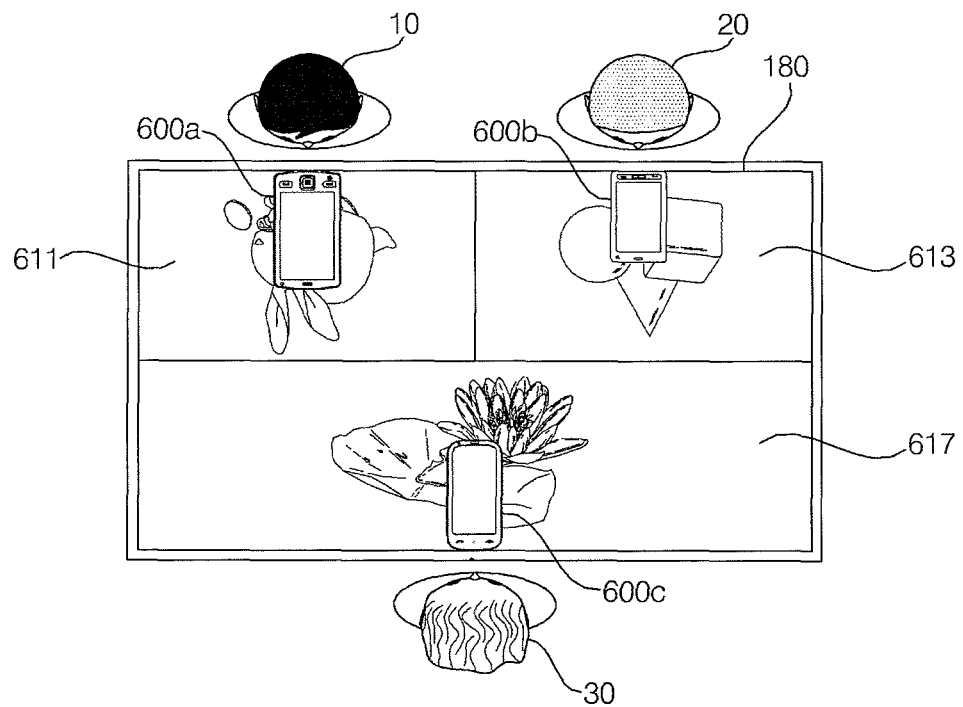
Figure 16A:
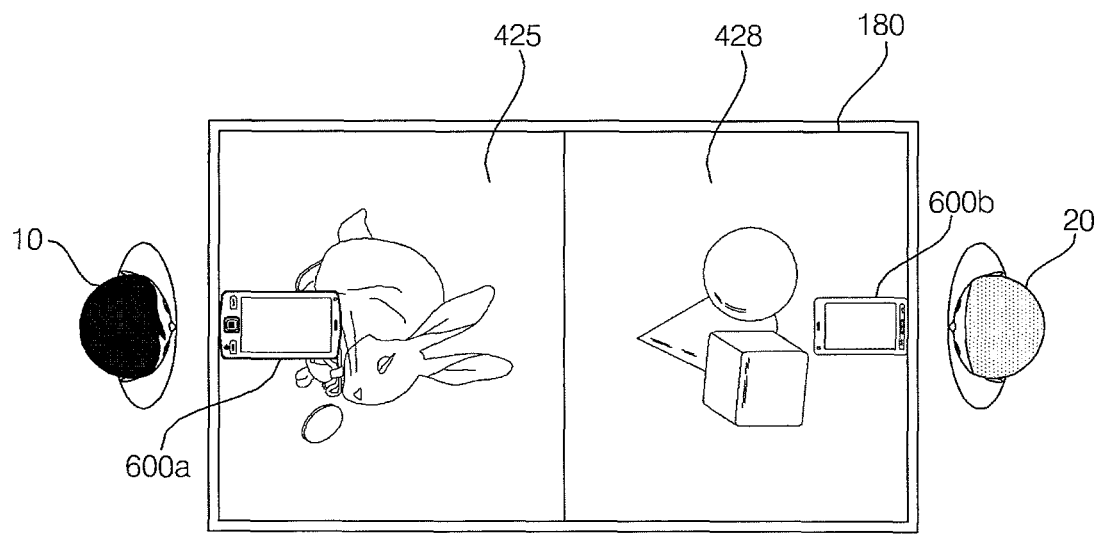
Figure 16B:
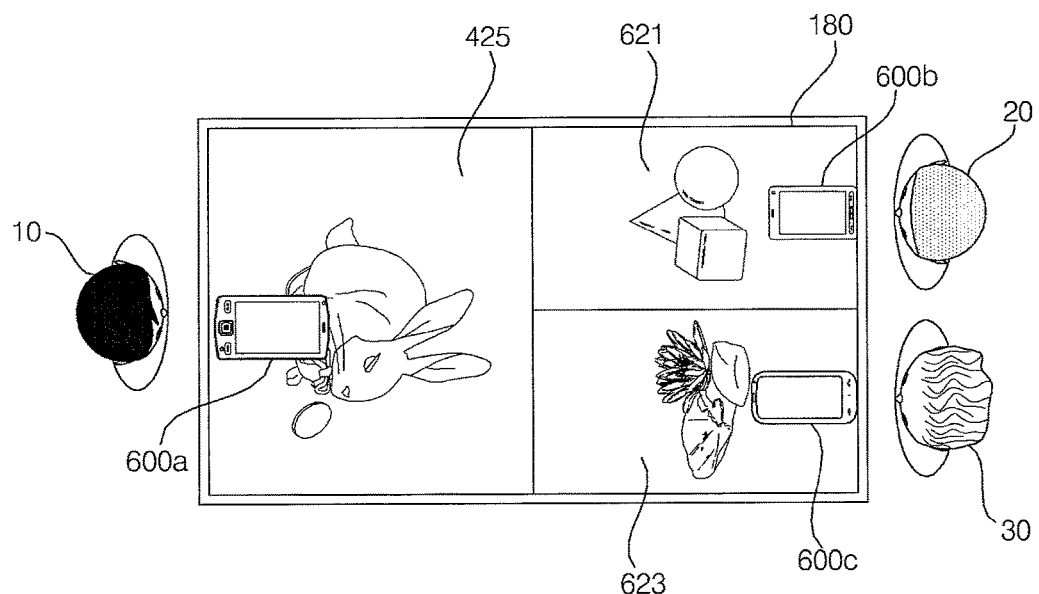
Figure 16C:
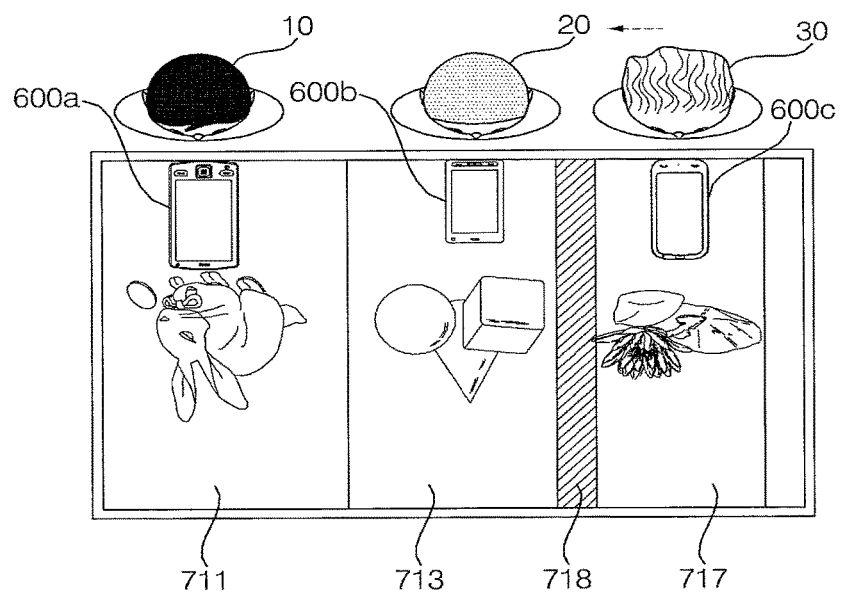
Figure 17A:
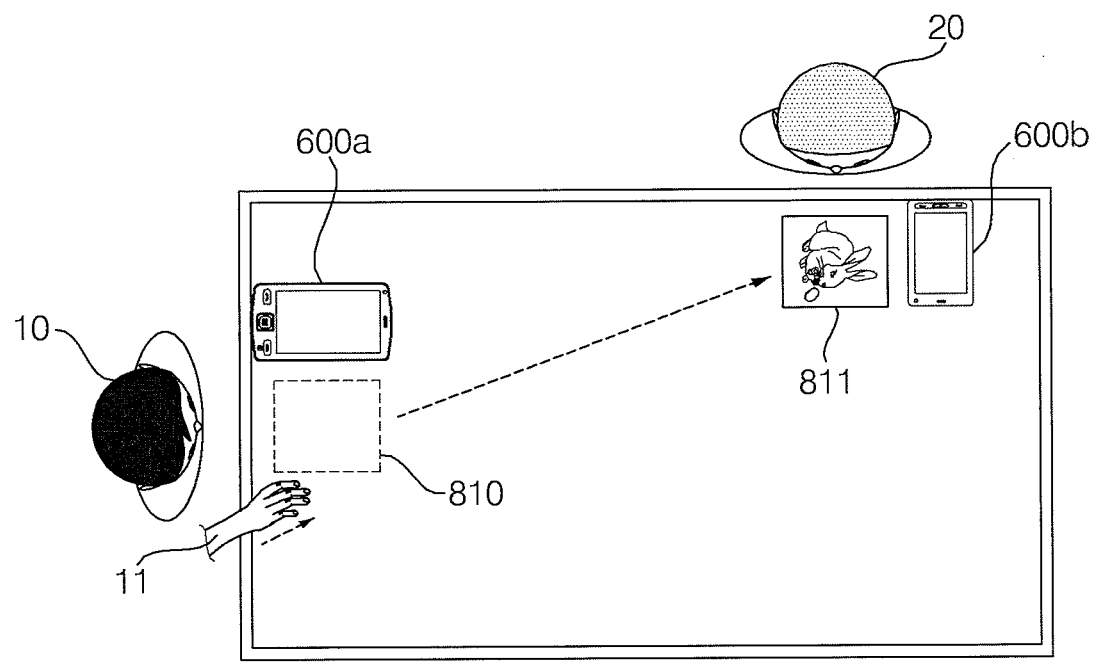
Figure 17B:
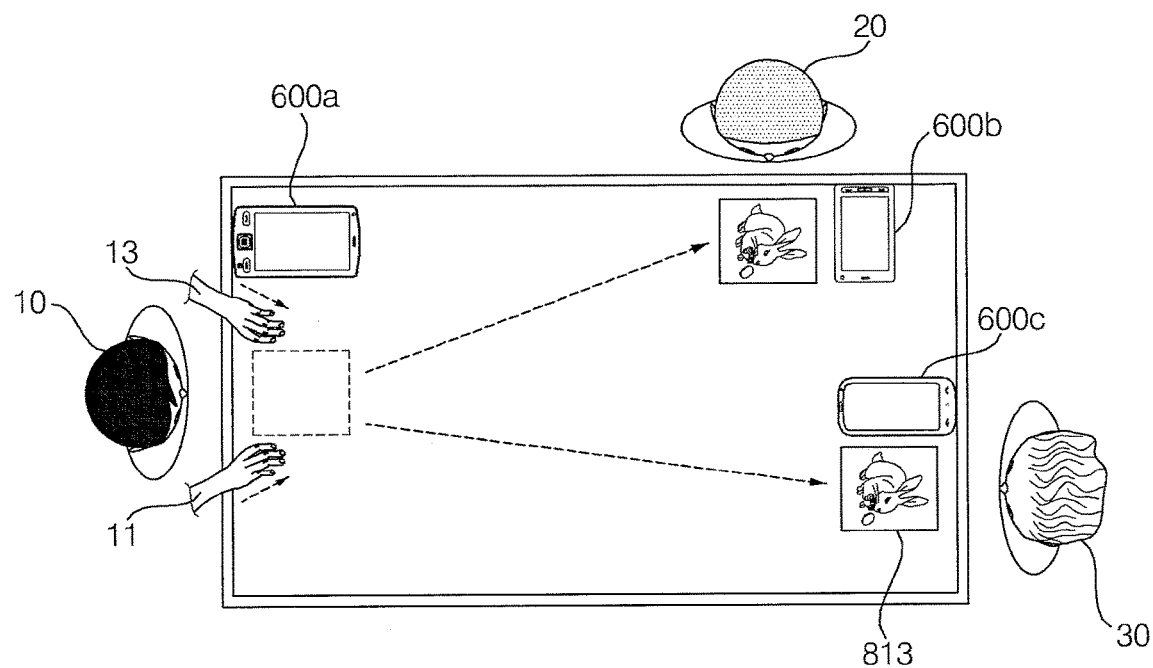

Likewise, FIGS. 15A and 15B correspond to FIGS. 6A and 6B, FIGS. 16A, 16B and 16C correspond to FIGS. 7A, 7B, and 7C, FIGS. 17A and 17B correspond to FIGS. 8A and 8B, and FIGS. 18A, 18B and 18C correspond to FIGS. 12A, 12B, and 12C.

In FIGS. 13A to 18B, when displaying content after recognizing a user using a mobile terminal of the user, the processor 170 can change a display area of the content in proportion to the size of the mobile terminal. Or the processor 170 can change the display area of the content in proportion to the amount of content data stored in the mobile terminal or the resolution of content data to be displayed. Therefore, the amount of the content data stored in the mobile terminal may be readily recognized.

The sensor unit 150 of the display apparatus 100 may sense a first surface and a second surface of a mobile terminal, separately. For example, the processor 170 can distinguish a touch made on the display apparatus 100 by a front surface of the mobile terminal having a touch screen formed thereon from a touch made on the display apparatus 100 by a rear surface of the mobile terminal based different capacitance variations. The processor 170 can display different content corresponding to the front and rear surfaces of the mobile terminal.

Figure 19A:
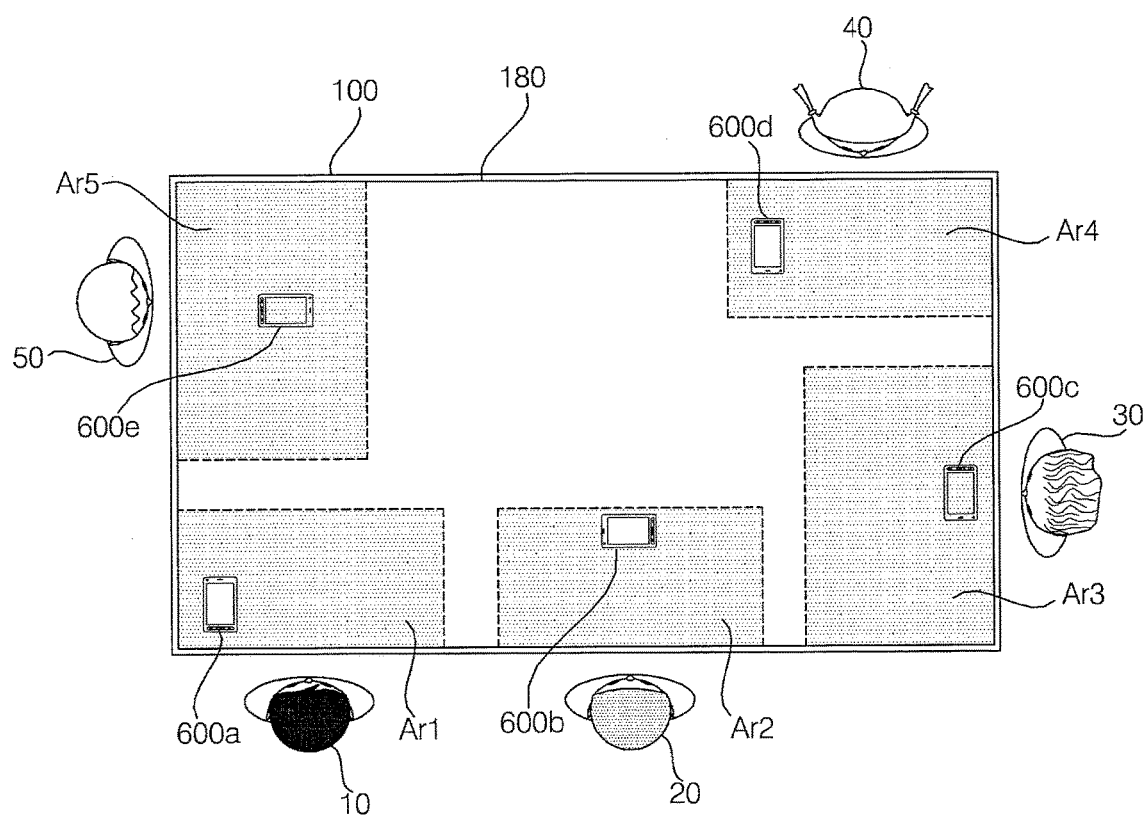

Referring to FIG. 19A, with a plurality of users located around the display 180, a user area is defined for each user. Particularly, mobile terminals 600*a*, 600*b*, 600*c*, 600*d*, and 600*e* of users 10, 20, 30, 40, and 50 are placed on the display 180 and user areas Ar1, Ar2, Ar3, Ar4, and Ar5 are defined for the respective users 10, 20, 30, 40, and 50.

The processor 170 can differentiate at least one of the sizes, shapes, colors, etc. of the user areas Art, Ar2, Ar3, Ar4, and Ar5 depending on where the users 10, 20, 30, 40, and 50 put the mobile terminals 600*a*, 600*b*, 600*c*, 600*d*, and 600*e* as viewed from the users 10, 20, 30, 40, and 50.

In FIG. 19A, when the first user 10 puts the mobile terminal 600*a* on the display 180 at the first user's left side, the first user area Ar1 is extended to the right of the mobile terminal 600*a*, including the mobile terminal 600*a*. When the second user 20 puts the mobile terminal 600*b* on the display 180 far from the second user 20, the second user area Ar2 is extended to the second user 20, including the mobile terminal 600*b*.

When the third user 30 puts the mobile terminal 600c on the display 180, right in front of the third user 30, the third user area Ar3 is extended backward from the mobile terminal 600c, including the mobile terminal 600c. When the fourth user 40 puts the mobile terminal 600d on the display 180 at the fourth user's right side, the fourth user area Ar4 is extended to the left of the mobile terminal 600d, including the mobile terminal 600d. When the fifth user 50 puts the mobile terminal 600e on the display 180 at a specific position with respect to the fifth user 50, the fifth user area Ar5 is created around the mobile terminal 600e, including the mobile terminal 600e.

Figure 18A:
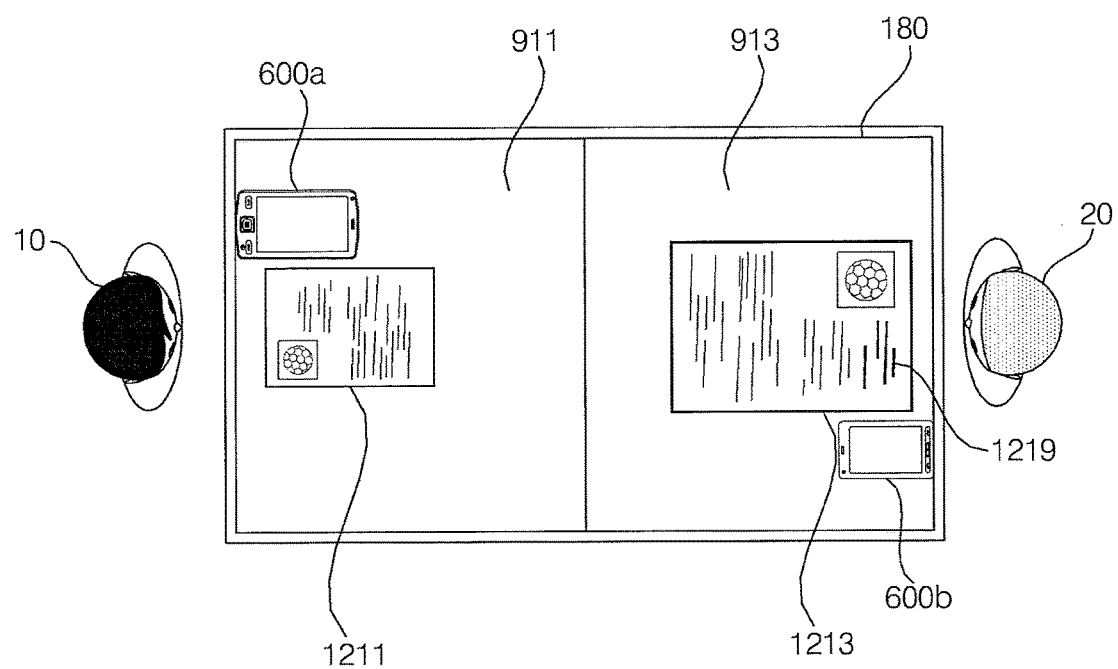
Figure 18B:
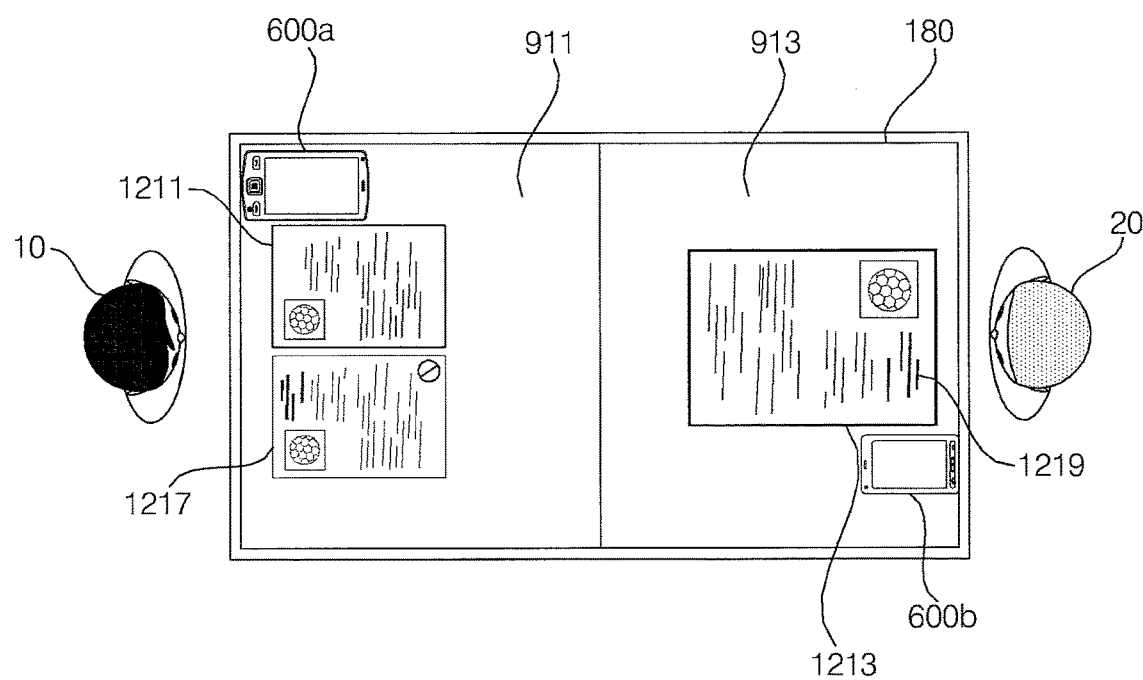

As another embodiment of the present invention, the user areas are defined for a plurality of users depending on where the users put their mobile terminals on the display 180 so each user area is apart from where a mobile terminal is put on the display 180, as illustrated in FIGS. 18A and 18B.

The processor 170 can arrange content items user-friendly in a user area for each user. When the mobile terminals 600a, 600b, 600c, 600d, and 600e are placed on the display 180, the processor 170 can sense the existence of the mobile terminals 600a, 600b, 600c, 600d, and 600e on the display 180 through the sensor unit 150 and may perform pairing between the display apparatus 100 and the mobile terminals 600a, 600b, 600c, 600d, and 600e through the communication unit 120. Further, the processor 170 can recognize the users 10, 20, 30, 40, and 50 based on device information or user information received from the mobile terminals 600a, 600b, 600c, 600d, and 600e.

After recognizing the mobile terminals 600a, 600b, 600c, 600d, and 600e, the processor 170 can define the user areas Ar1, Ar2, Ar3, Ar4, and Ar5 in correspondence with the positions of the mobile terminals 600a, 600b, 600c, 600d, and 600e.

After identifying a mobile terminal of a user, the processor 170 can display an object related to data sharing between the mobile terminal and the display apparatus 100. This object may be displayed in a user area defined for the user. If the user selects the object, the processor 170 can control data sharing with the mobile terminal. For example, the processor 170 can control reception of data from the mobile terminal and display of the data in the user area.

Meanwhile, the processor 170 can control setting of the size of a user area to a default value. Or the processor 170 can control changing of the size of a user area according to a user input. For example, the size of a user area may be adjusted by an On Screen Display (OSD) menu or by a touch and drag of a borderline of the user area. If the borderline of the user area is dragged in or out diagonally, the whole user area may be contracted or enlarged.

Figure 25A:
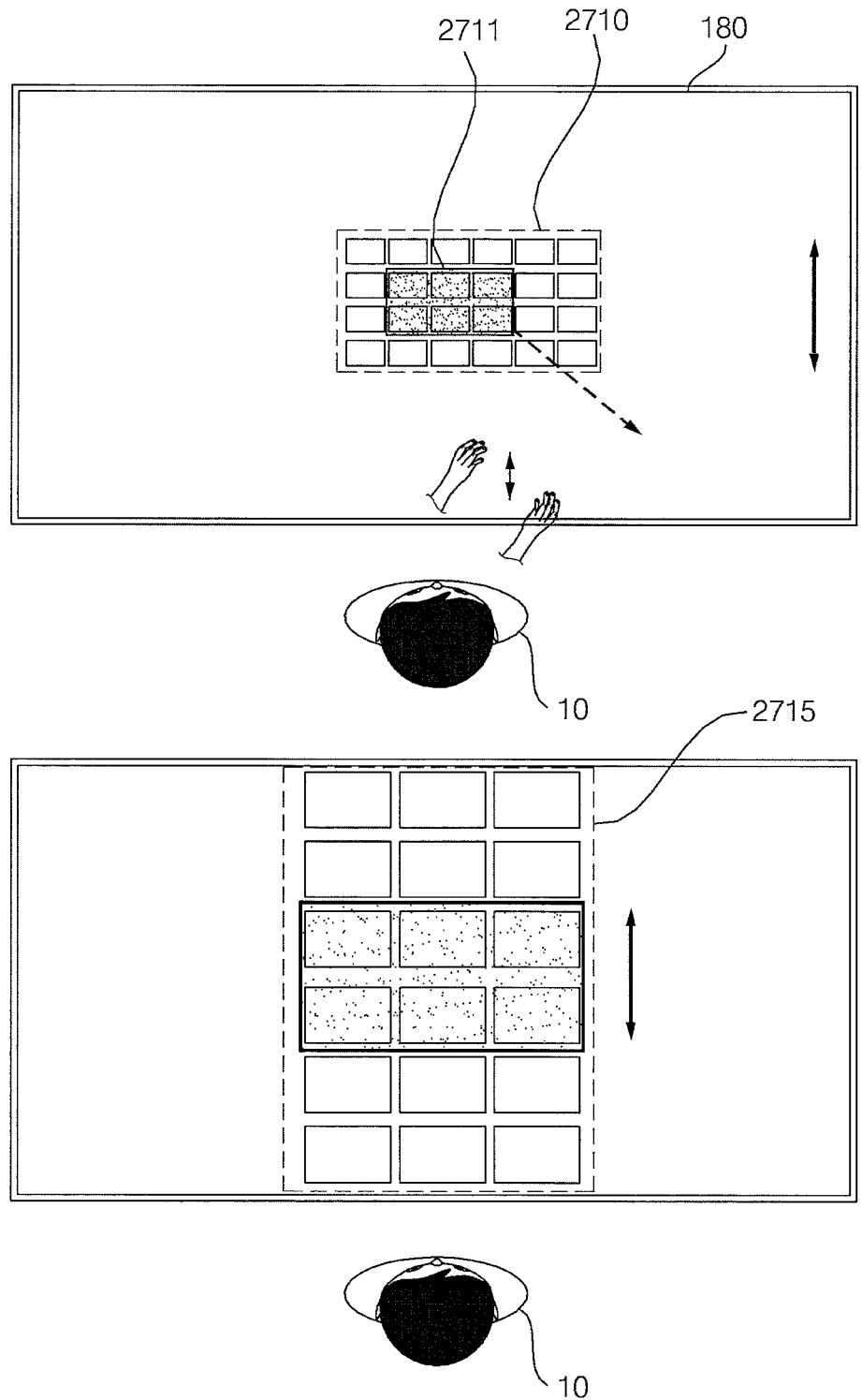
Figure 25B:
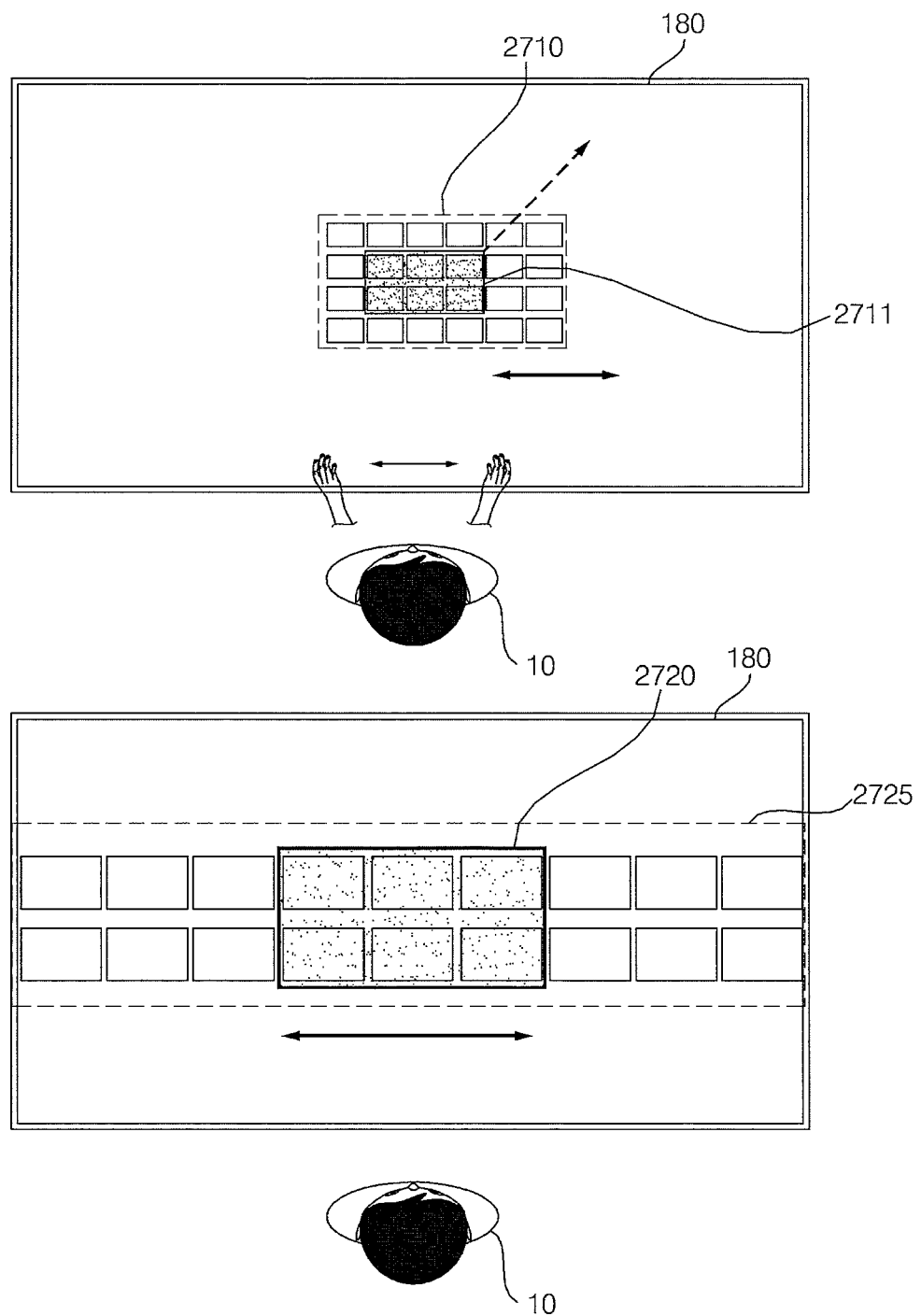
Figure 26:
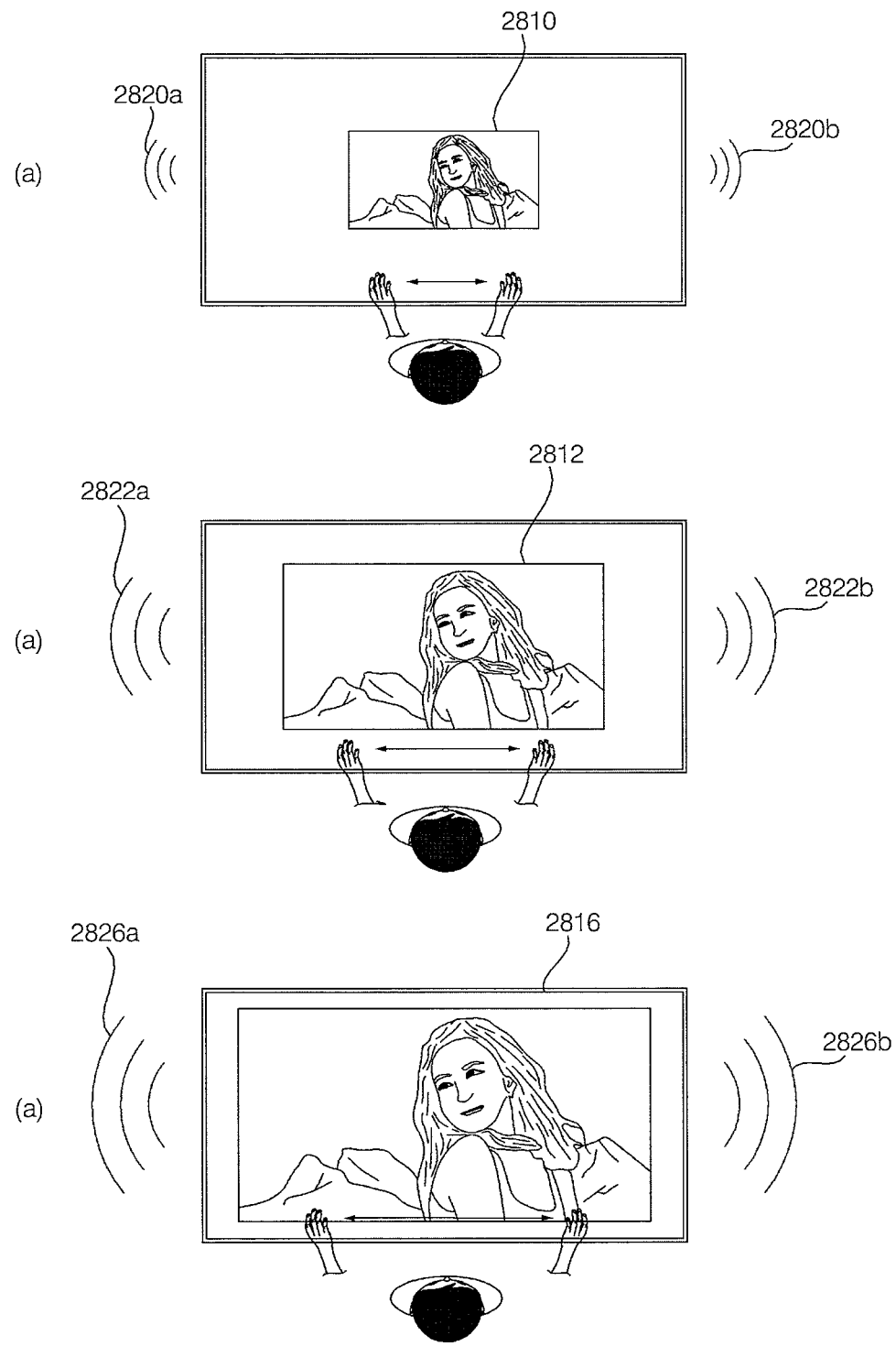

If the borderline of the user area is dragged in or out horizontally, the user area may be contracted or enlarged horizontally. If the borderline of the user area is dragged in or out in one direction, the layout of content items in the user area may be changed, as illustrated in FIGS. 25A and 25B.

Figure 19B:
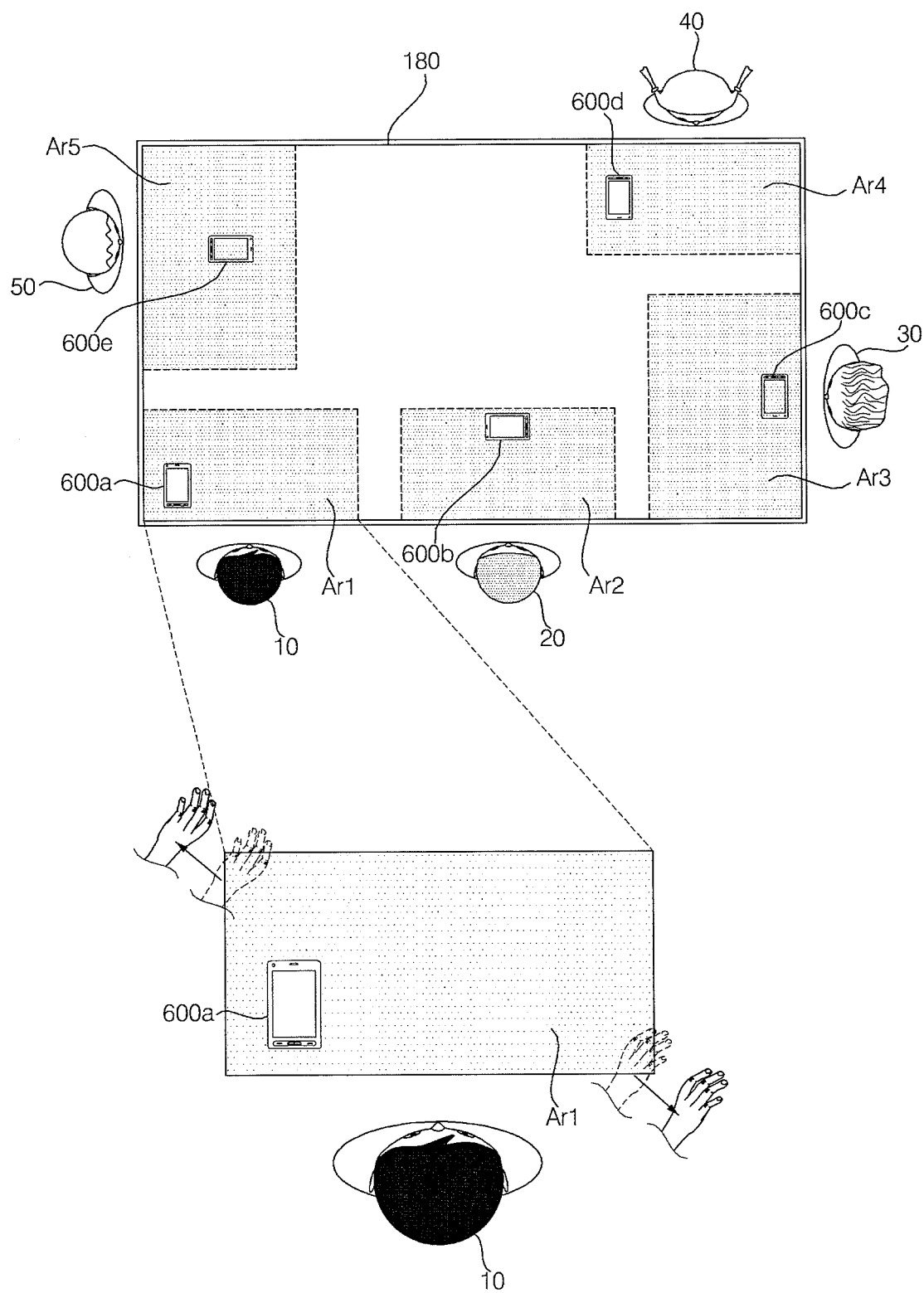

Referring to FIG. 19B, the size of the first user area Ar1 is changed in response to an input to change the first user area Ar1 of the first user 10. Particularly when the first user 10 spreads or gathers the user's hands along the diagonal line of the first user area Ar1, the first user area Ar1 may be enlarged or contracted.

If data is shared between a mobile terminal and the display apparatus 100, the processor 170 can display user-related content in a user area defined for a user of the mobile terminal. For example, the processor 170 can display a whole screen displayed on the mobile terminal in the user area of the display 180. In another example, the processor 170 can display a content item selected from a screen displayed on the mobile terminal 600 in the user area of the display 180.

Figure 19C:
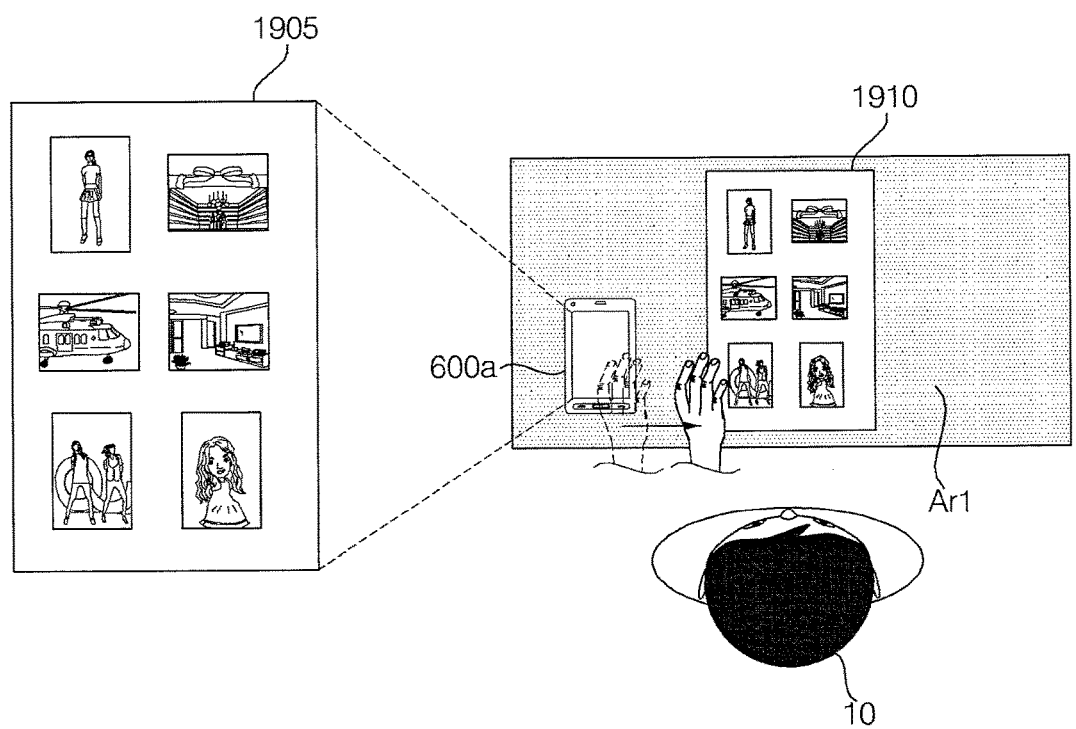

Referring to FIG. 19C, content displayed on a screen of the mobile terminal 600a is displayed as it is in the first user area Ar1 of the first user 10. After data sharing is set, if the first user 10 makes a touch input or a flicking input for the mobile terminal 600a, the display apparatus 100 may receive data of a whole screen 1905 displayed on the mobile terminal 600a from the mobile terminal 600a and the processor 170 can display the received data in the first user area Ar1 of the first user 10.

Preferably, the size of each of content items and the size of a screen 1910 including the content items are larger than the size of each of content items and the size of the screen 1905 including the content items in the mobile terminal 600a. Thus, the first user 10 can readily view and share content items of the mobile terminal 600a.

Figure 19D:
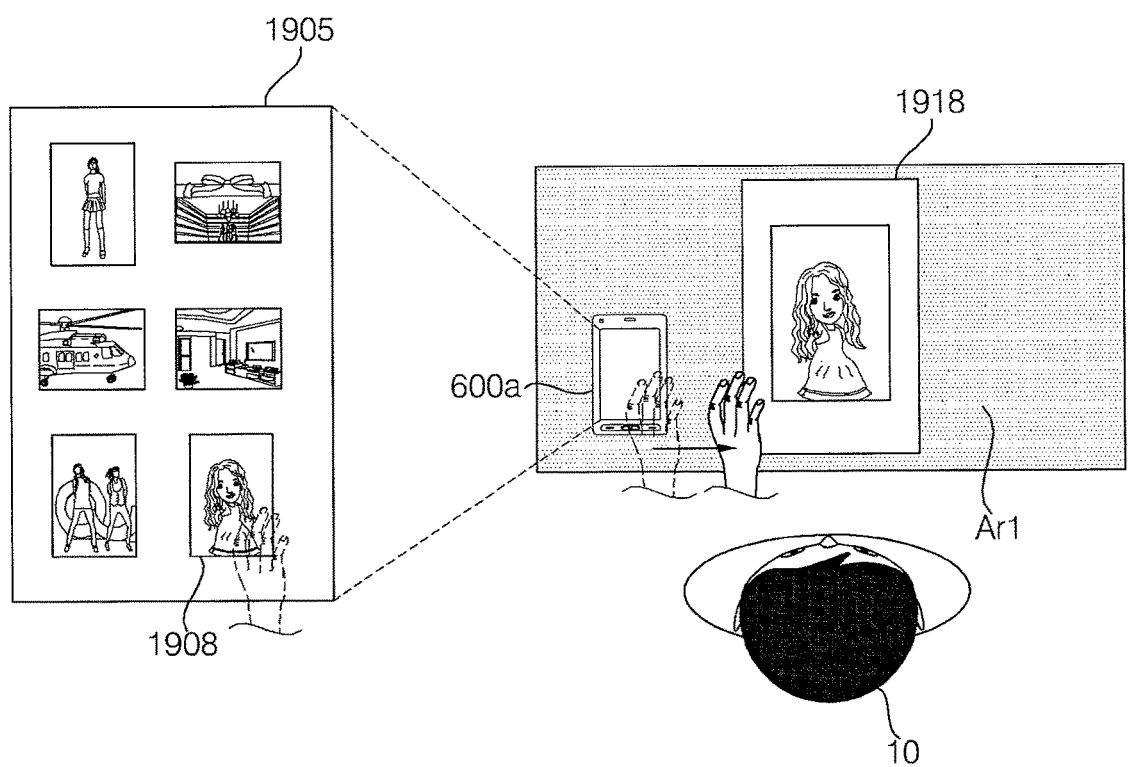

Referring to FIG. 19D, a content item selected from a screen displayed on the mobile terminal 600a is displayed in the first user area Ar1 of the first user 10. After data sharing is set, when a touch input or a flicking input is made to a specific content item 1908 on the screen 1905 of the mobile terminal 600a, the display apparatus 100 may receive data related to the selected content item 1908 from the mobile terminal 600a and the processor 170 can display the received data in the first user area Ar1 of the first user 10.

Preferably, the size of a content item 1918 displayed on the display 180 is larger than the content item 1908 displayed on the mobile terminal 600a. Thus, the first user 10 can readily view and share content items of the mobile terminal 600a.

If a touch input or a flicking input is made to the specific content item 1908 on the screen 1905 of the mobile terminal 600a, the content item 1908 may be highlighted or the color of its outline may be changed.

In a data sharing mode between the mobile terminal 600a and the display apparatus 100, a touch input or a flicking input to the mobile terminal 600a may be set to be interpreted as a control input for the display apparatus 100, not a control input for the mobile terminal 600a. Therefore, a controller of the mobile terminal 600a may transmit the touch input or the flicking input to the display apparatus 100, ignoring the touch input or the flicking input in the data sharing mode.

In the data sharing mode between the mobile terminal 600a and the display apparatus 100, if a folder is displayed on the mobile terminal 600a, the display apparatus 100 may share the whole folder. In the data sharing mode, the processor 170 can display an object indicating data sharing-on in a user area. Therefore, a user corresponding to the user area may readily recognize activation of data sharing.

The processor 170 can define user areas for a plurality of users and that so the user areas are not overlapped. Particularly, if specific content is displayed in a common area overlapped between user areas, the processor 170 can control sharing of the content between users corresponding to the user areas. That is, the processor 170 can control transmission of the content to a mobile terminal of another user.

Figure 20A:
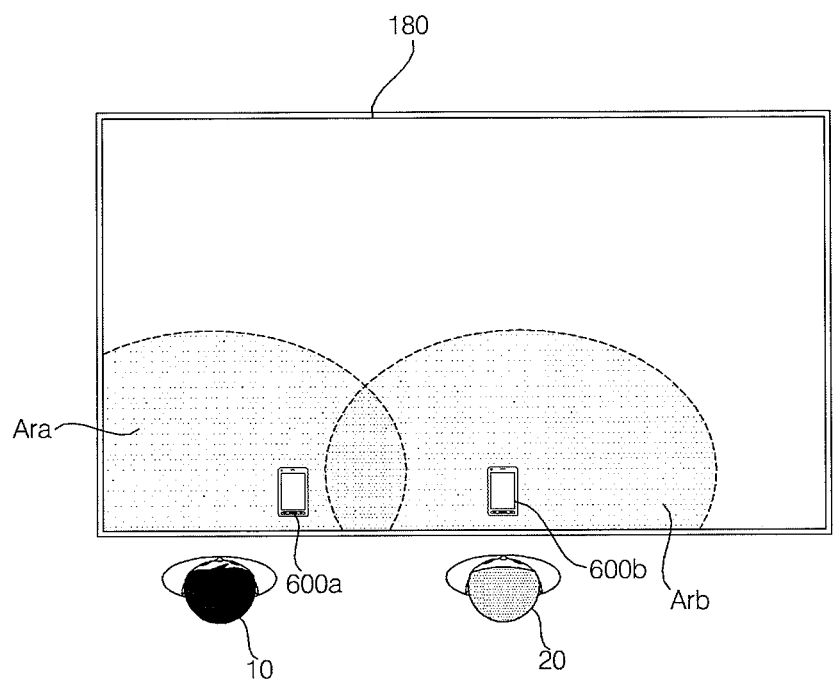

Referring to FIG. 20A, first and second user areas Ara and Arb are defined on the display 180 respectively for the first and second users 10 and 20. Particularly, the first and second user areas Ara and Arb are partially overlapped with each other. The overlap area may be highlighted. The first and second user areas Ara and Arb may be overlapped based on movement of a user, a change in the size of a user area, or the type or size of displayed content data.

Figure 20B:
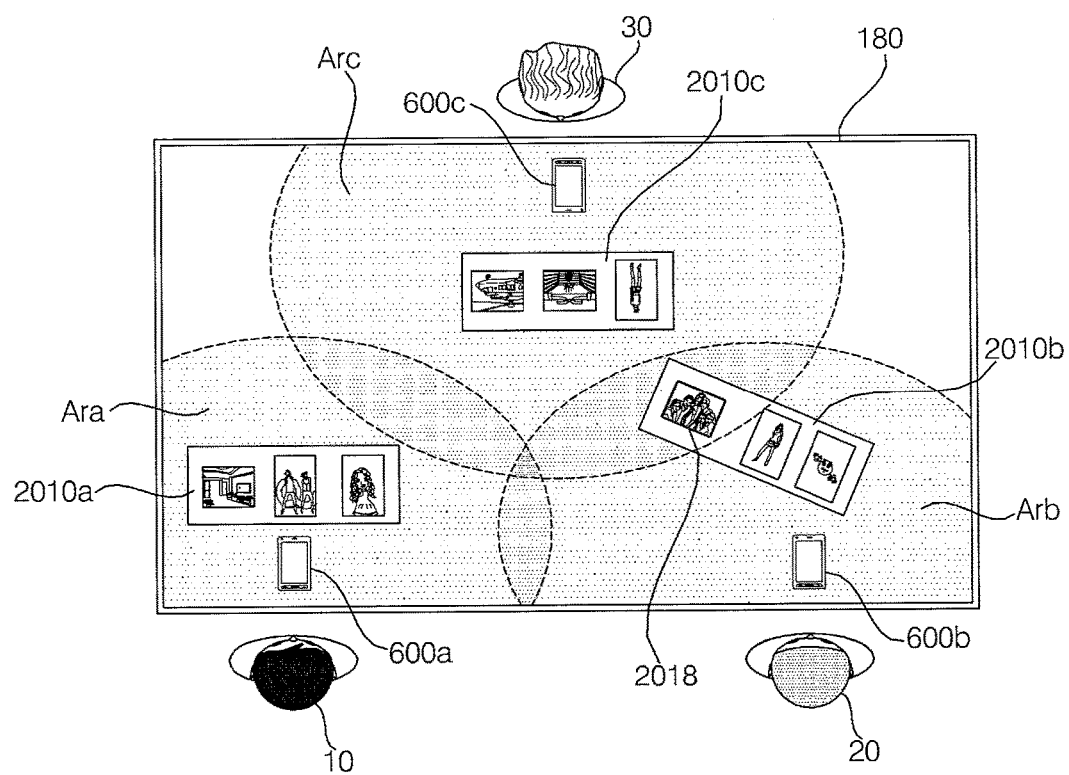

Referring to FIG. 20B, first, second, and third content lists 2010a, 2010b, and 2010c for the first, second, and third users 10, 20, and 30 are displayed respectively in user areas Ar1, Arb, and Arc. The second user 20 disposes a specific content item 2018 of the second content list 2010b in a common area Arz overlapped between the second user area Arb and the third user area Arc.

Thus, the processor 170 can control sharing of the content item 2018 between the third user 30 and the second user 20. That is, the content item 2018 may be transmitted to the second user area Arb or the second mobile terminal 600b of the second user 20.

Figure 20C:
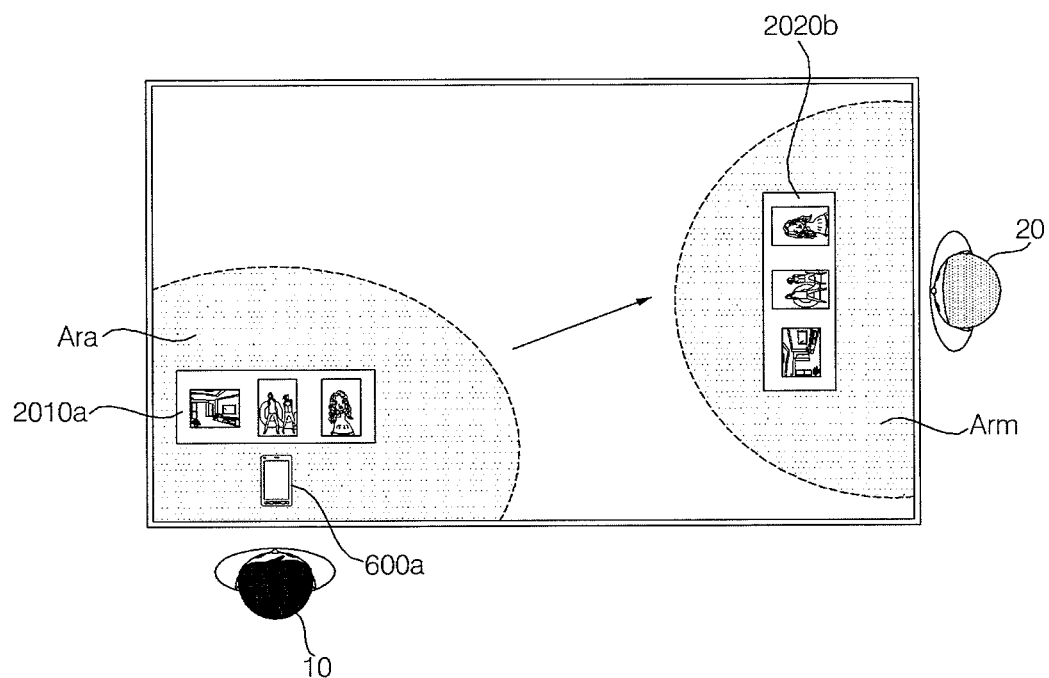

Referring to FIG. 20C, first and second user areas Ara and Arm are defined on the display 180 respectively for the first and second users 10 and 20. Particularly, data of the first user area Ara is transmitted to the second user area Arm by data sharing. The second user 20 can use and edit the shared content and share the edited content with the first user 10. Thus the content may be reconstructed.

Figure 21:
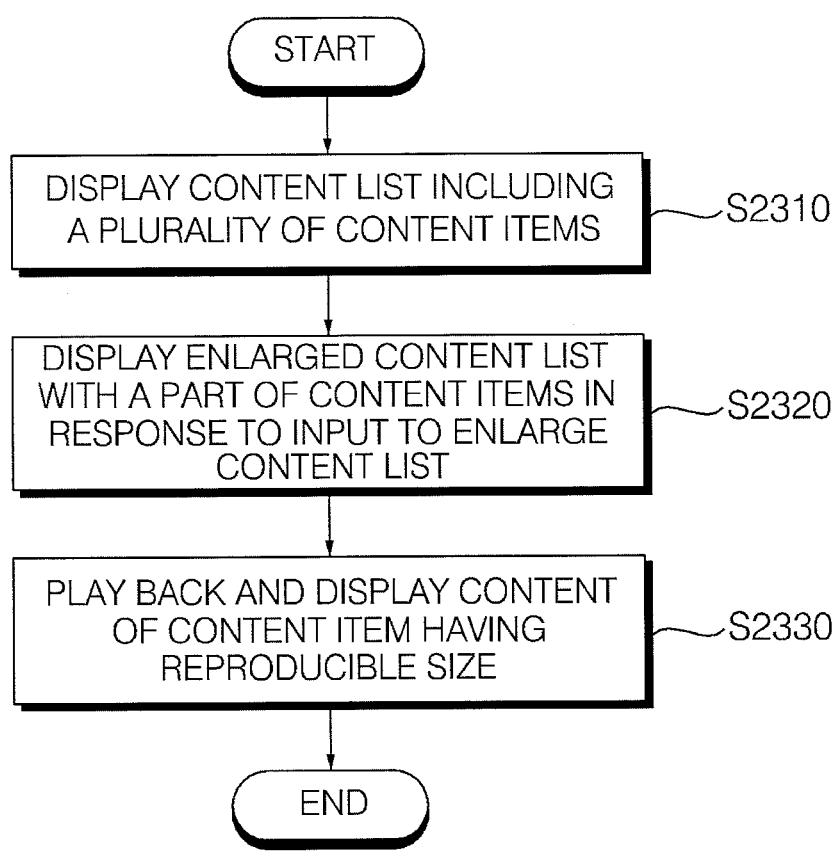
FIG. 21 is a flowchart illustrating a method for operating the display apparatus according to another embodiment of the present invention.

Next, FIG. 21 is a flowchart illustrating a method for operating the display apparatus according to another embodiment of the present invention, and FIGS. 22 to 30B are overviews illustrating the method for operating the display apparatus illustrated in FIG. 21.

Referring to FIG. 21, the processor 170 of the display apparatus 100 controls display of a content list including a plurality of content items on the display (S2310). In FIG. 23(a), a content list 2415 including a plurality of content items is displayed on the horizontally placed display 180.

Further, the content list 2415 may be automatically displayed after user recognition or may be displayed in response to an additional input. Before step S2310, a step of displaying a plurality of content items on the display 180 and a step of combining a plurality of content items, upon receipt of a content combine input, and displaying a content list including the combined content items may be performed.

Figure 22:
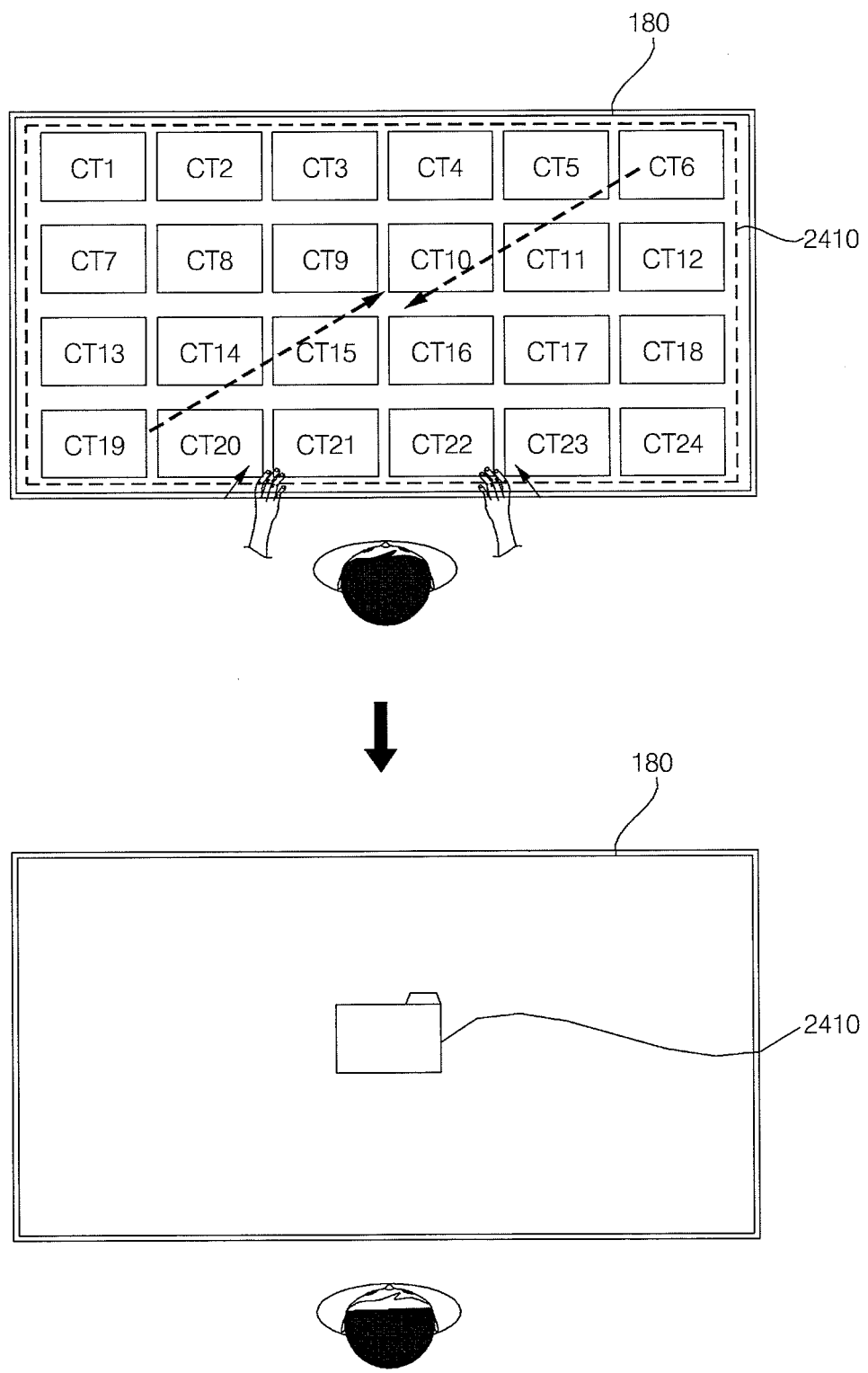
FIGS. 22 to 30B are overviews illustrating the method for operating the display apparatus illustrated in FIG. 21.
Figure 23:
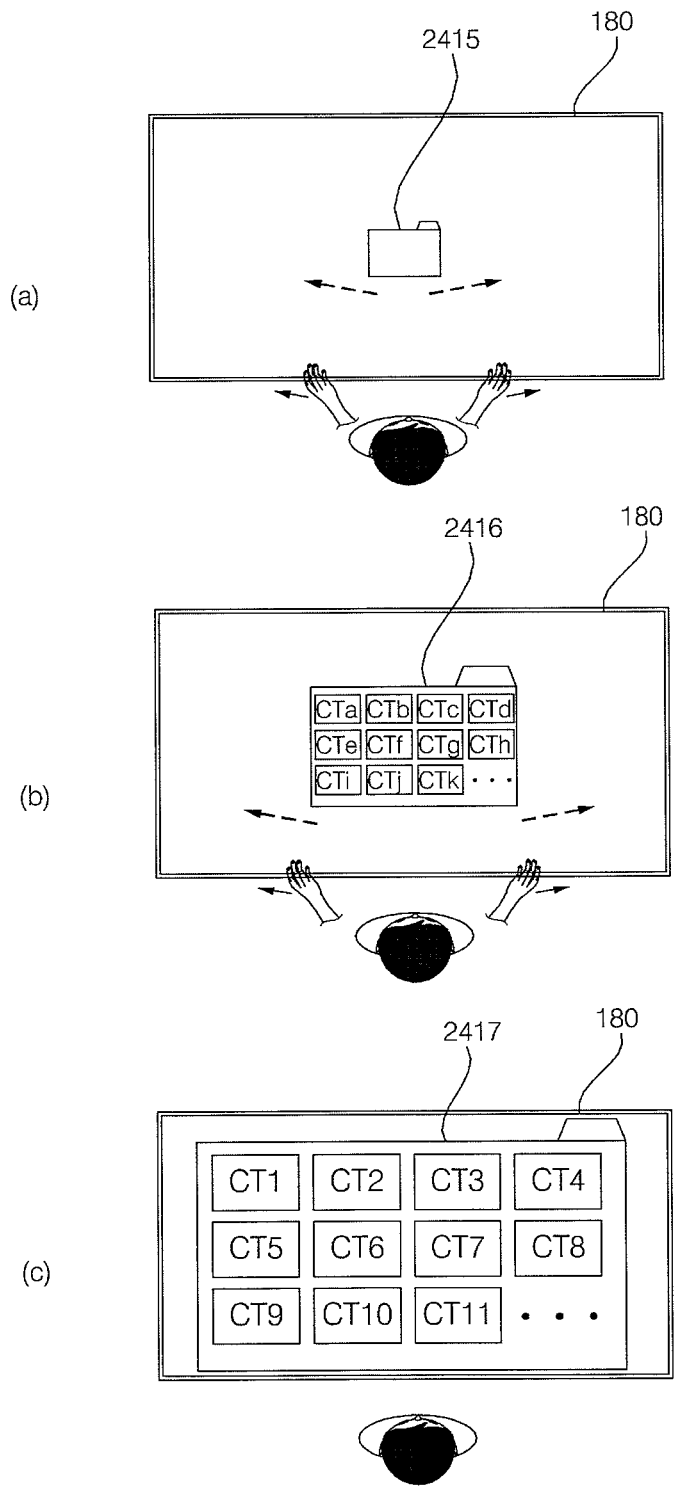

Referring to FIG. 22, the content list 2415 including a plurality of content items 2410, CT1 to CT24 may be displayed on the horizontally placed display 180. While the plurality of content items 2410, CT1 to CT24 are displayed in full screen on the display 180 in FIG. 22, the plurality of content items 2410, CT1 to CT24 may be displayed in a partial area of the display 180 in correspondence with the position of a user. Further, the processor 170 can calculate the position of a user based on an image captured by the camera 195.

In FIG. 22, the user makes a touch input of gathering the displayed plurality of content items 2410, CT1 to CT24 toward the user with the user's hands. Thus, the plurality of content items 2410, CT1 to CT24 are combined into one file or the single content list 2415. That is, the processor 170 can generate the content list 2415 including the combined content items 2410 in response to an input to combine the plurality of content items 2410.

Subsequently, the processor 170 controls enlargement of the content list and display of at least a part of the plurality of content items included in the content list in response to an input to enlarge a content list (S2320).

The processor 170 sequentially controls enlargement and display of the content list in response to the input to enlarge a content list. Herein, the processor 170 controls display of at least a part of the plurality of content items included in the content list. Thus, the user can readily view content items included in the content list.

In FIG. 23(a), the user makes a touch input to enlarge the displayed content list 2415 by spreading the user's hands sideways. Thus, the content list 2415 is enlarged. FIG. 23(b) illustrates a content list 2416 enlarged after a first time and FIG. 23(c) illustrates a content list 2417 enlarged after a second time.

The content items of the content list 2416 are shown in FIG. 23(b) as content items of a first size, CTa, . . . , CTk and are shown in FIG. 23(c) as content items of a second size larger than the first size, CT1, . . . CT11. However, many other variations can be made.

For example, the content items illustrated in FIGS. 23(b) and 23(c) may be displayed as thumbnail images, not file names. In response to an enlarge input, the size or resolution of the thumbnail images may be increased. In another example, because the content items are larger in FIG. 23(c) than in FIG. 23(b), fewer content items may be displayed in FIG. 23(c).

If a part of the displayed content items are of a reproducible size, the processor 170 controls playback and display of the content items (S2330). Upon receipt of an enlarge input, the processor 170 continues to enlarge the content list. If any of the displayed content items is of a reproducible size, the processor 170 can control playback and display of the content item.

Figure 24:
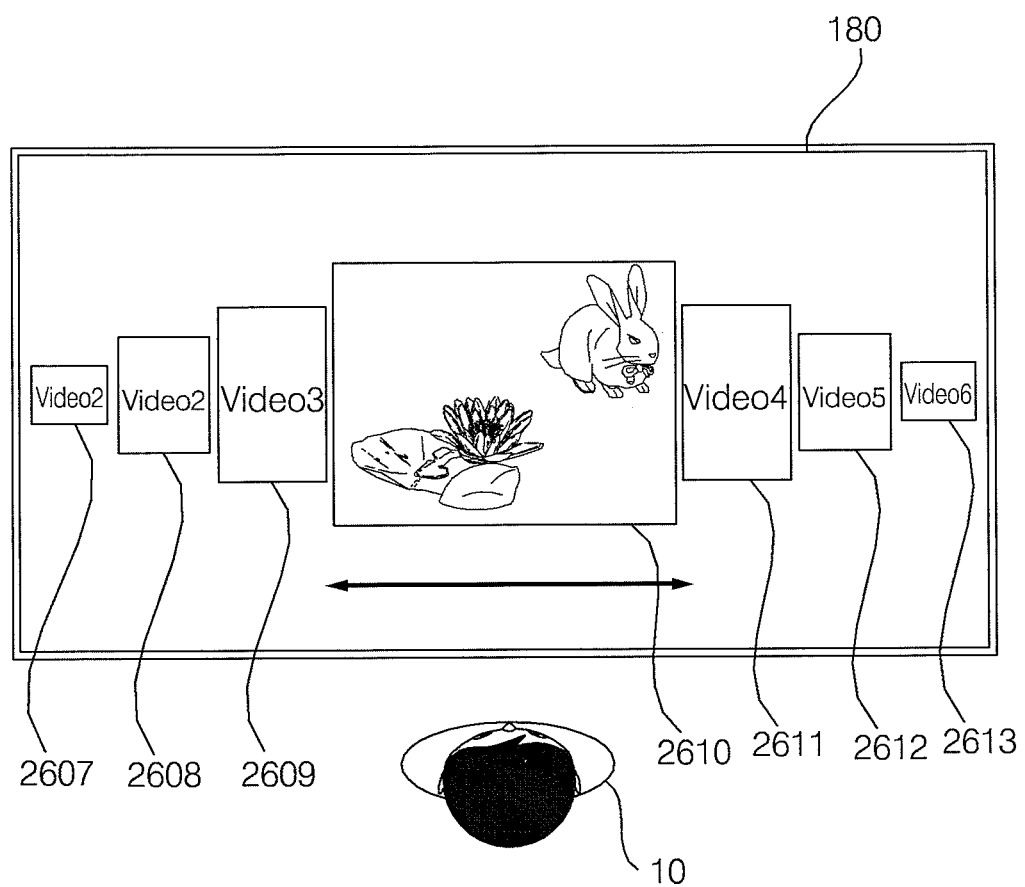

Referring to FIG. 24, if the user makes a sideway enlarge input, some content items 2607, 2608, 2609, 2610, 2611, 2612, and 2613 of the content list are arranged side by side, after the operation illustrated in FIG. 23(c). If any 2610 of the content items in the content list is of a reproducible size, the processor 170 can control playback and display of the content item 2610 as illustrated in FIG. 24. Particularly, the processor 170 can set the size of the playback content item 2610 to be larger than the size of each of the other content items 2607, 2608, 2609, 2611, 2612, and 2613. Thus, the user can readily view the playback content.

Referring to FIG. 25A, with a content list 2710 including some content items 2711 displayed in an area of the display 180, the first user 10 makes a vertical enlarge touch input. The processor 170 can display the content list 2715 enlarged vertically, as illustrated in FIG. 25A. The content list 2715 is fully enlarged vertically on the display 180 in FIG. 25A.

Referring to FIG. 25B, with the content list 2710 including the content items 2711 displayed in an area of the display 180, the first user 10 makes a horizontal enlarge touch input. The processor 170 can display the content list 2715 enlarged horizontally, as illustrated in FIG. 25B. The content list 2715 is fully enlarged horizontally on the display 180 in FIG. 25B.

Referring to FIG. 26(a)-(c), as reproduced content is enlarged in response to a user's enlargement input, the audio volume of the content is increased. In response to an input to enlarge playback content, the processor 170 controls display of the playback content enlarged and controls volume-up of the content.

Referring to FIG. 26(a), content 2810 of a first size is being played back in an area of the display 180 in response to a user's enlarge input. Sound 2820a and 2820b is output at a first volume level through the audio output unit 185, in proportion to the display size of the content 2810.

Referring to FIG. 26(b), content 2812 of a second size larger than the first size of the content 2810 illustrated in FIG. 26(a) is being played back in an area of the display 180 in response to a user's enlarge input. Sound 2822a and 2822b is output at a second volume level higher than the first volume level of the content 2810 illustrated in FIG. 26(a) through the audio output unit 185, in proportion to the display size of the content 2812.

Referring to FIG. 26(c), content 2816 of a third size larger than the second size of the content 2812 illustrated in FIG. 26(b) is being played back in an area of the display 180 in response to a user's enlarge input. Sound 2826a and 2826b is output at a third volume level higher than the second volume level of the content 2812 illustrated in FIG. 26(b) through the audio output unit 185, in proportion to the display size of the content 2816.

Since the sound volume of playback content is changed according to the display size of the content, the user may readily recognize the display size of the content. If a user makes a first-direction flicking input for playback content, the processor 170 can display images related to the content in a first direction.

Upon receipt of an input to insert an additional image, the processor 170 can insert the additional image between the content-related images. Upon receipt of a flicking input in a second direction opposite to the first direction, the processor 170 can display the content including the additional image.

Figure 27A:
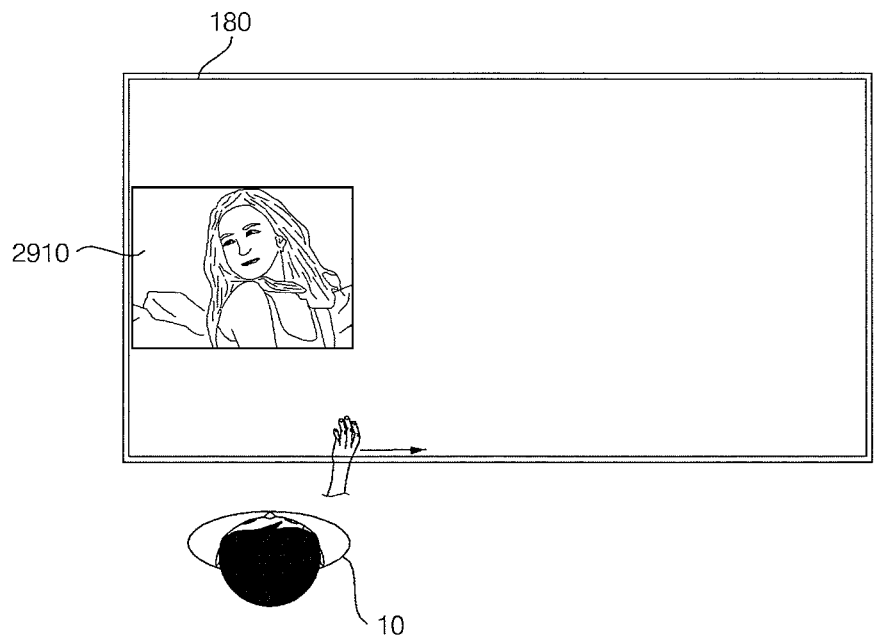

Next, FIGS. 27A to 27E illustrate an operation for generating new content by adding an additional image to content being reproduced. Referring to FIG. 27A, with the first user 10 located on a lower left side of the display apparatus 100, specific content 2910 is displayed on the display 180. The content 2910 is being played back. The content 2910 may correspond to the content 2610 described with reference to FIG. 24.

Figure 27B:
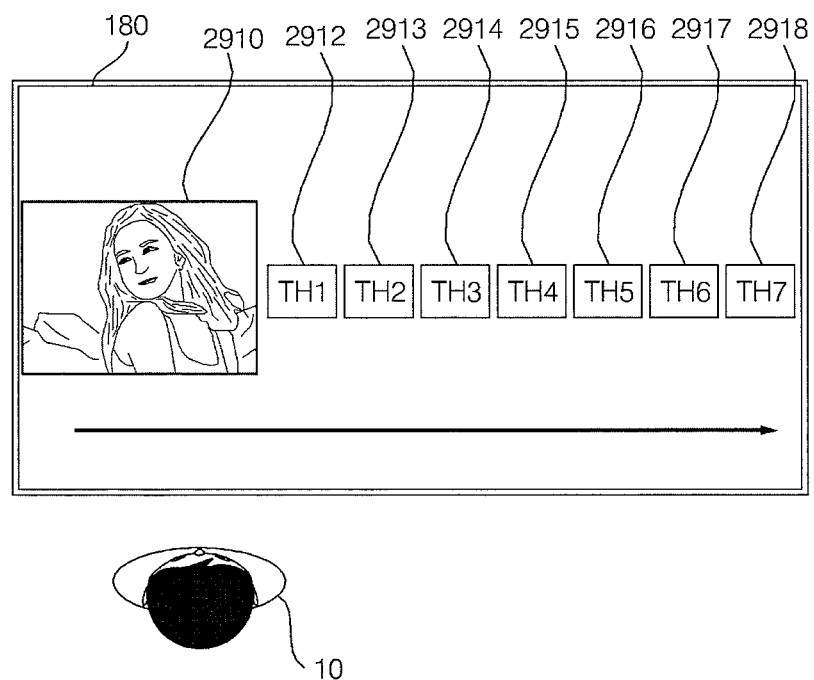

If the first user 10 makes a touch-based rightward flicking input, the processor 170 of the display apparatus 100 displays a plurality of images included in the content 2910 unfolded to the right, as illustrated in FIG. 27B. The content 2910 may be paused during playback. In FIG. 27B, the content 2910 includes thumbnail images 2912 to 2918, TH1 to TH7.

Figure 27C:
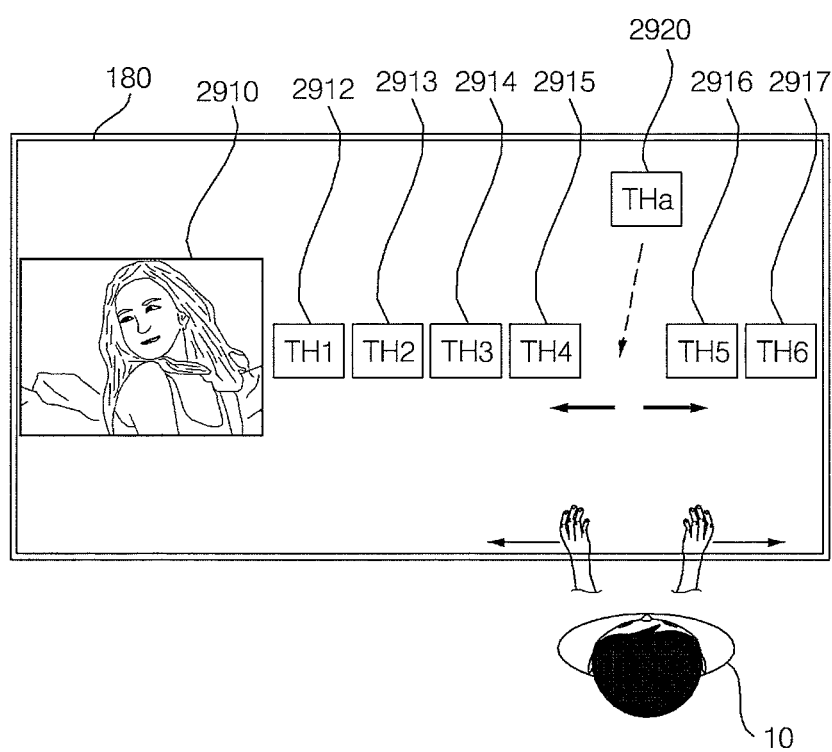
Figure 27D:
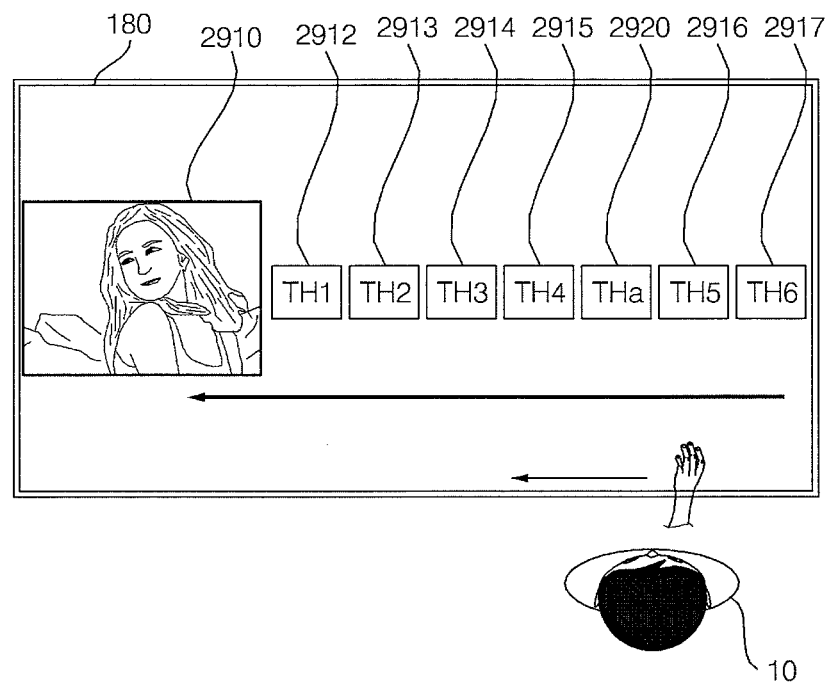

Referring to FIG. 27C, the user makes a touch input of spreading the fourth and fifth images TH4 and TH5 from each other and inserts a new image 2920, THa between the fourth image TH4 and the fifth image TH5. Then, the new image 2920 is displayed between the fourth image TH4 and the fifth image TH5 as shown in FIG. 27D.

Figure 27E:
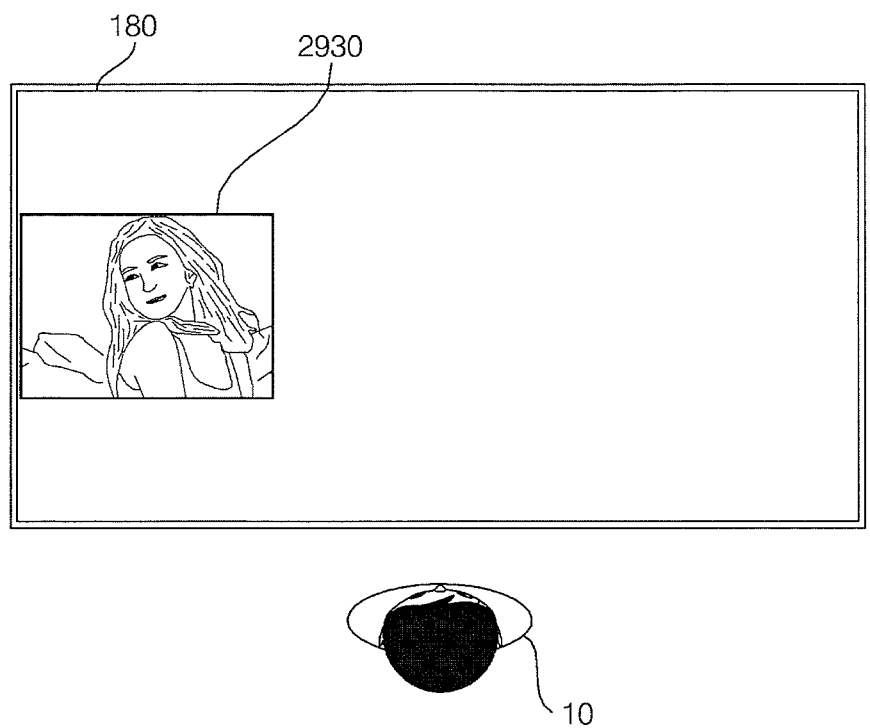

If the user 10 makes a touch-based leftward flicking input for the plurality of images 2912 to 2917 and 2920, TH1 to TH7 and THa, the processor 170 can display of new content 2930 including the new inserted image, while removing the plurality of images, as illustrated in FIG. 27E. Accordingly, content including an intended image may be generated simply. The new content 2930 may be played back automatically after it is created. Upon receipt of an input to combine a part of a plurality of displayed content items, the processor 170 can generate a content file including the corresponding content items.

FIGS. 28A to 30B illustrate an operation for, upon receipt of an input to combine a part of a plurality of displayed content items, generating a content file including the corresponding content items.

Figure 28A:
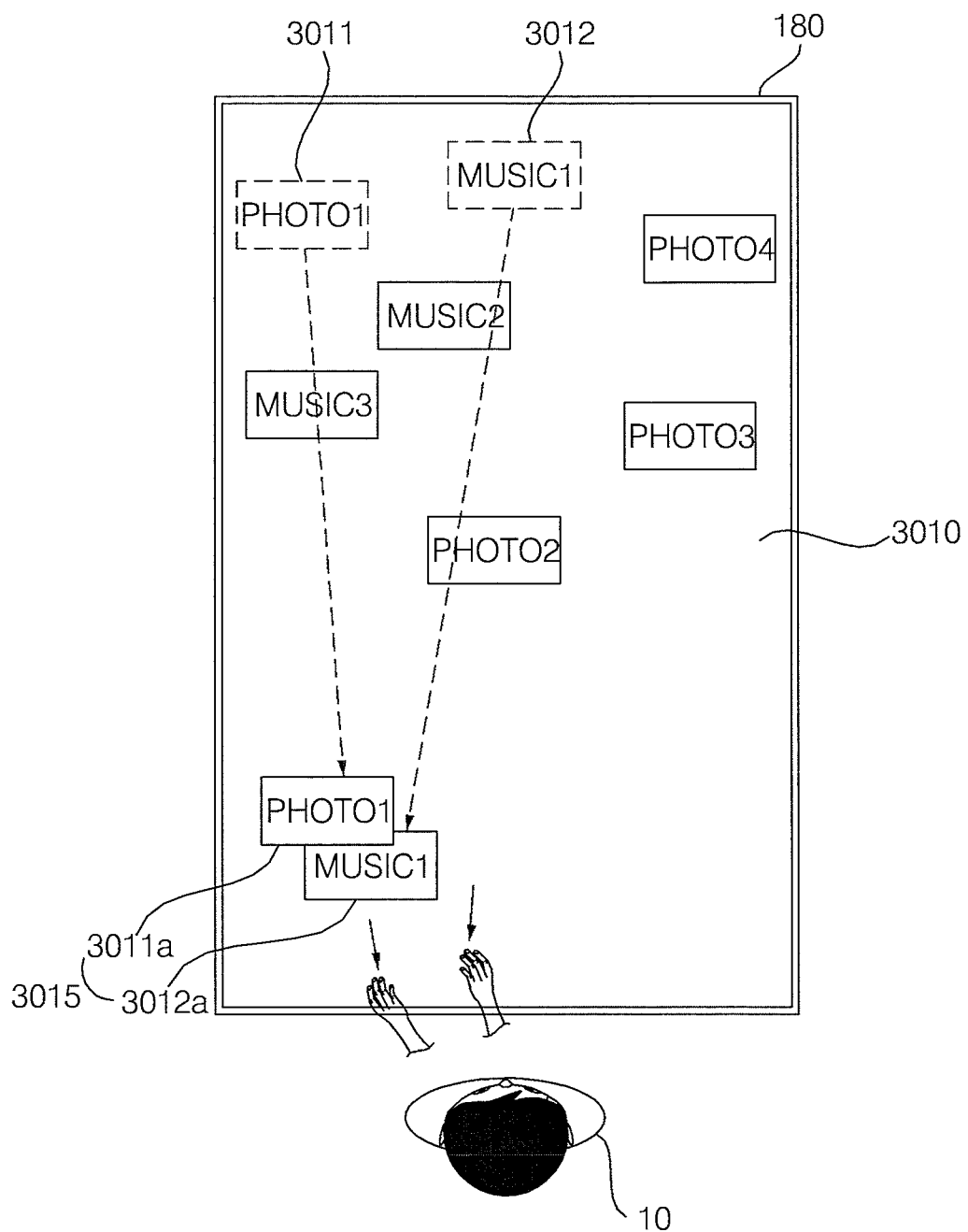

Referring to FIG. 28A, with different types of content items (e.g., PHOTO and MUSIC), the user 10 makes a touch input to combine a first photo item 3011, PHOTO1 with a first music item 3012, MUSIC1. Then the first photo item 3011, PHOTO1 and the first music item 3012, MUSIC1 may be moved, and a moved first photo item 3011a and a moved first music item 3012a may be overlapped and displayed as content 3015.

Figure 28B:
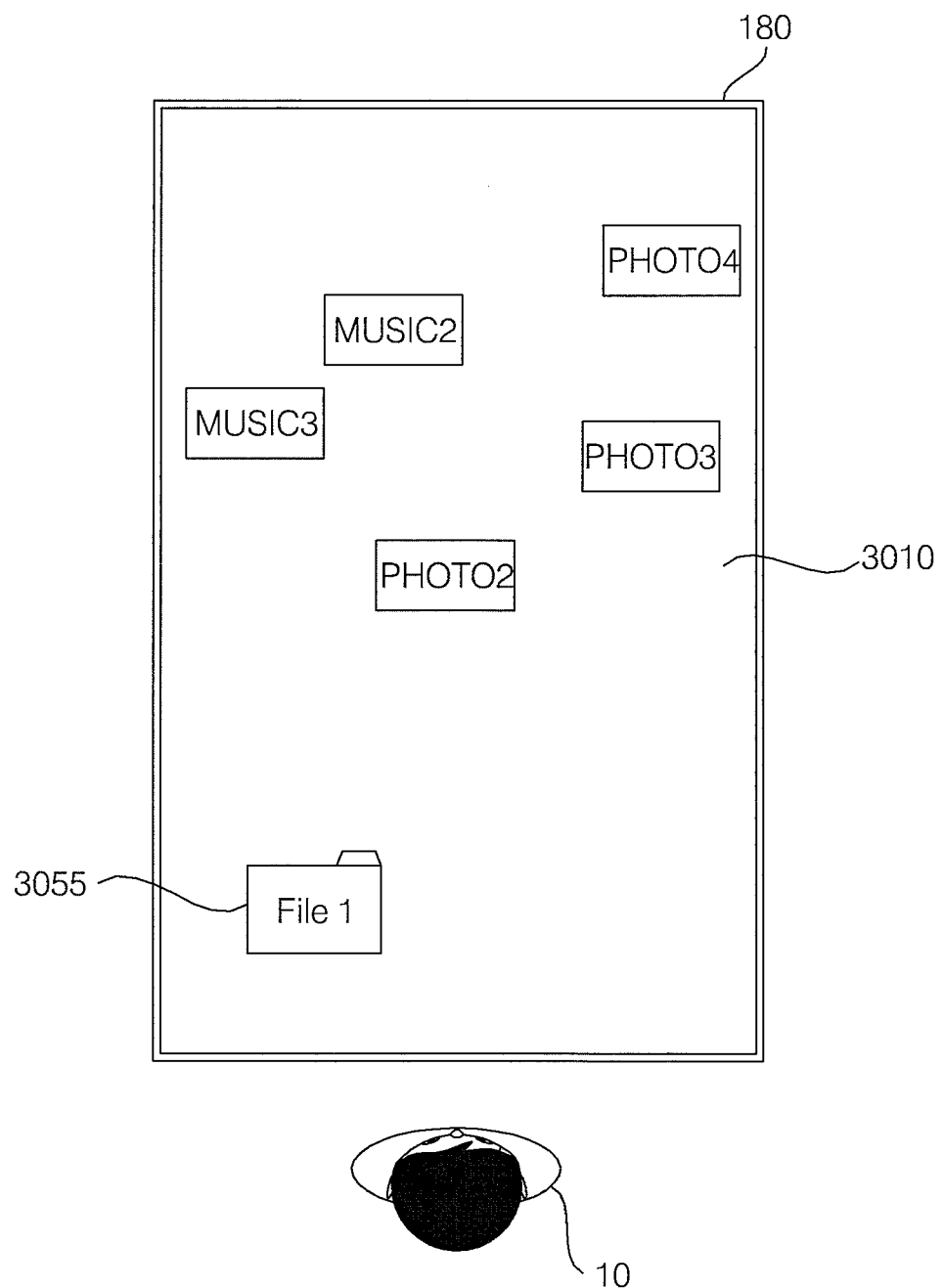
Figure 29A:
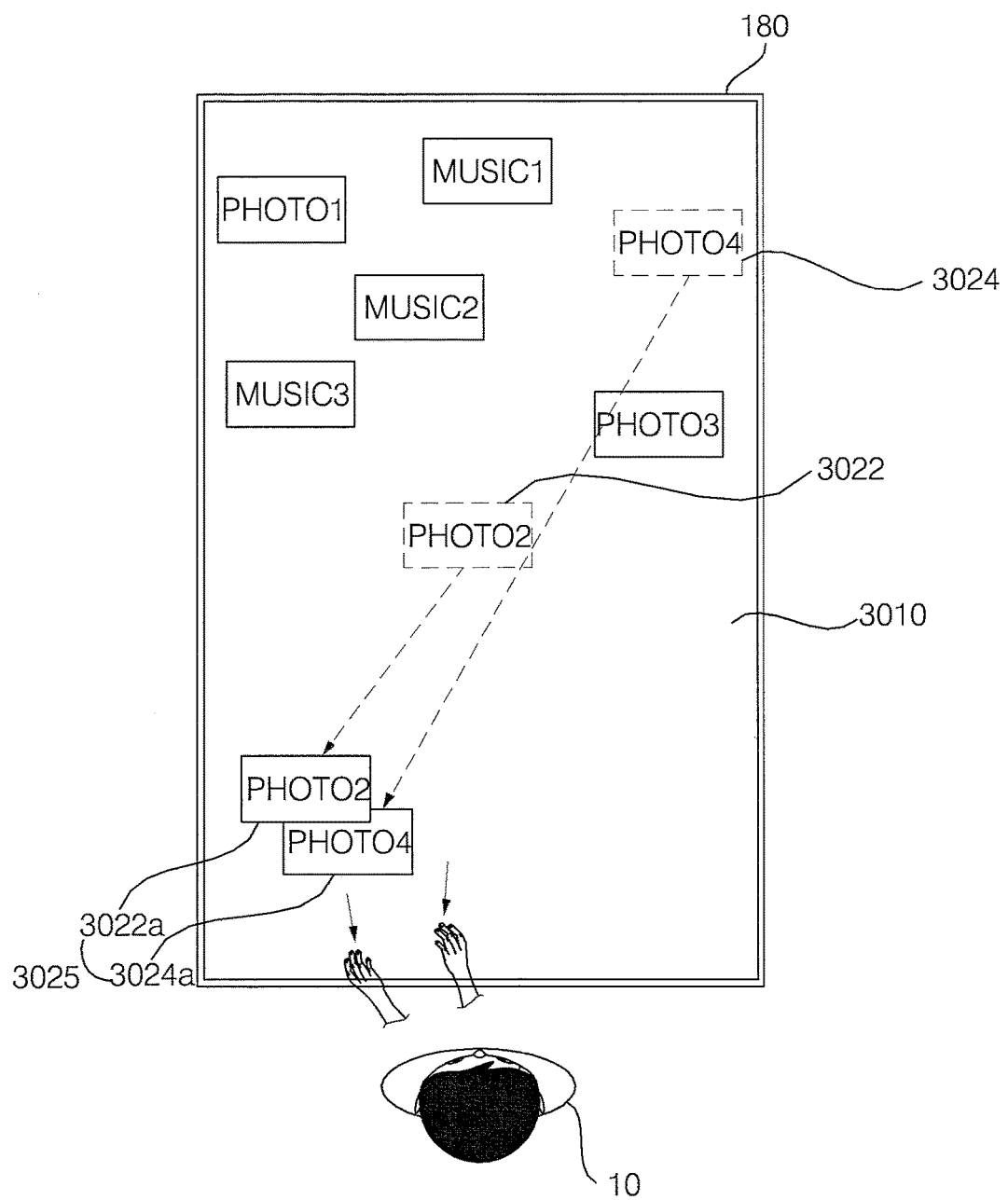

As illustrated in FIG. 28B, the first photo item 3011a and the first music item 3012a may be displayed combined into one file 3055. Referring to FIG. 29A, with different types of content items (e.g., PHOTO and MUSIC), the user 10 makes a touch input to combine a second photo item 3022, PHOTO3 with a fourth photo item 3024, PHOTO4.

Figure 29B:
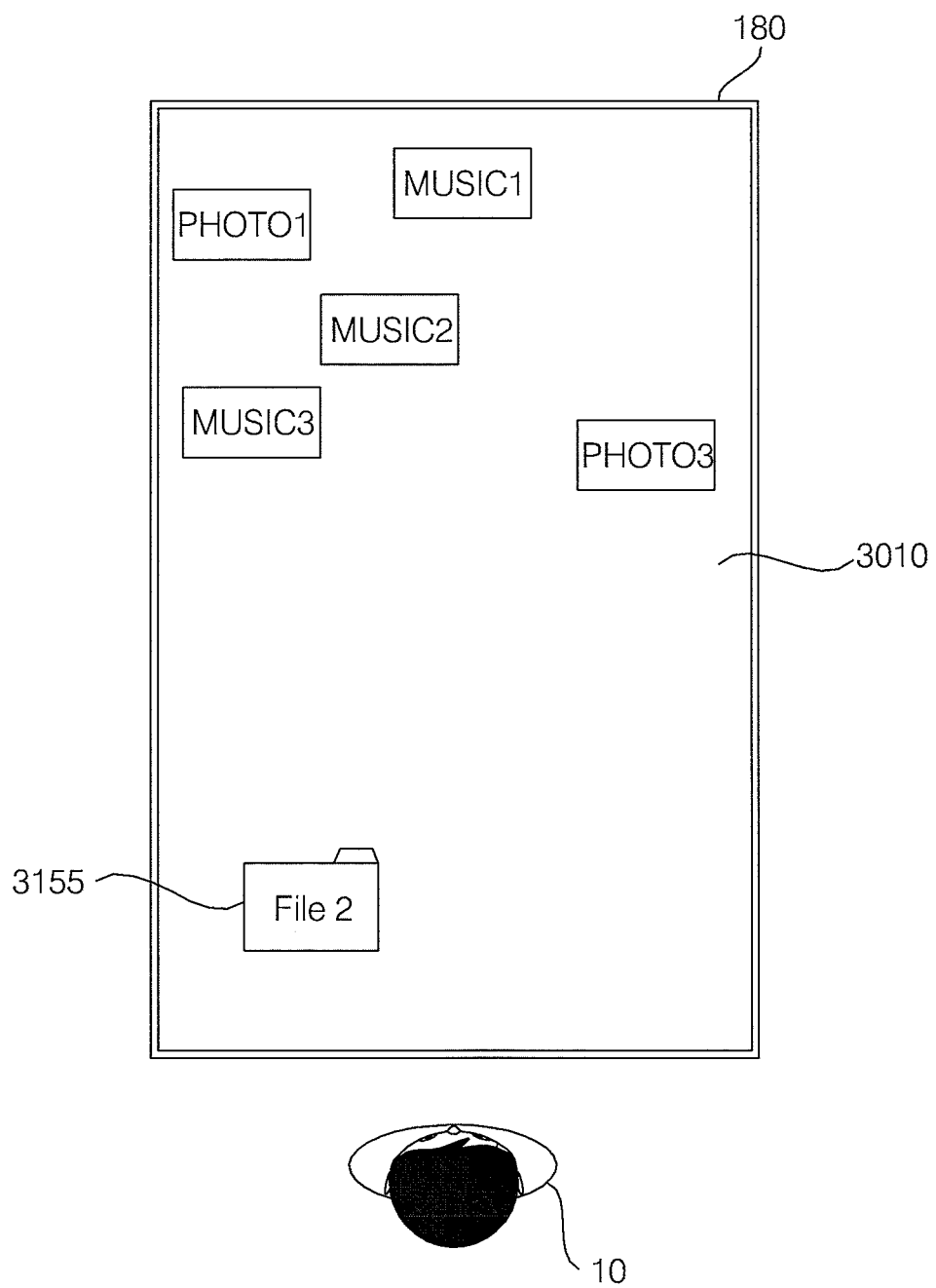

Then the second photo item 3022, PHOTO2 and the fourth photo item 3024, PHOTO4 may be moved, and a moved second photo item 3022a and a moved fourth photo item 3024a may be overlapped and displayed as content 3025. As illustrated in FIG. 29B, the second photo item 3022a and the fourth photo item 3024a may be displayed combined into one file 3155. Thus a user-desired content file may be generated.

Figure 30A:
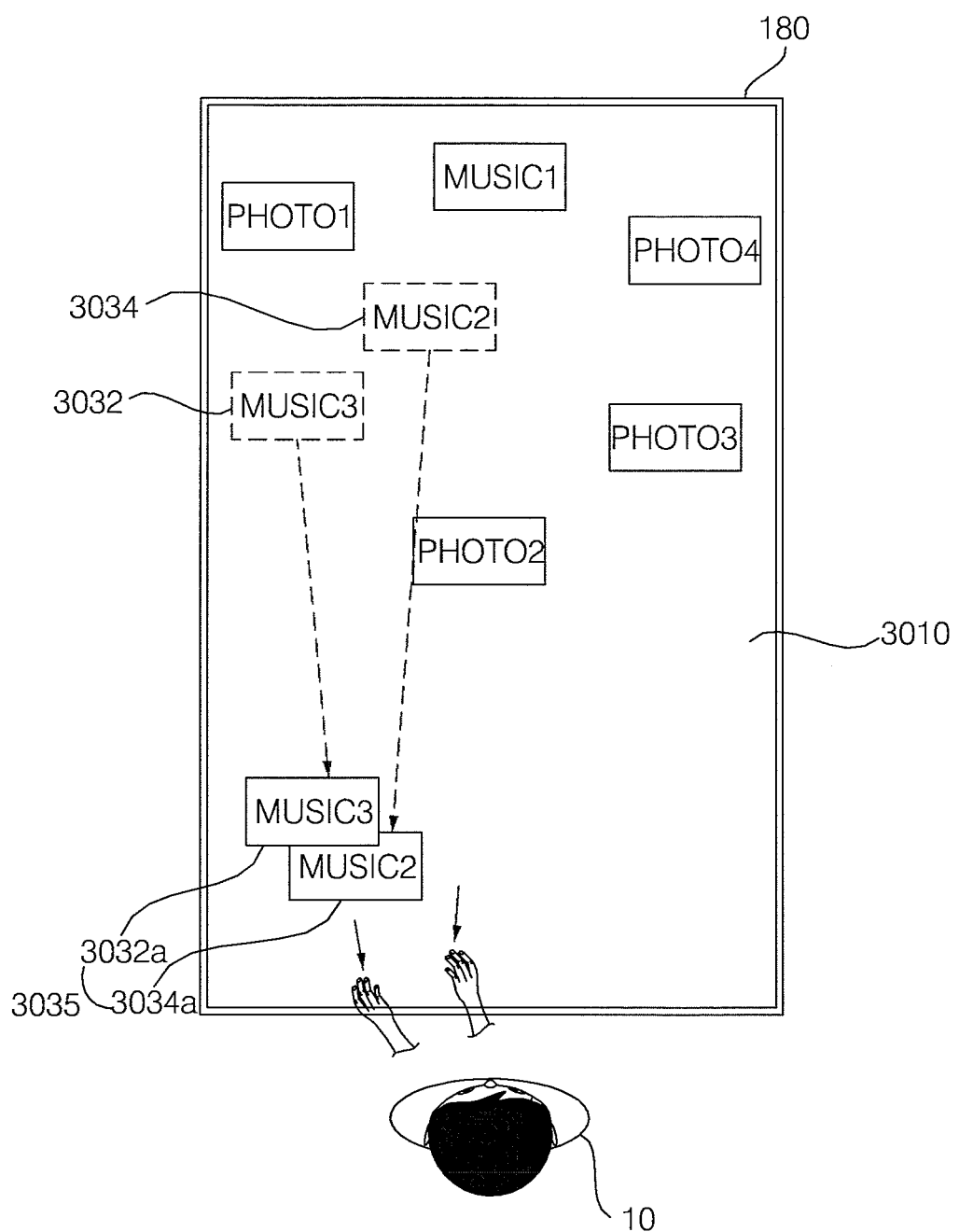

Referring to FIG. 30A, with different types of content items (e.g., PHOTO and MUSIC), the user 10 makes a touch input to combine a third music item 3032, MUSIC3 with a second music item 3034, MUSIC2. Then the third music item 3032, MUSIC3 and the second music item 3034, MUSIC2 may be moved, and a moved third music item 3032a and a moved second music item 3034a may be overlapped and displayed as content 3035.

Figure 30B:
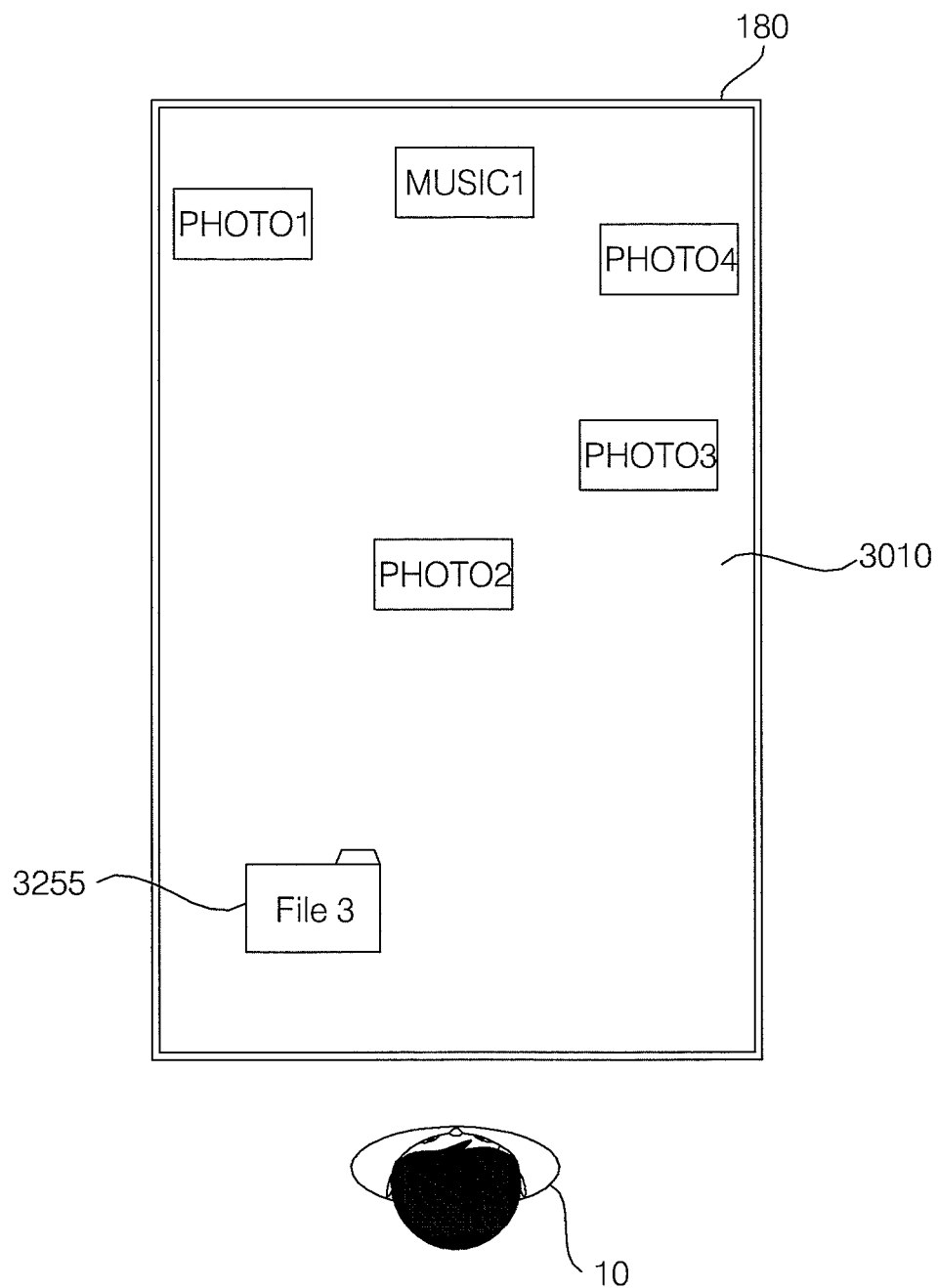

As illustrated in FIG. 30B, the third music item 3032a and the second music item 3034a may be displayed combined into one file 3255. Thus a user-desired content file may be generated.

As is apparent from the above description of the display apparatus and the method for operating the same according to an embodiment of the present invention, content can be moved, shared, and edited by means of a large display apparatus that can be used by a plurality of users. Therefore, the user's convenience is increased.

Particularly since content of a mobile terminal or content of the display apparatus set for each user can be displayed according to the position of the user, different content can be played back and displayed. Thus, user convenience can be increased.

The display apparatus and the method for operating the same according to the foregoing embodiments are not restricted to the embodiments set forth herein. Therefore, variations and combinations of the embodiments set forth herein may fall within the scope of the present invention.

The method for operating a display apparatus according to the foregoing embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A display apparatus comprising:
a sensor configured to sense a touch input by a first mobile terminal and a second mobile terminal;
a display configured to display a content list including a plurality of content items; and a processor configured to:

receive an enlarge touch input to enlarge the content list, expand and display at least a part of the plurality of content items in the content list, and begin playback of a first content item in the part of the plurality of content items when the first content item is enlarged to a predetermined reproducible size different than the other content items included in the plurality of content items, wherein the processor distinguishes between a touch on the display apparatus by a front surface of the first mobile terminal and a touch on the display apparatus by a rear surface of the first mobile terminal based on different capacitance variations, wherein the first mobile terminal is placed on the display and the processor displays different content corresponding to the front and rear surfaces of the first mobile terminal on the display, wherein the processor is further configured to:

calculate a position of a first user based on a position of the first mobile terminal, display first content on the display in correspondence with the calculated position of the first user, calculate a position of a second user based on a position of the second mobile terminal, display second content on the display in correspondence with the calculated position of the second user, change a display area of the first content based on the position of the second user, change the display area of the first content in proportion to the amount of content data stored in the first mobile terminal or a resolution of content data to be displayed, receive an input to display a mini map for the first content, display the mini map on the display over the first content, receive an input to zoom the mini map, display the zoomed-in mini map on the display, receive an input to move a part of the zoomed-in mini map, visually move faster the part of the zoomed-in mini map in a first area for the first content corresponding to the position of the first user than in a second area for the second content corresponding to the position of the second user, display the part of the zoomed-in mini map in correspondence with the position of the second user, display a copy of the first content corresponding to the position of the second user, receive an edit input from the second user, edit the copy of the first content based on the received edit input, display the edited copy of the first content or a copy of the edited copy of the first content in correspondence with the position of the first user, prevent editing the copy of the first content or the copy of the edited copy of the first content to the first user during editing, perform pairing between the display apparatus and the first mobile terminal, and display an object related to data sharing with the first mobile terminal in a user area corresponding to the position of the first mobile terminal, wherein when a specific content item is positioned in an overlap area between the user area corresponding to the position of the first mobile terminal and a user area corresponding to the position of the second mobile terminal, the processor is further configured to:

share the content item between the first mobile terminal and the second mobile terminal, receive an edit input from the second user, edit the shared content item, and share the edited content item with the first user.

2. The display apparatus according to claim 1, wherein the processor is further configured to:

receive a touch combine input on at least two content items including the plurality of content items, and combine the at least two content items into a corresponding content list.

3. The display apparatus according to claim 1, wherein the processor is further configured to begin playback of the first content item when the first content item is enlarged to the predetermined size that is larger than the other displayed content items.

4. The display apparatus according to claim 1, wherein when the enlarge touch input is a touch input in a first direction, the processor is further configured to enlarge the content list in the first direction.

5. The display apparatus according to claim 1, wherein the processor is further configured to:

increase a volume of the first content item in correspondence with the enlarging of the first content item.

6. The display apparatus according to claim 1, wherein the processor is further configured to:

receive a first touch flicking input in a first direction for the first content item being playbacked, and display images related to the first content item in the first direction.

7. The display apparatus according to claim 6, wherein the processor is further configured to:

receive an image insert input corresponding to a position of the displayed images, insert an additional image between the images at the corresponding position, receive a second touch flicking input in a second direction opposite to the first direction, and scroll the images including the additional image in the second direction.

8. The display apparatus according to claim 1, wherein the processor is further configured to:

receive a touch input or a flicking input for the first mobile terminal, display a screen displayed on the first mobile terminal in the display area of the first content, receive another touch input or flicking input for a specific content item in the screen displayed on the first mobile terminal, and display the specific content item in the display area of the first content.

* * * * *